United States Patent [19]
Ikemori et al.

[11] Patent Number: 5,289,317
[45] Date of Patent: Feb. 22, 1994

[54] COMPACT ZOOM LENS

[75] Inventors: Keiji Ikemori; Koutaro Yano; Hiroki Nakayama, all of Kanagawa, Japan

[73] Assignee: Canon Kabushiki Kaisha, Tokyo, Japan

[21] Appl. No.: 63,041

[22] Filed: May 19, 1993

Related U.S. Application Data

[63] Continuation of Ser. No. 860,213, Mar. 27, 1992, abandoned, which is a continuation of Ser. No. 460,667, Jan. 3, 1990, abandoned.

[30] Foreign Application Priority Data

Jan. 6, 1989 [JP] Japan .................................. 64-1118
Jan. 31, 1989 [JP] Japan .................................. 1-21027
Jan. 31, 1989 [JP] Japan .................................. 1-21028
Mar. 10, 1989 [JP] Japan .................................. 1-59035
Mar. 10, 1989 [JP] Japan .................................. 1-59036
Mar. 10, 1989 [JP] Japan .................................. 1-59037

[51] Int. Cl.$^5$ ............................................. G02B 15/14
[52] U.S. Cl. ................................. 359/689; 359/676; 359/684; 359/716
[58] Field of Search ............... 350/423, 427, 432, 474; 359/689, 684, 683, 676, 708, 690, 716

[56] References Cited

U.S. PATENT DOCUMENTS 4,586,793 5/1986 Tanaka et al. .......................... 350/423
4,936,661 6/1991 Betensky et al. ....................... 350/423
4,955,700 9/1990 Yamaguchi ............................ 350/423

Primary Examiner—Bruce Y. Arnold
Assistant Examiner—Hung Xuan Dang
Attorney, Agent, or Firm—Fitzpatrick, Cella, Harper & Scinto

[57] ABSTRACT

A zoom lens comprising, from front to rear, a first lens group of negative power, a second lens group of positive power and a third lens group of negative power, wherein as zooming from the wide-angle end to the telephoto end is performed by moving the first, second and third lens groups, the second and third lens groups both are directed forward and the speed of movement of the third lens group is faster than that of movement of the second lens group, the zoom lens satisfying the following conditions:

$$1 < S1w/S2w < 3.2$$

$$0.15 < |f3|/FT < 0.43$$

$$2 < FT/FW < 5$$

where $S1w$ and $S2w$ are air separations between the first and second lens groups and between the second and third lens groups in the wide-angle end respectively, $f3$ is a focal length of the third lens group, and $FW$ and $FT$ are shortest and longest focal lengths of the entire lens system respectively.

20 Claims, 65 Drawing Sheets

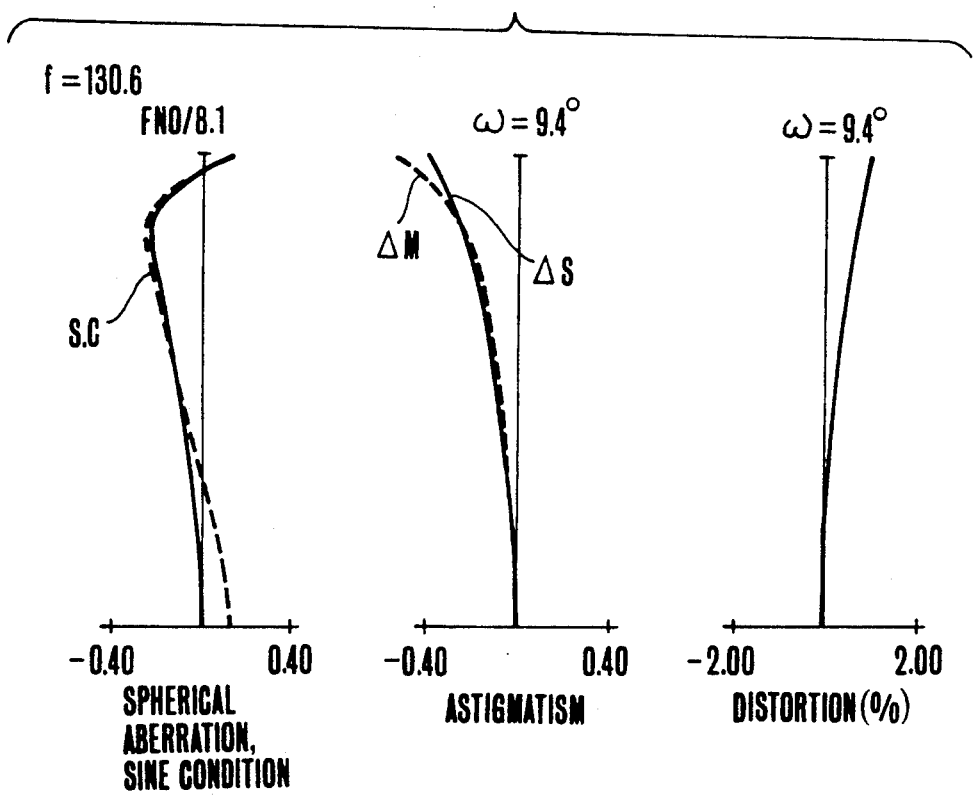

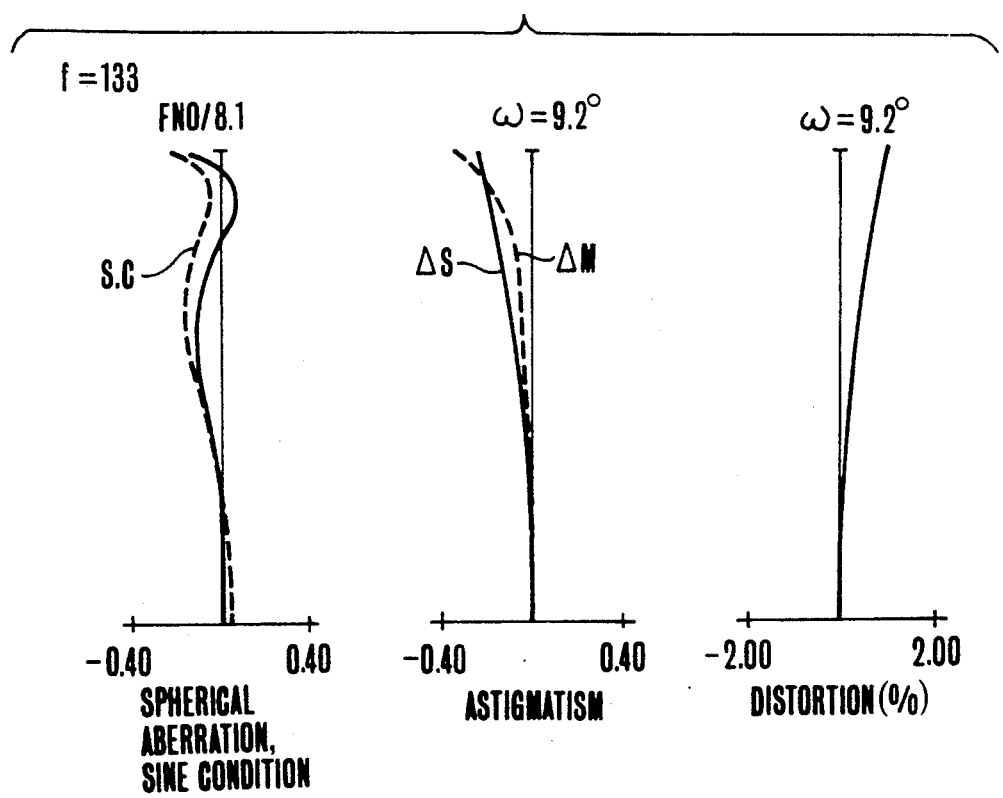

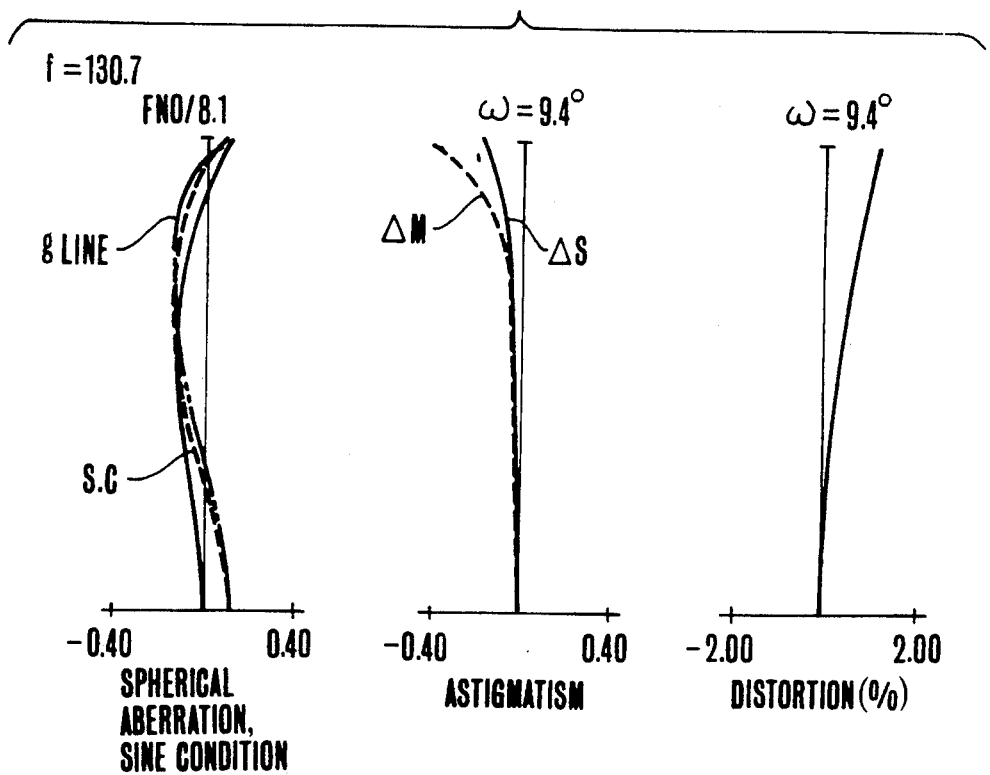

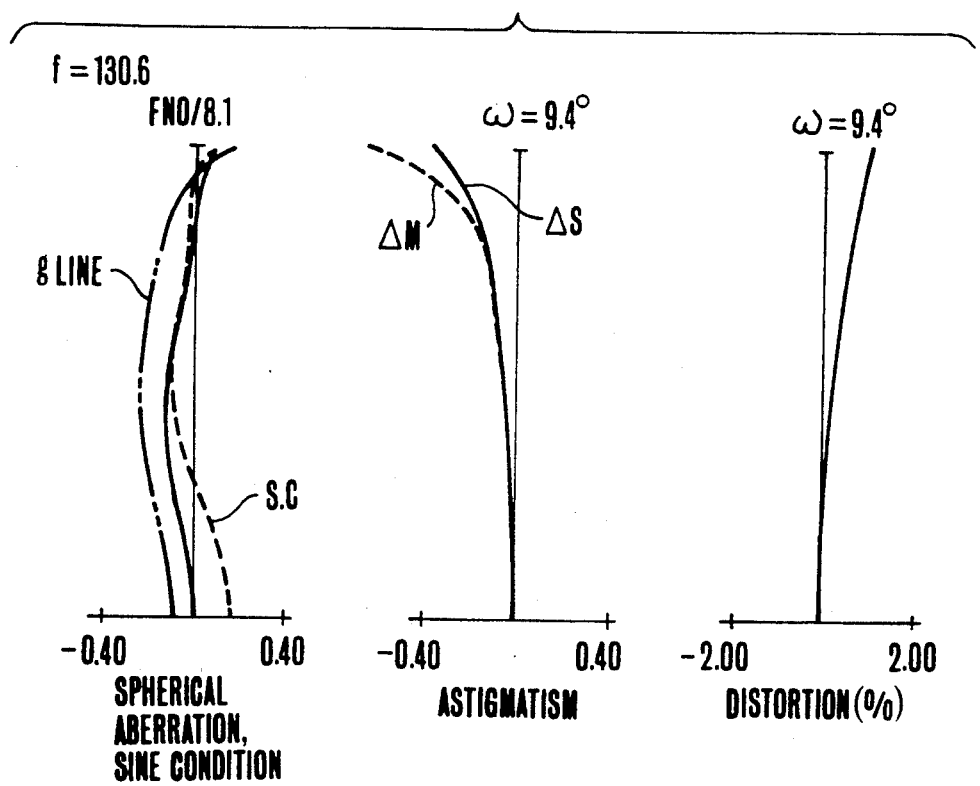

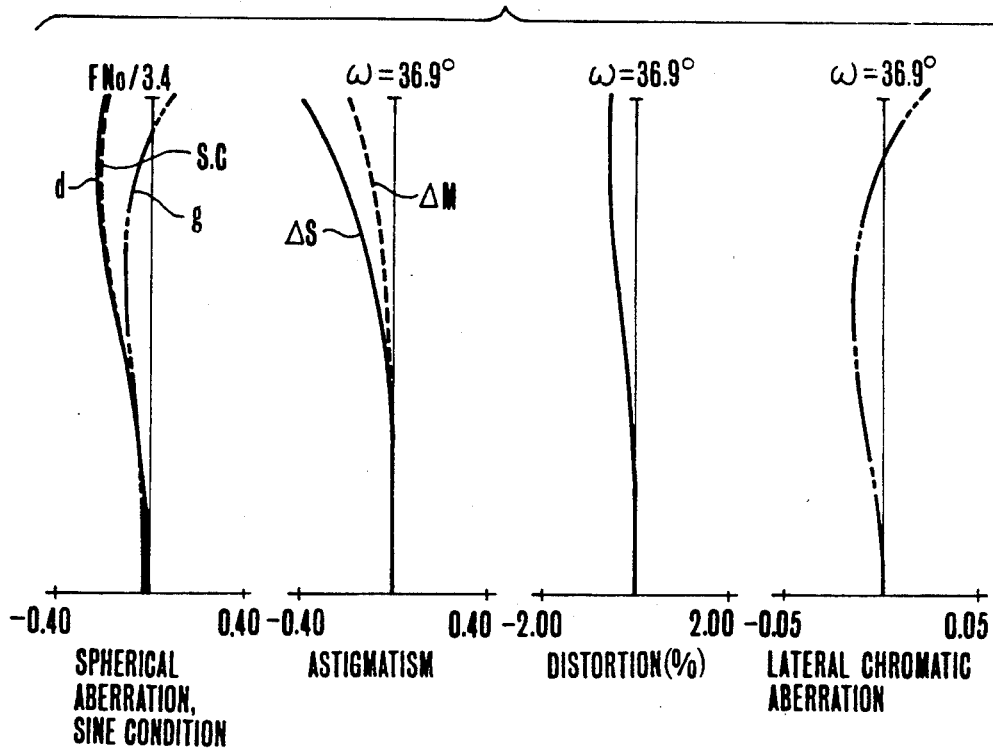
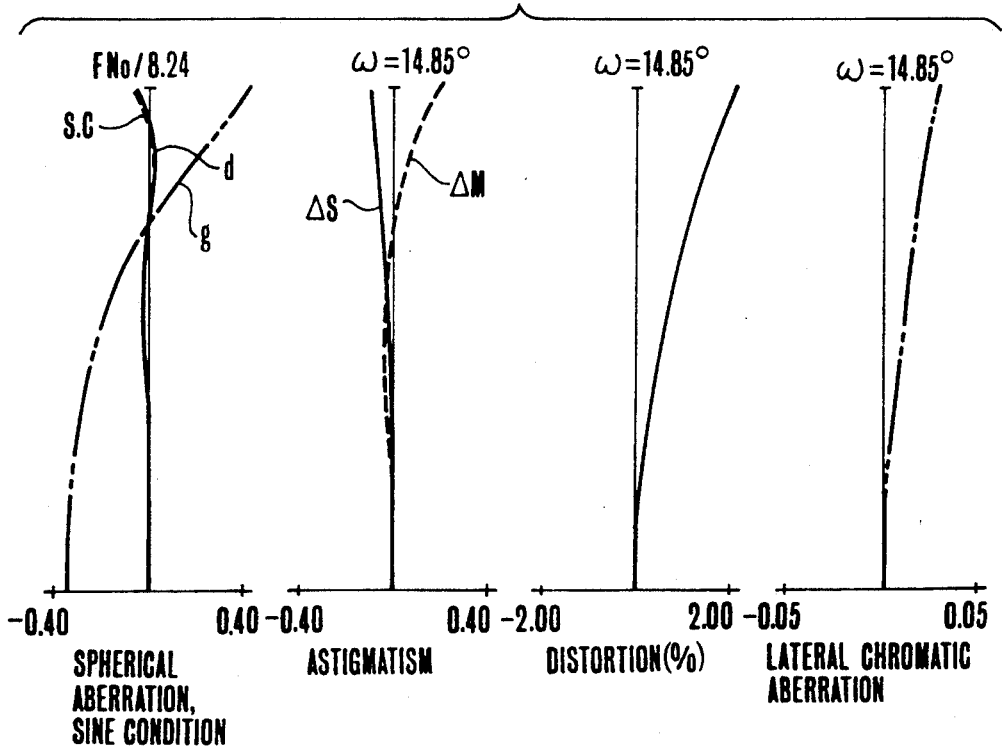

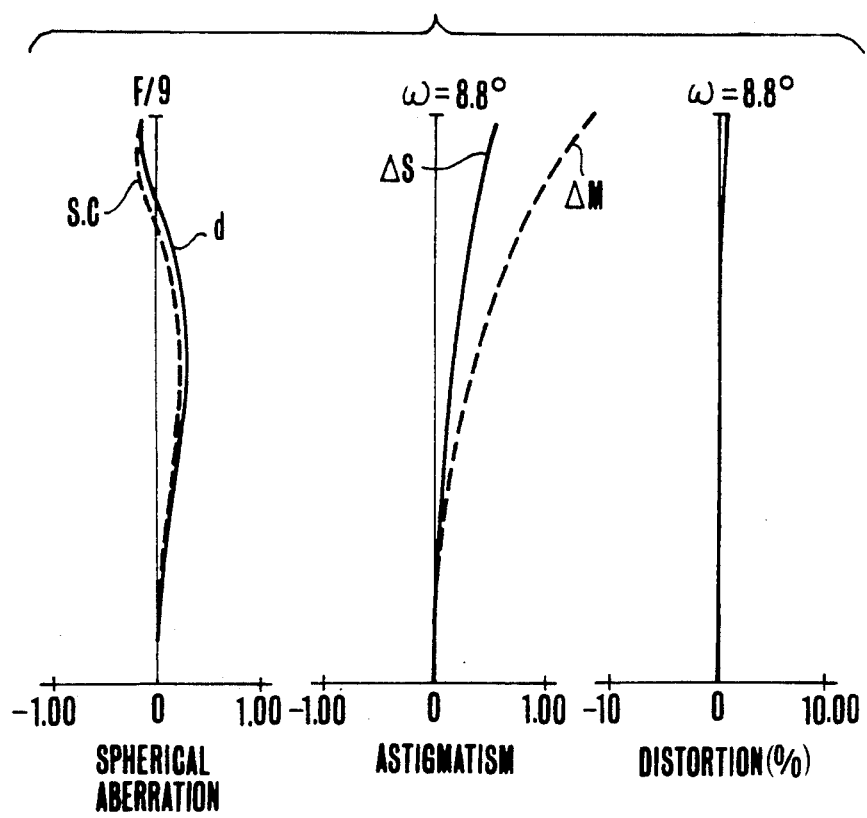

COMPACT ZOOM LENS

This application is a continuation of application Ser. No. 07/860,213 filed Mar. 27, 1992, now abandoned, which is a continuation of application Ser. No. 07/460,667 filed Jan. 3, 1990, now abandoned.

BACKGROUND OF THE INVENTION

1. Field of the Invention

This invention relates to zoom lenses suited to photographic cameras or video cameras and, more particularly, to zoom lenses having three lens groups of which the first counting from front is of negative power and in which these three lens groups are moved to vary the image magnification. Still more particularly, it relates to zoom lenses of high range with a short total length and excellent optical performance.

2. Description of the Related Art

The zoom lens having three lens groups of which the first counting from front is of negative power, the second is of positive power and the third is of negative power and in which at least two of these are made to move to vary the image magnification has been proposed in, for example, Japanese Laid-Open Patent Applications Nos. Sho 55-11260 and Sho 56-159614, Japanese Patent Publication No. Sho 58-50327 and British Patent No. 398307.

This type of zoom lens, because being relatively amenable to increase the angle of view, has been utilized in many wide-angle photographic systems.

However, the zoom lenses of Japanese Patent Publication No. Sho 58-50327 and British Patent No. 398307 have a relatively long total length (the distance from the front vertex to the image plane) and their front lens members have also a large diameter. To achieve a minimization of the bulk and size of the camera, they are not always adequate.

The zoom lenses of Japanese Laid-Open Patent Applications Nos. Sho 55-11260 and Sho 56-159614 are adapted to be objective lenses for copy machines and have no positive aim to vary the focal length. These zoom lenses each are used in such a way that the lens system is inverted as a whole as the magnification changes between lower and higher values, or operates two modes in so-called conjugate relation. The values of the focal length at the minimum and maximum magnifications are nearly equal to each other, and the focal length is made to vary in a range between this value and its half. Hence, these zoom lenses are not suited to photographic cameras, video cameras, etc..

Apart from these zoom lenses, a zoom lens of the same type as that described above but suited to the photographic camera, or video camera is proposed in a Japanese Laid-Open Patent Application No. Sho 58-200208. In the same document, of the three lens groups of minus-plus-minus power arrangement in this order from the front, the first and second groups are moved in a particular relation when performing variation of the magnification, and particular rules of design for the three lens groups are set forth. Owing to these features, a zoom lens well corrected for good stability of aberrations against zooming, or having high optical performance is achieved. As the related art, there is U.S. patent application Ser. No. 187,277 filed on Apr. 28, 1988.

SUMMARY OF THE INVENTION

The present invention is to provide a zoom lens which is improved over the zoom lens proposed in Japanese Laid-Open Patent Application No. Sho 58-200208 and the zoom lens of U.S. patent application Ser. No. 187,277.

And, its particular object is to provide a zoom lens which has achieved a shortening of the total length of the entire system and an increase of the zoom ratio, while still permitting a high optical performance to be maintained throughout the entire range of magnification.

BRIEF DESCRIPTION OF THE DRAWINGS

FIGS. 5(A), 5(B) and 5(C) to FIGS. 8(A), 8(B) and 8(C) are graphic representations of the various aberrations of the numerical examples 1 to 4 respectively.

FIG. 10(A) and 10(B) to FIG. 13(A) and 13(B) are longitudinal section views of numerical examples 5 to 8 of zoom lenses respectively.

FIGS. 14(A), 14(B), 14(C) and 14(D) to FIGS. 17(A), 17(B), 17(C) and 17(D) are the graphic representations of the various aberrations of the numerical examples 5 to 8 respectively.

FIGS. 27(A), 27(B) and 27(C) to FIGS. 35(A), 35(B) and 35(C) are graphic representations of the various aberrations of the numerical examples 9 to 17 respectively.

FIGS. 41(A), 41(B) and 41(C) to FIGS. 45(A), 45(B) and 45(C) are graphic representations of the various aberrations of the numerical examples 18 to 22 respectively.

FIGS. 49(A), 49(B) and 49(C) to FIGS. 51(A), 51(B) and 51(C) are graphic representations of the various aberrations of the numerical examples 23 to 25 respectively.

Figure 1:
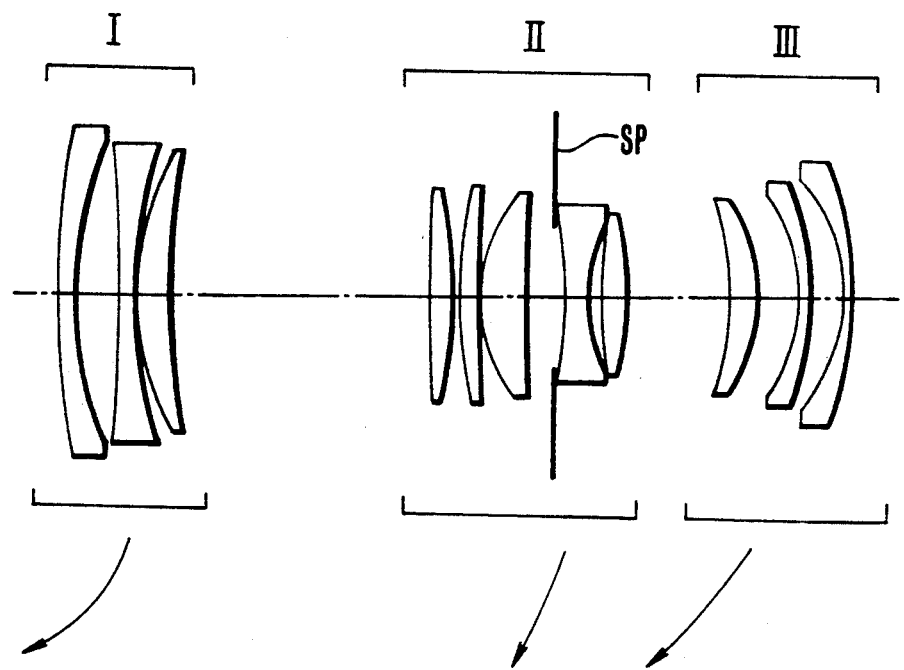
FIG. 1 to FIG. 4 are longitudinal section views of numerical examples 1 to 4 of zoom lenses of the invention respectively.
Figure 2:
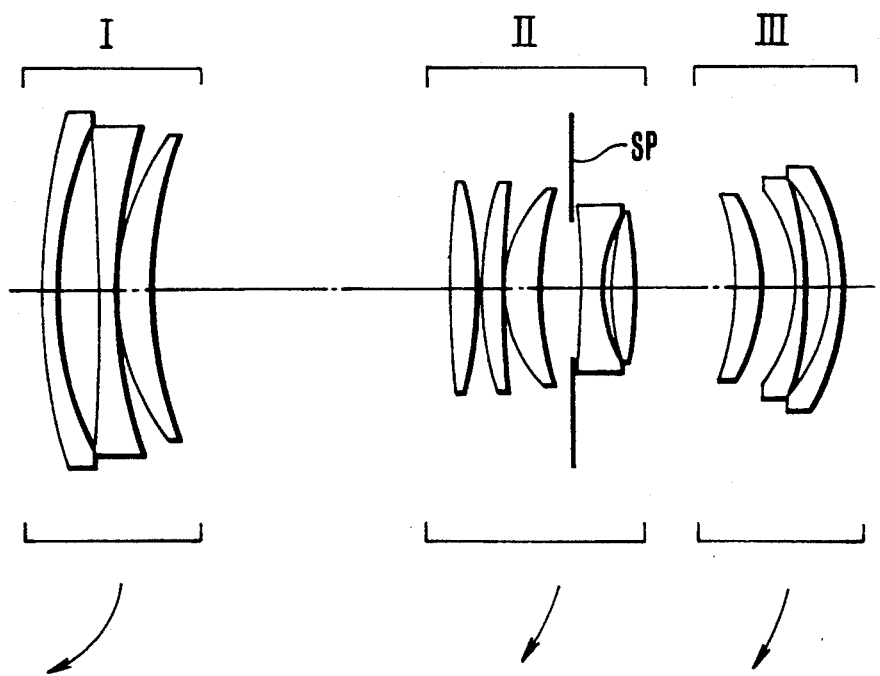
Figure 3:
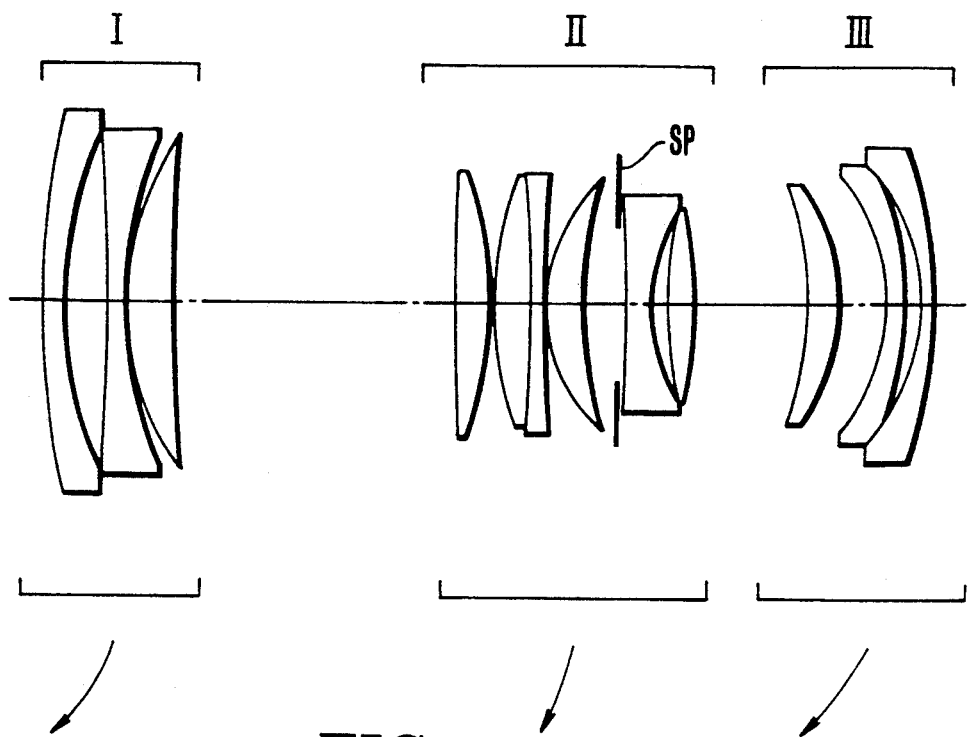
Figure 4:
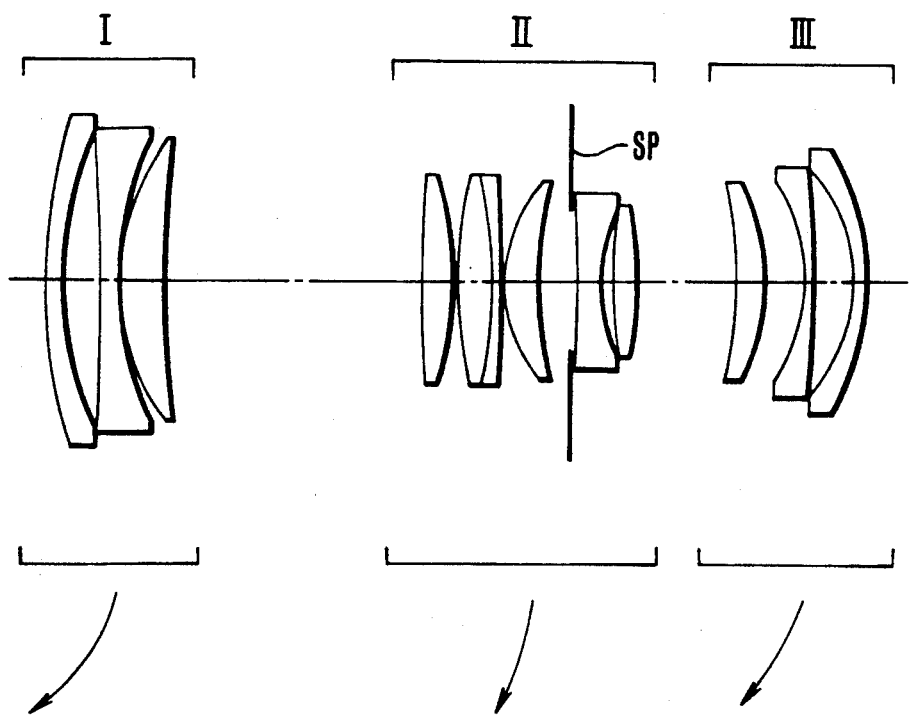
Figure 5A:
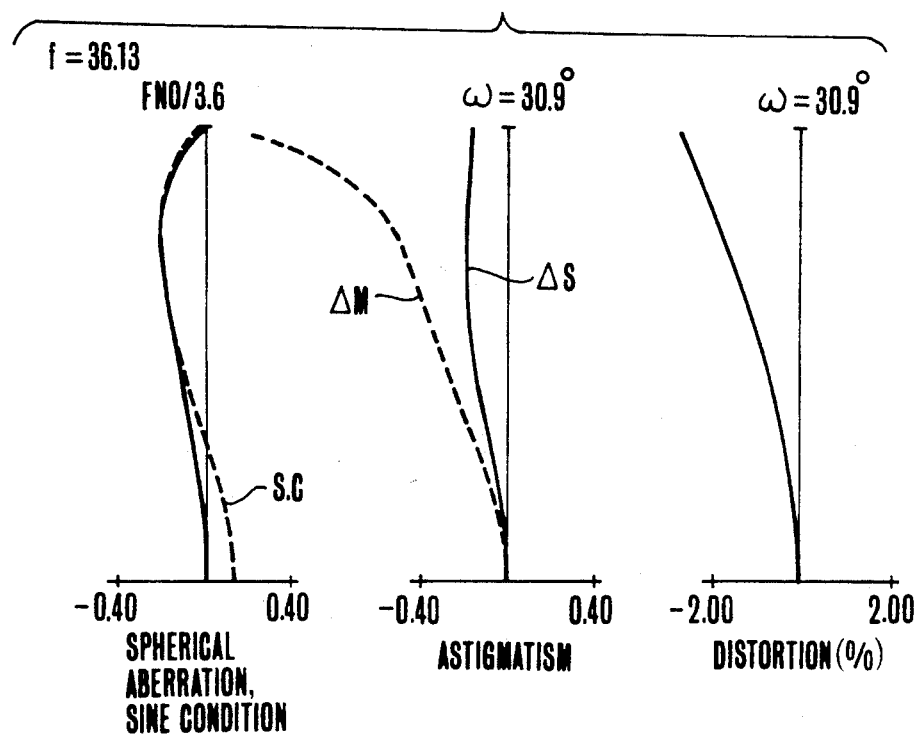
Figure 5B:
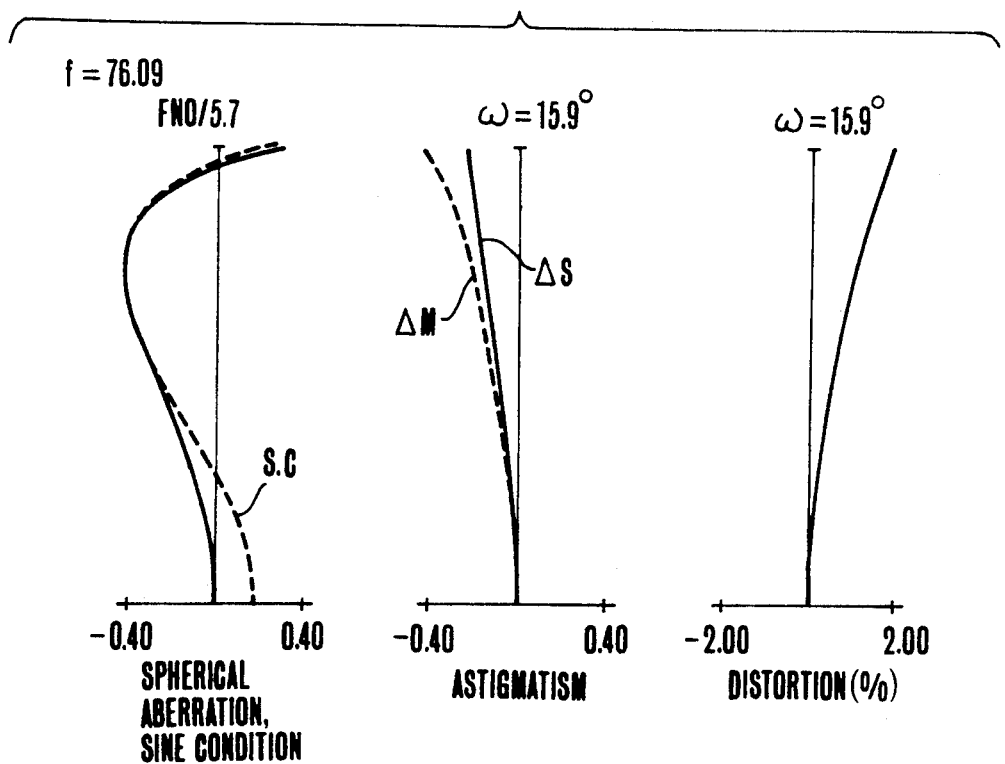
Figure 6A:
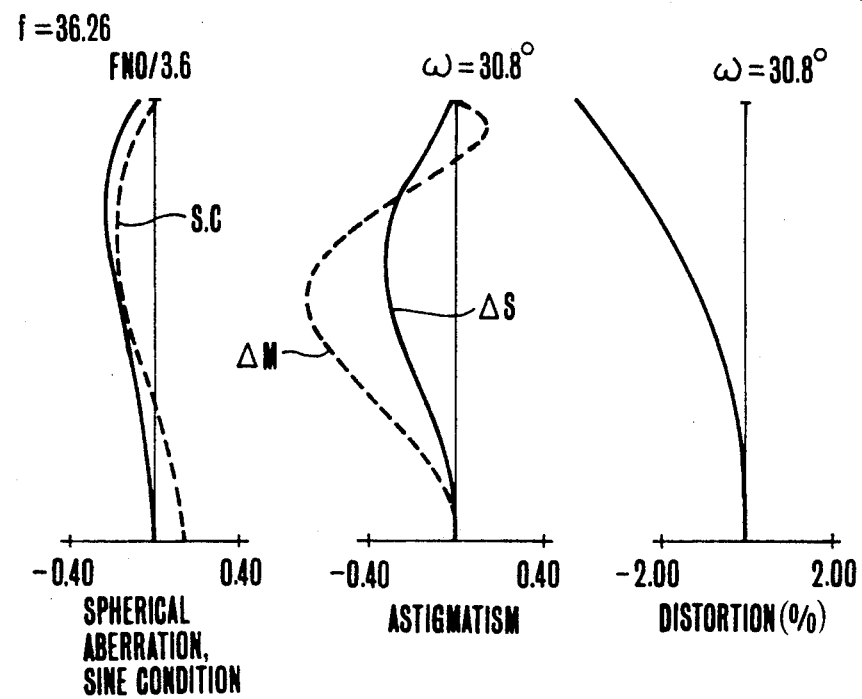
Figure 6B:
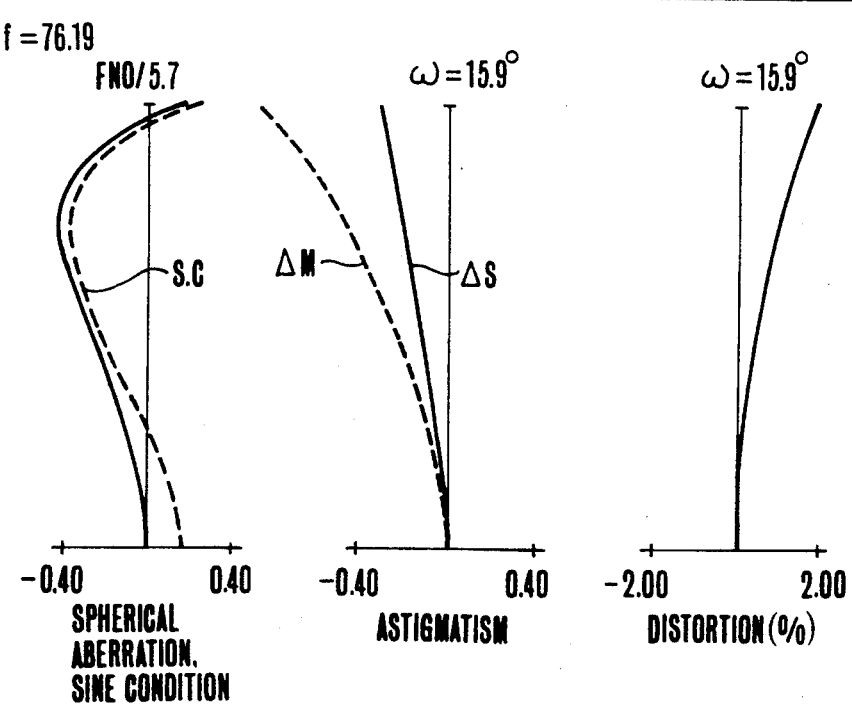
Figure 7A:
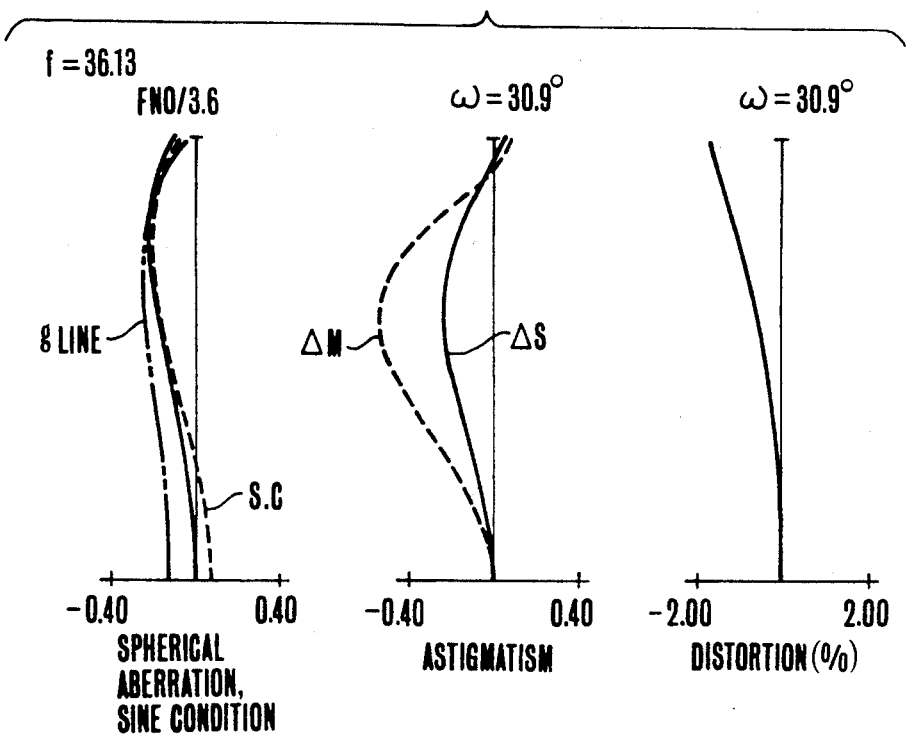
Figure 7B:
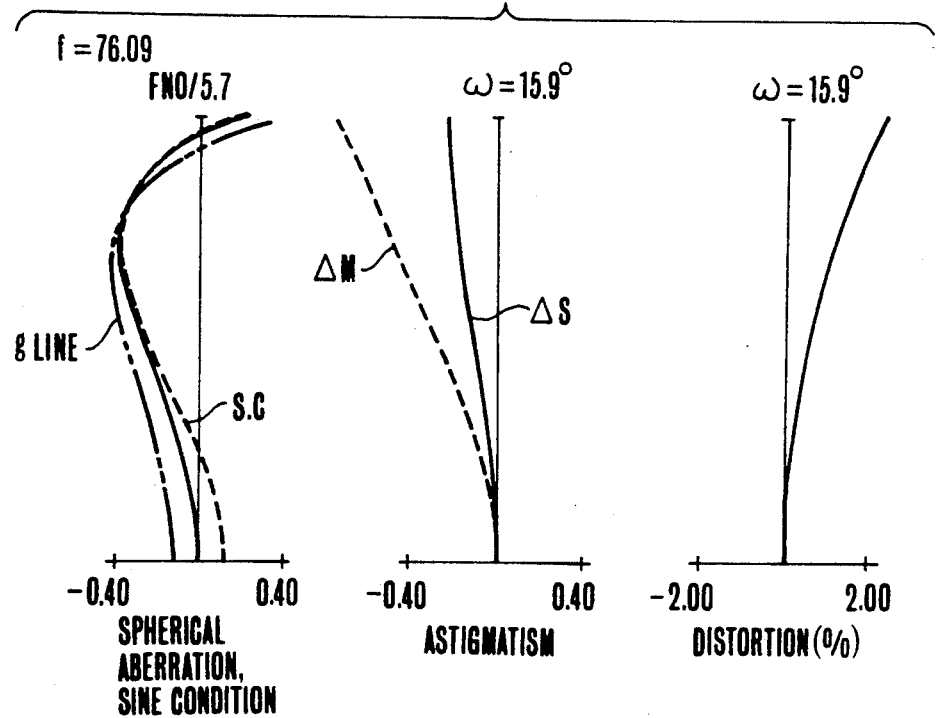
Figure 8A:
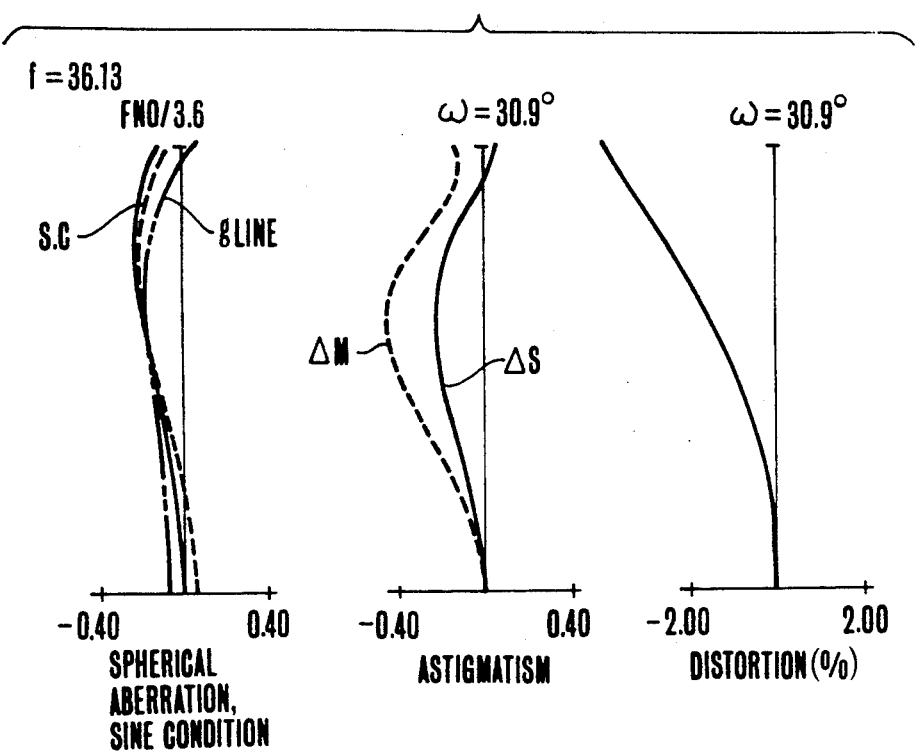
Figure 8B:
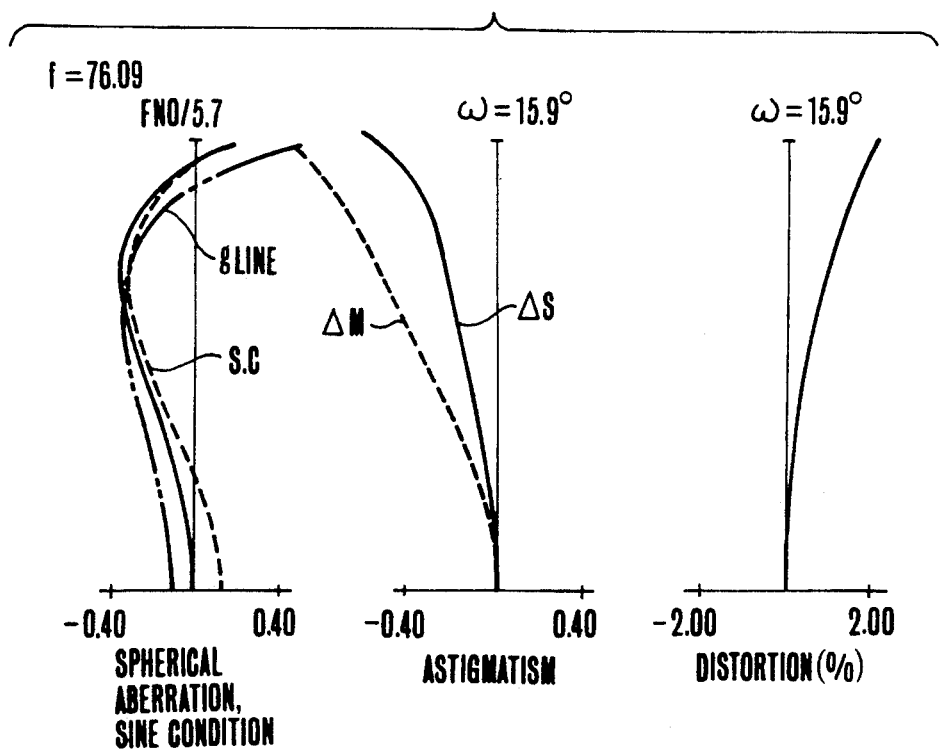

Incidentally, in FIGS. 14(A), 14(B) and 14(C) to FIGS. 17(A), 17(B) and 17(C), the drawings of the figure numbers with the suffixes of (A) and (B) illustrate the aberrations in the wide-angle end and the telephoto end respectively when the lens is focused onto an infinitely distant object, while the drawings of the figure numbers with the suffixes of (C) and (D) illustrate the aberrations in the wide-angle end and the telephoto end at an object distance of 1 meter respectively. In the other graphic representations, the drawings of the figure numbers with the suffixes of (A), (B) and (C) illustrate the aberrations in the wide-angle end, an intermediate position and the telephoto end respectively.

DETAILED DESCRIPTION OF THE PREFERRED EMBODIMENTS

FIG. 1 to FIG. 4 show an specific embodiment of the invention where I denotes a first lens group of negative power, II a second lens group of positive power, and III a third lens group of negative power, and the arrows indicate the directions of movement of these lens groups when zooming from the wide-angle end to the telephoto end.

The zoom lens according to this embodiment has its three lens groups made to move when zooming from the wide-angle end to the telephoto end, wherein the second lens group and the third lens group both move forward in such a relation that the speed of the third lens group is faster than that of the second lens group.

And, it has characteristic features that, letting the axial air separation between the first and second lens groups in the wide-angle end be denoted by S1w, the axial air separation between the second and third lens groups in the wide-angle end by S2w, the focal length of the third lens group by f3, the focal lengths of the entire lens system in the wide-angle and telephoto ends by FW and FT respectively, the following conditions are satisfied:

$$1 < S1w/S2w < 3.2 \ldots \quad (1)$$

$$0.15 < |f3|/FT < 0.43 \ldots \quad (2)$$

$$2 < FT/FW < 5 \ldots \quad (3)$$

Another feature is that when zooming from the wide-angle end to the telephoto end, the first lens group is made to move together with the second and third lens groups in such relation as shown in the drawings. The introduction of such a movement of the first lens group leads to a great advantage of shortening the total length of the zoom lens in the wide-angle end. In other words, a refractive power arrangement that permits the total length of the zoom lens to be short in the wide-angle end and to become long in the telephoto end.

In particular, as the zoom lens is constructed from the three lens groups of the aforesaid refractive powers, a range for the ratio of the air separation S1w between the first and second lens groups to the air separation S2w between the second and third lens groups in the wide-angle end is set forth by the inequalities of condition (1).

By this, the back focal distance in the wide-angle end is made shorter and a large reduction of the total length of the zoom lens in the wide-angle end is achieved.

When the upper limit of the condition (1) is exceeded, the back focal distance increases more than necessary. When the lower limit is exceeded, the back focal distance becomes conversely too short. So, the third lens group comes too close to the image plane to avoid production of drawbacks that the shadow of dust grains or the like on the lens surfaces appears on the photosensitive surface and that ghost due to the reflection of each lens surface becomes liable to arise. In the present embodiment, for more improved results, it is preferred that the inequalities of condition (1) are altered to $1.2 < S1w/S2w < 2.8$.

Also, by giving a range for the ratio of the focal length f3 of the third lens group to the longest focal length FT of the entire lens system as set forth in the inequalities of condition (2), a reduction of the bulk and size of the entirety of the lens system is achieved while still preserving good optical performance throughout the entire range of magnification.

In other words, with the help of the attainment of an increase of the longest focal length by making the refractive power of the third lens group so much strong that as zoomed to the telephoto side, the entire lens system takes a slight telephoto form, the desired reduction of the size of the whole lens system is achieved.

When the upper limit is exceeded, the tendency to take the telephoto form gets weaker. This allows the size of the entire lens system to increase. When the lower limit is exceeded, the tendency to take the telephoto form conversely gets too strong. Though this allows the reduction of the size of the entire lens system to be done with ease, the curvature of field tends to be over-corrected, making it difficult to obtain good optical performance. In the present embodiment, for further improved results, it is preferred to narrow the range of the inequalities of condition (2) to $0.2 < |f3|/FT < 0.35$.

The inequalities of condition (3) have an aim that in the zoom lens of the invention the zoom ratio is set so properly that good optical performance is kept throughout the entire range of magnification.

In other words, within the above-described configuration, each lens element is formed so that the focal length of the entire lens system falls within this range. By this, the reduction of the size of the entire lens system is achieved in such a manner that high optical performance is obtained over the entire range of magnification.

The above-described conditions suffice for accomplishing the objects of providing the zoom lens of the invention. Yet, to achieve a further reduction of the size of the entire lens system with the preservation of good optical performance, the invention sets forth the following more conditions:

$$0.4 < Lw/FT < 0.9 \ldots \quad (4)$$

$$0.25 < |f1|/FT < 0.82 \ldots \quad (5)$$

where f1 is the focal length of the first lens group and Lw is the distance from the front vertex to the image surface.

When the upper limit of the inequalities of condition (4) is exceeded, the much-desired reduction of the size of the entire lens system fails to realize. When the lower limit is exceeded, the predetermined zoom ratio becomes difficult to obtain.

The inequalities of condition (5) have an aim that as the first lens group is used for focusing purposes, its total movement is set appropriately and the variation with focusing of the aberrations is minimized. When the negative refractive power of the first lens group is too weak beyond the upper limit of the condition (5), the total focusing movement increases to an excess and the diameter of the front lens members increases objectionably.

For more improved results in the present embodiment, it is preferred to alter the inequalities of condition (4) to $0.5 < Lw/FT < 0.8$ and the inequalities of condition (5) to $0.3 < |f1|/FT < 0.7$.

In the present embodiment, the first lens group is made to move at the same time when the second and third lens groups move in order to facilitate the reduction of the size of the entire lens system while simultaneously securing the desired zoom ratio.

To allow for the movement of the first lens group and, at the same time, to make it easy to secure the predetermined zoom ratio, the total zooming movements s and t of the second and third lens groups respectively have better to satisfy the following condition:

$$0.7 < s/t < 0.95 \ldots \quad (6)$$

By making the speed of the third lens group faster than that of the second lens group, the simultaneous fulfillment of the requirements of securing the predetermined zoom ratio and of reducing the size of the entire lens system is done with ease.

When the movement of the third lens group is too large relative to the movement of the second lens group as exceeding the lower limit of the inequalities of condition (6), the second and third lens groups come to mechanically interfere with each other when zoomed in the telephoto side. When the difference between the movements of the second and third lens groups is too small as exceeding the upper limit, it becomes difficult for the introduction of the movement into the first lens group to effectively reduce the size of the entire lens system.

To achieve good stability of aberration correction throughout the entire range of magnification with the limitation of the size of the entire lens system to the minimum which has been attained in the present invention, the second lens group may be constructed from two or more positive lenses, a negative lens and a positive lens arranged in this order from the front, particularly because the amount of aberrations produced in the second lens group can be lessened.

Also, the third lens group may be constructed with inclusion of a positive lens ad at least one negative lens, and, particularly when either of them is one in number, it is better that at least one lens surface in the third lens group is formed to an aspheric surface of such shape that the negative refractive power becomes progressively weaker (stronger in the sense of positive refractive power) toward the margin. According to this, the variation with zooming of the distortion and the lateral chromatic aberration can be corrected well.

Further, the first lens group is better constructed with inclusion of at least one negative lens and a positive lens, wherein, for example, when two negative lenses and one positive lens are used, one of the lens surfaces in the first lens group may be formed to an aspheric surface of such shape that the positive refractive power becomes progressively weaker (stronger in the negative sense) toward the margin. According to this, the distortion of the barrel type produced from the second lens group can be corrected well.

It is also to be noted that besides the form and construction and arrangement of the lens elements shown in the numerical examples 1 to 4 to be described later, there is another desirable one as described below:

From front to rear, the first lens group is constructed with three lenses, i.e., a meniscus-shaped negative lens convex toward the front, a negative lens and a positive lens, the second lens group with a positive lens, a positive lens (or a cemented positive lens), a positive lens, an aperture stop, a negative lens and a positive lens, totaling five lenses, and the third lens group with a positive lens of meniscus shape convex toward the rear and two negative lenses of meniscus shape convex toward the rear.

The numerical data for the examples 1 to 4 of zoom lenses of the invention are shown below. In these numerical examples 1 to 4, Ri denotes the radius of curvature of the i-th lens surface counting from front, Di the i-th axial thickness or air separation counting from front, and Ni and νi the refractive index and Abbe number of the i-th lens element counting from front.

The numerical values of the factors in the above-described various conditions (1) to (6) for the numerical examples 1 to 4 are also listed in Table-1.

The shape of the aspheric surface is expressed in the coordinates of the X axis in the optical axis and the H axis in a direction perpendicular to the optical axis with the direction in which light advances being taken as positive, by the following equation:

$$X = \frac{(1/R)H^2}{1 + \sqrt{(1 - (H/R)^2}} + AH^2 + BH^4 + CH^6 + DH^8 + EH^{10}$$

where R represents the radius of the osculating sphere and A, B, C, D and E are the aspheric coefficients.

Numerical Example 1: (FIGS. 1, 5(A), 5(B) and 5(C))
F = 36.13–130.6  FNo = 1:3.6–8.1  2ω = 61.8°–18.8°

| | | | |
|---|---|---|---|
| R1 = 82.24 | D1 = 1.30 | N1 = 1.81600 | ν1 = 46.6 |
| R2 = 33.31 | D2 = 4.00 | | |
| R3 = −166.93 | D3 = 1.30 | N2 = 1.77250 | ν2 = 49.6 |
| R4 = 37.25 | D4 = 0.15 | | |
| R5 = 20.78 | D5 = 3.30 | N3 = 1.64769 | ν3 = 33.8 |
| R6 = 65.32 | D6 = Variable | | |
| R7 = 191.31 | D7 = 2.40 | N4 = 1.49700 | ν4 = 81.6 |
| R8 = −40.65 | D8 = 0.15 | | |
| R9 = 39.53 | D9 = 1.83 | N5 = 1.49700 | ν5 = 81.6 |
| R10 = 123.79 | D10 = 0.15 | | |
| R11 = 13.99 | D11 = 4.00 | N6 = 1.49700 | ν6 = 81.6 |
| R12 = 152.76 | D12 = 2.50 | | |
| R13 = Stop | D13 = 1.00 | | |
| R14 = −48.19 | D14 = 2.04 | N7 = 1.83400 | ν7 = 37.2 |
| R15 = 15.76 | D15 = 1.00 | | |
| R16 = 28.18 | D16 = 3.00 | N8 = 1.56732 | ν8 = 42.8 |
| R17 = −25.02 | D17 = Variable | | |
| R18 = −27.86 | D18 = 2.70 | N9 = 1.64769 | ν9 = 33.8 |
| R19 = −16.28 | D19 = 3.72 | | |
| R20 = −15.12 | D20 = 1.20 | N10 = 1.80400 | ν10 = 46.6 |
| R21 = −26.35 | D21 = 2.53 | | |
| R22 = −16.27 | D22 = 1.20 | N11 = 1.69680 | ν11 = 55.5 |
| R23 = −32.50 | | | |

| Variable | Focal length | | |
|---|---|---|---|
| separation | 36.13 | 76.09 | 130.60 |
| D6 | 23.11 | 7.46 | 1.58 |
| D17 | 8.85 | 4.17 | 1.19 |

R5: Aspheric
A = 0
B = −1.77632 × 10⁻⁵
C = −2.92211 × 10⁻⁸
D = −5.46454 × 10⁻¹¹
E = 1.79023 × 10⁻¹³

Numerical Example 2: (FIGS. 2, 6(A), 6(B) and 6(C))
F = 36.26–133  FNo = 1:3.6–8.1  2ω = 61.6°–18.5°

| | | | |
|---|---|---|---|
| R1 = 52.72 | D1 = 1.20 | N1 = 1.81600 | ν1 = 46.6 |
| R2 = 31.48 | D2 = 4.00 | | |
| R3 = −163.89 | D3 = 1.20 | N2 = 1.77250 | ν2 = 49.6 |
| R4 = 44.88 | D4 = 0.15 | | |
| R5 = 19.20 | D5 = 3.00 | N3 = 1.64769 | ν3 = 33.8 |
| R6 = 34.68 | D6 = Variable | | |
| R7 = 87.36 | D7 = 2.80 | N4 = 1.49700 | ν4 = 81.6 |
| R8 = −34.28 | D8 = 0.15 | | |
| R9 = 33.44 | D9 = 1.80 | N5 = 1.49700 | ν5 = 81.6 |
| R10 = 87.98 | D10 = 0.15 | | |
| R11 = 12.07 | D11 = 3.00 | N6 = 1.49700 | ν6 = 81.6 |
| R12 = 25.37 | D12 = 3.00 | | |
| R13 = Stop | D13 = 0.80 | | |
| R14 = −85.21 | D14 = 2.00 | N7 = 1.83400 | ν7 = 37.2 |

-continued

| | | | |
|---|---|---|---|
| R15 = 14.01 | D15 = 0.61 | | |
| R16 = 21.22 | D16 = 2.60 | N8 = 1.56732 | ν8 = 42.8 |
| R17 = −29.97 | D17 = Variable | | |
| R18 = −25.51 | D18 = 2.70 | N9 = 1.64769 | ν9 = 33.8 |
| R19 = −14.95 | D19 = 2.87 | | |
| R20 = −14.06 | D20 = 1.20 | N10 = 1.80400 | ν10 = 46.6 |
| R21 = −26.35 | D21 = 1.72 | | |
| R22 = −14.17 | D22 = 1.20 | N11 = 1.69680 | ν11 = 55.5 |
| R23 = −23.08 | | | |

| Variable separation | Focal length | | |
|---|---|---|---|
| | 36.26 | 76.19 | 133.00 |
| D6 | 26.91 | 9.20 | 2.23 |
| D17 | 8.53 | 3.85 | 0.86 |

R5: Aspheric
A = 0
B = −1.67165 × $10^{-5}$
C = −2.59916 × $10^{-8}$
D = −1.86464 × $10^{-10}$
E = 2.69112 × $10^{-13}$ Numerical Example 3: (FIGS. 3, 7(A), 7(B) and 7(C))
F = 36.13−130.6  FNo = 1:3.6−8.1  2ω 61.8°−18.8°

| | | | |
|---|---|---|---|
| R1 = 75.20 | D1 = 1.30 | N1 = 1.81600 | ν1 = 46.6 |
| R2 = 32.04 | D2 = 3.70 | | |
| R3 = −183.91 | D3 = 1.30 | N2 = 1.77250 | ν2 = 49.6 |
| R4 = 32.19 | D4 = 0.15 | | |
| R5 = 19.70 | D5 = 3.60 | N3 = 1.58347 | ν3 = 30.2 |
| R6 = 105.20 | D6 = Variable | | |
| R7 = 289.44 | D7 = 2.85 | N4 = 1.49700 | ν4 = 81.6 |
| R8 = −31.11 | D8 = 0.16 | | |
| R9 = 27.68 | D9 = 3.06 | N5 = 1.48749 | ν5 = 70.2 |
| R10 = −122.87 | D10 = 1.02 | N6 = 1.84666 | ν6 = 23.9 |
| R11 = 153.05 | D11 = 0.15 | | |
| R12 = 13.13 | D12 = 2.70 | N7 = 1.60311 | ν7 = 60.7 |
| R13 = 26.31 | D13 = 3.00 | | |
| R14 = Stop | D14 = 0.70 | | |
| R15 = −167.10 | D15 = 2.04 | N8 = 1.83400 | ν8 = 37.2 |
| R16 = 14.07 | D16 = 1.22 | | |
| R17 = 26.97 | D17 = 2.60 | N9 = 1.62606 | ν9 = 39.2 |
| R18 = −33.53 | D18 = Variable | | |
| R19 = −28.69 | D19 = 2.70 | N10 = 1.59270 | ν10 = 35.3 |
| R20 = −16.21 | D20 = 3.70 | | |
| R21 = −15.48 | D21 = 1.20 | N11 = 1.69680 | ν11 = 55.5 |
| R22 = −26.35 | D22 = 1.34 | | |
| R23 = −16.62 | D23 = 1.20 | N12 = 1.69680 | ν12 = 55.5 |
| R24 = −39.59 | | | |

| Variable separation | Focal length | | |
|---|---|---|---|
| | 33.13 | 76.09 | 130.60 |
| D6 | 22.69 | 7.04 | 1.16 |
| D18 | 8.82 | 4.14 | 1.16 |

R5: Aspheric
A = 0
B = −1.96935 × $10^{-5}$
C = −4.2762 × $10^{-8}$
D = −2.11643 × $10^{-11}$
E = −1.02294 × $10^{-13}$ Numerical Example 4: (FIGS. 4, 8(A), 8(B) and 8(C))
F = 36.13−130.6  FNo = 1:3.6−8.1  2ω = 61.8°−18.8°

| | | | |
|---|---|---|---|
| R1 = 54.79 | D1 = 1.30 | N1 = 1.77250 | ν1 = 49.6 |
| R2 = 31.74 | D2 = 3.70 | | |
| R3 = −134.69 | D3 = 1.30 | N2 = 1.77250 | ν2 = 49.6 |
| R4 = 28.67 | D4 = 0.15 | | |
| R5 = 18.26 | D5 = 4.00 | N3 = 1.58347 | ν3 = 30.2 |
| R6 = 86.80 | D6 = Variable | | |
| R7 = 272.00 | D7 = 2.85 | N4 = 1.49700 | ν4 = 81.6 |
| R8 = −30.92 | D8 = 0.16 | | |
| R9 = 44.19 | D9 = 3.06 | N5 = 1.51742 | ν5 = 52.4 |
| R10 = −42.15 | D10 = 1.02 | N6 = 1.84666 | ν6 = 23.9 |
| R11 = −301.92 | D11 = 0.15 | | |
| R12 = 13.37 | D12 = 2.70 | N7 = 1.61700 | ν7 = 62.8 |
| R13 = 31.74 | D13 = 3.00 | | |
| R14 = Stop | D14 = 0.70 | | |
| R15 = −107.11 | D15 = 2.04 | N8 = 1.83400 | ν8 = 37.2 |
| R16 = 14.89 | D16 = 1.22 | | |
| R17 = 31.32 | D17 = 2.60 | N9 = 1.62045 | ν9 = 38.1 |
| R18 = −28.74 | D18 = Variable | | |
| R19 = −41.58 | D19 = 3.00 | N10 = 1.59270 | ν10 = 35.3 |

-continued

| | | | |
|---|---|---|---|
| R20 = −17.65 | D20 = 3.27 | | |
| R21 = −16.61 | D21 = 1.20 | N11 = 1.72916 | ν11 = 54.7 |
| R22 = −70.11 | D22 = 3.27 | | |
| R23 = −15.01 | D23 = 1.20 | N12 = 1.48749 | ν12 = 70.2 |
| R24 = −24.63 | | | |

| Variable separation | Focal length | | |
|---|---|---|---|
| | 36.13 | 76.09 | 130.60 |
| D6 | 22.81 | 7.15 | 1.27 |
| D18 | 8.84 | 4.16 | 1.18 |

R5: Aspheric
A = 0
B = −2.00504 × $10^{-5}$
C = −5.8775 × $10^{-8}$
D = 7.79387 × $10^{-11}$
E = −5.00224 × $10^{-13}$

TABLE 1

| | Numerical examples | | | |
|---|---|---|---|---|
| Conditions | 1 | 2 | 3 | 4 |
| (1) S1w/S2w | 2.613 | 3.15 | 2.534 | 2.58 |
| (2) \|f3\|/FT | 0.32 | 0.314 | 0.32 | 0.32 |
| (3) FT/FW | 3.614 | 3.668 | 3.614 | 3.614 |
| (4) Lw/FT | 0.646 | 0.644 | 0.648 | 0.656 |
| (5) \|f1\|/FT | 0.409 | 0.439 | 0.409 | 0.4086 |
| (6) s/t | 0.883 | 0.885 | 0.883 | 0.8834 |

Next, the technique centered at focusing is explained.

Figure 9:
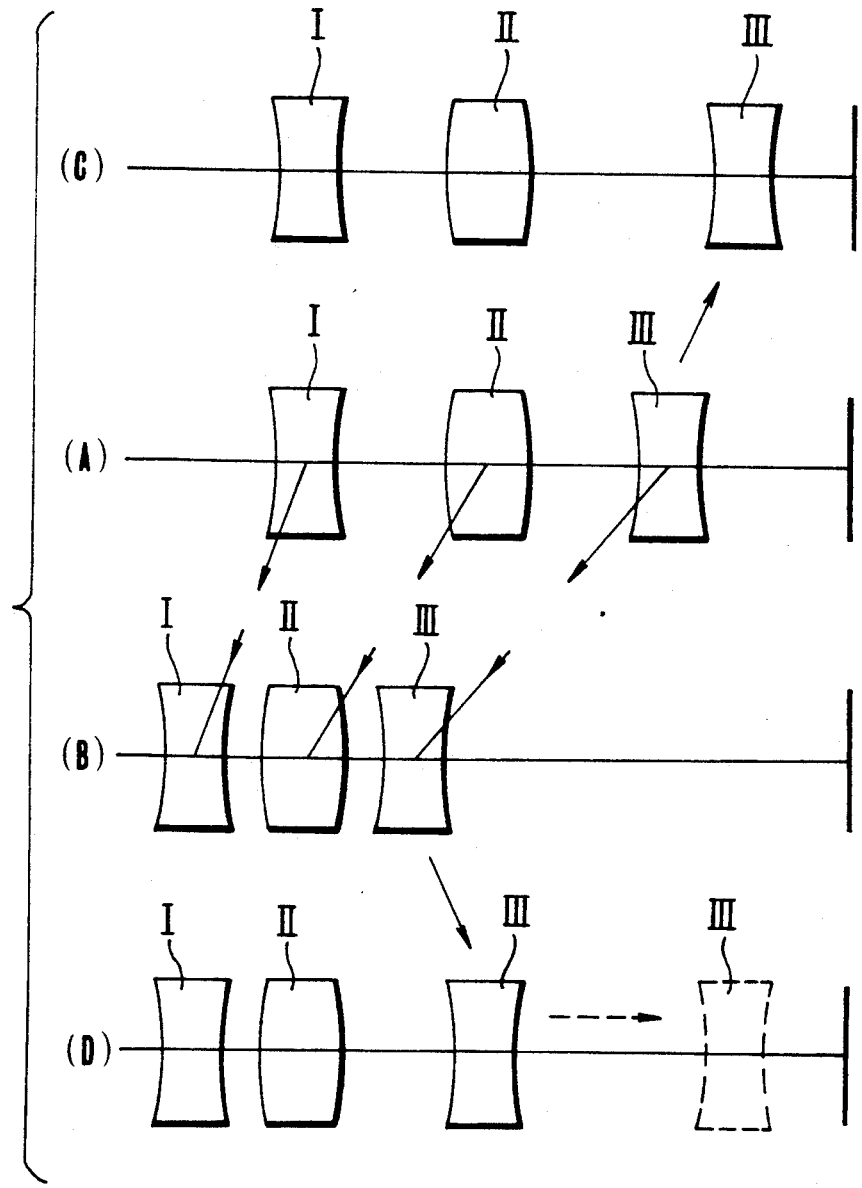
FIG. 9(A) and 9(B) is a diagram illustrating the loci of motion of the components of the zoom lens of the invention.
Figure 10:
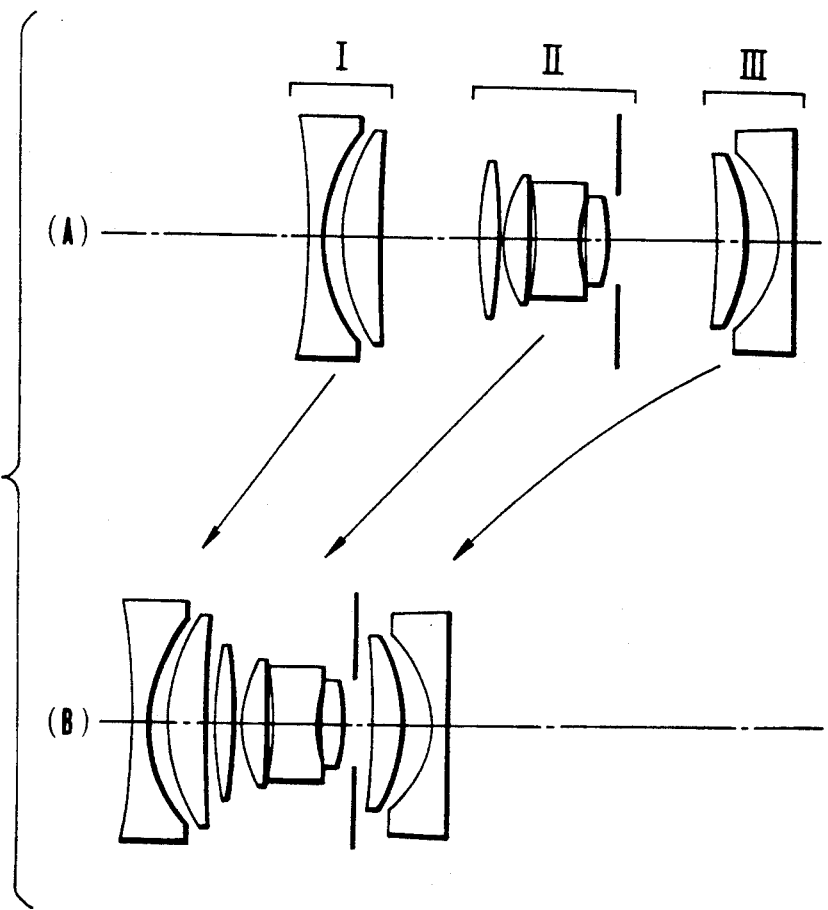
Figure 11:
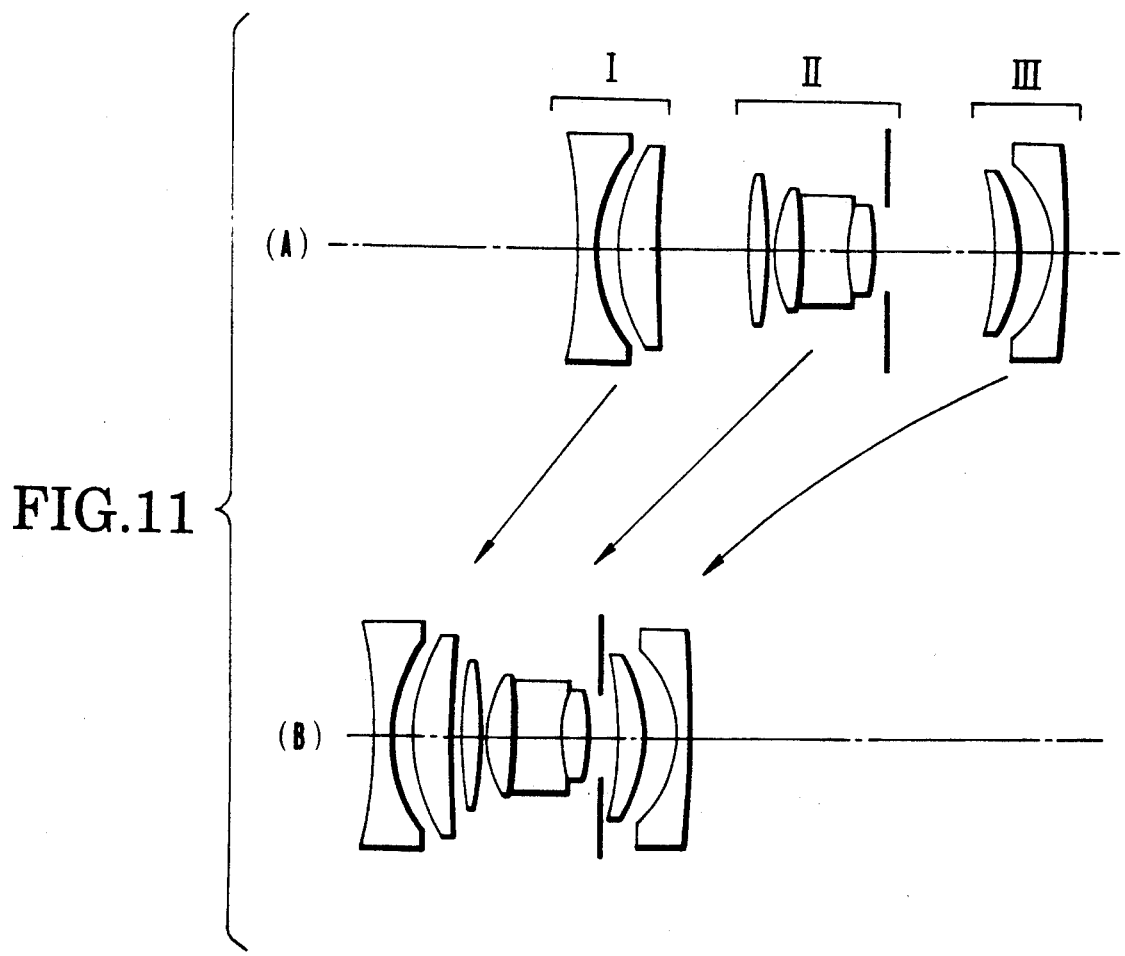
Figure 12:
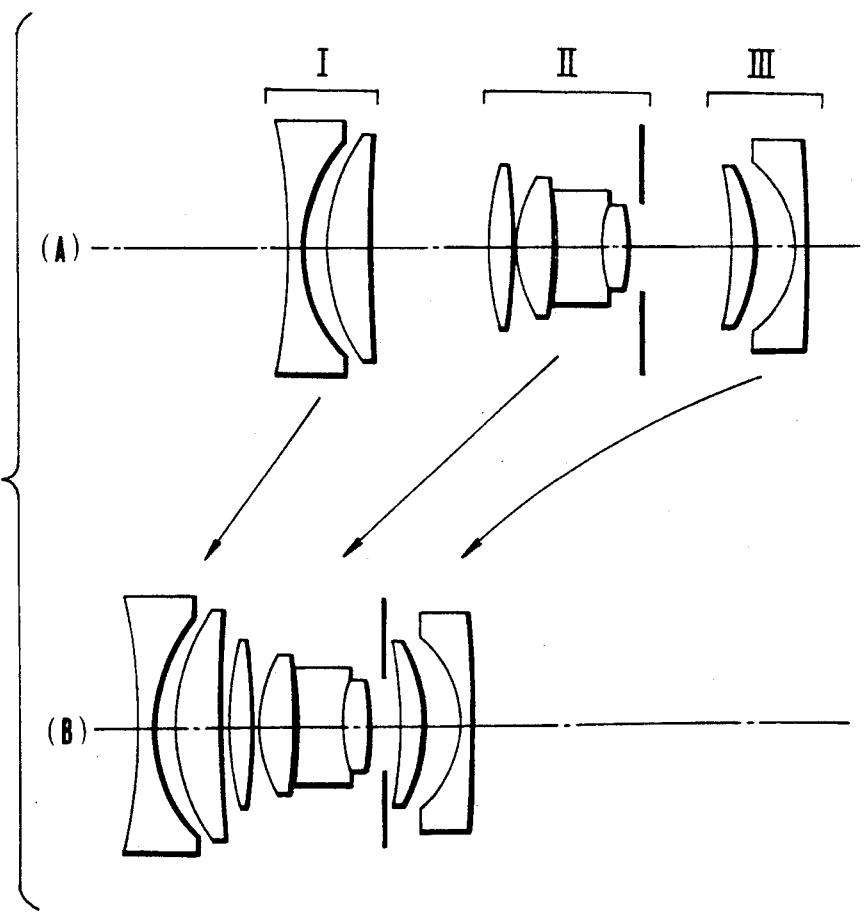
Figure 13:
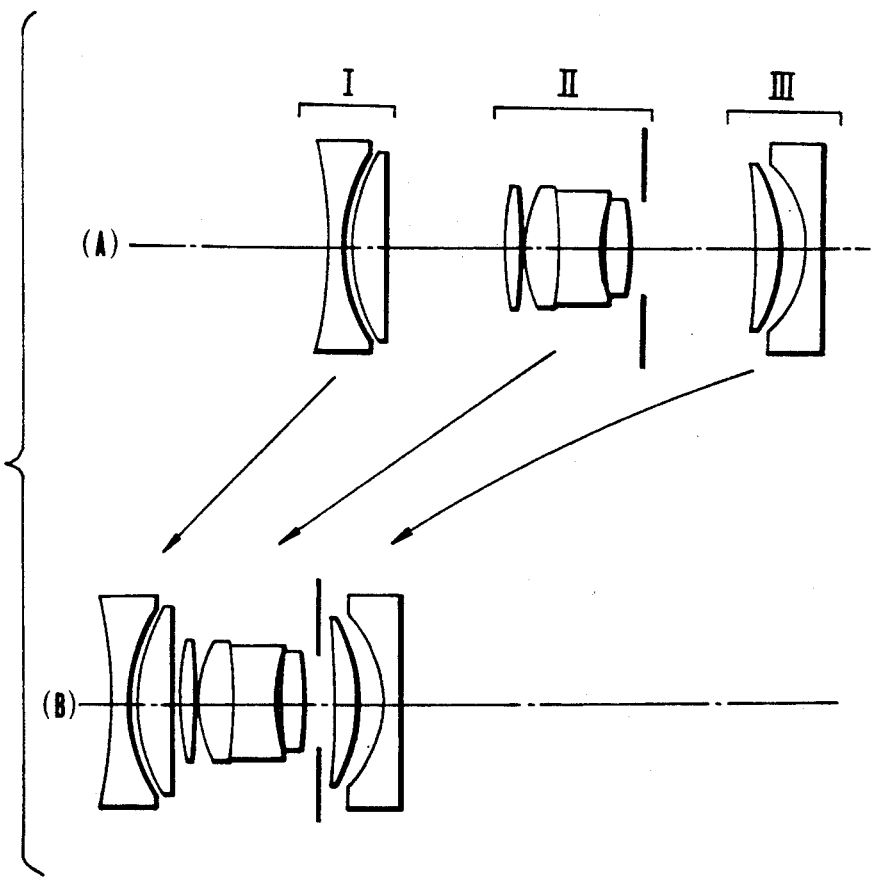
Figure 14A:
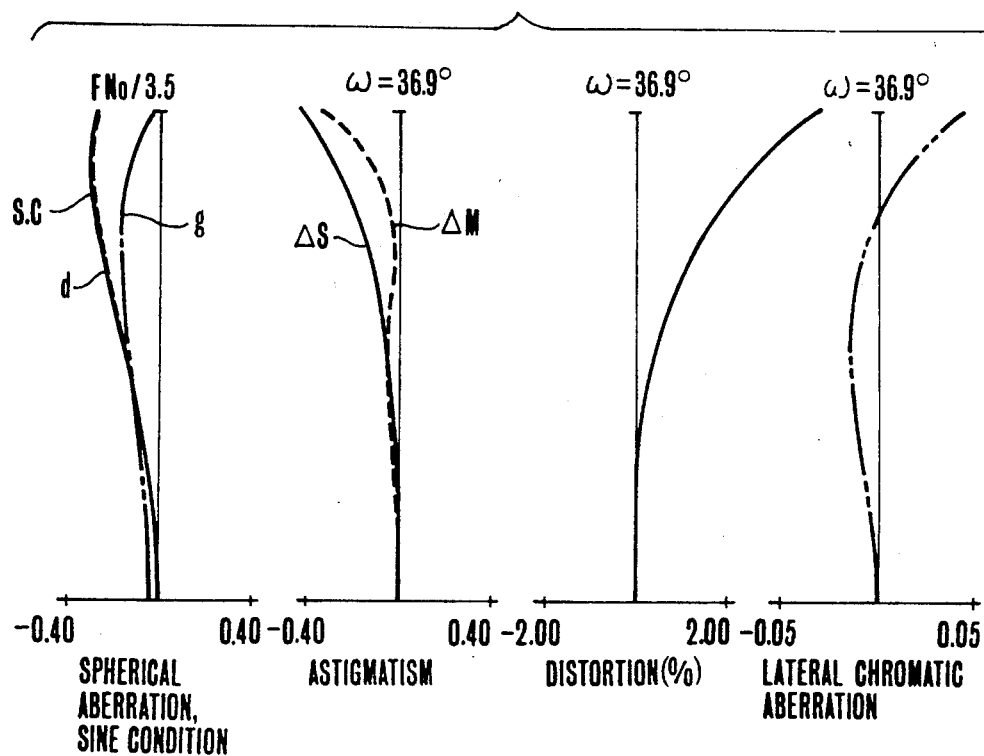
Figure 14B:
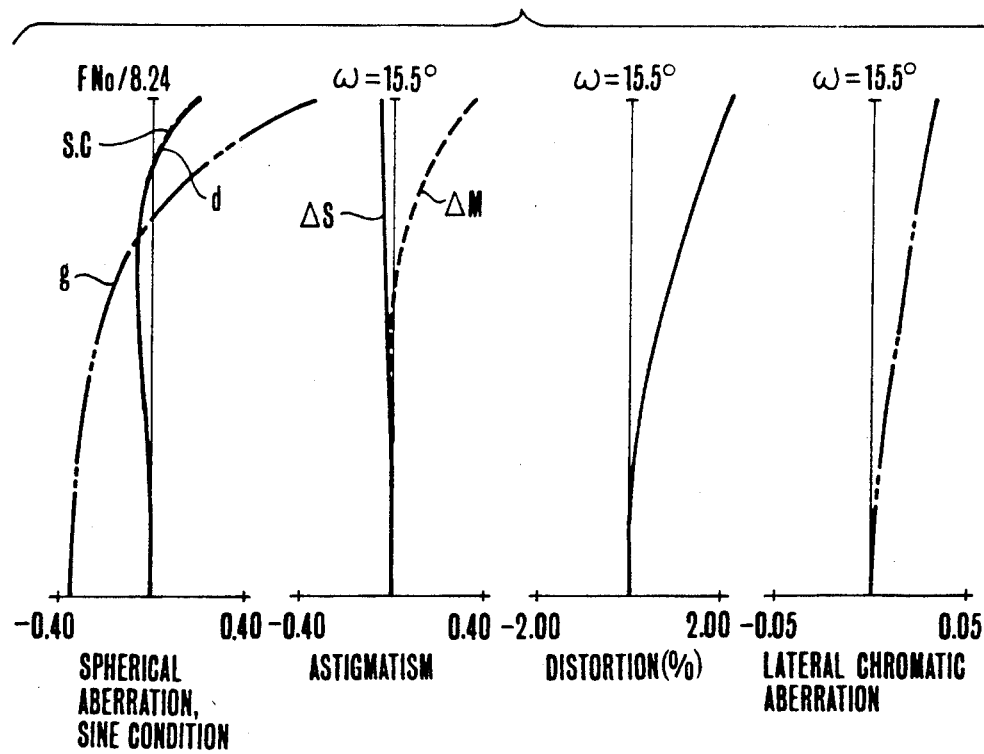
Figure 14C:
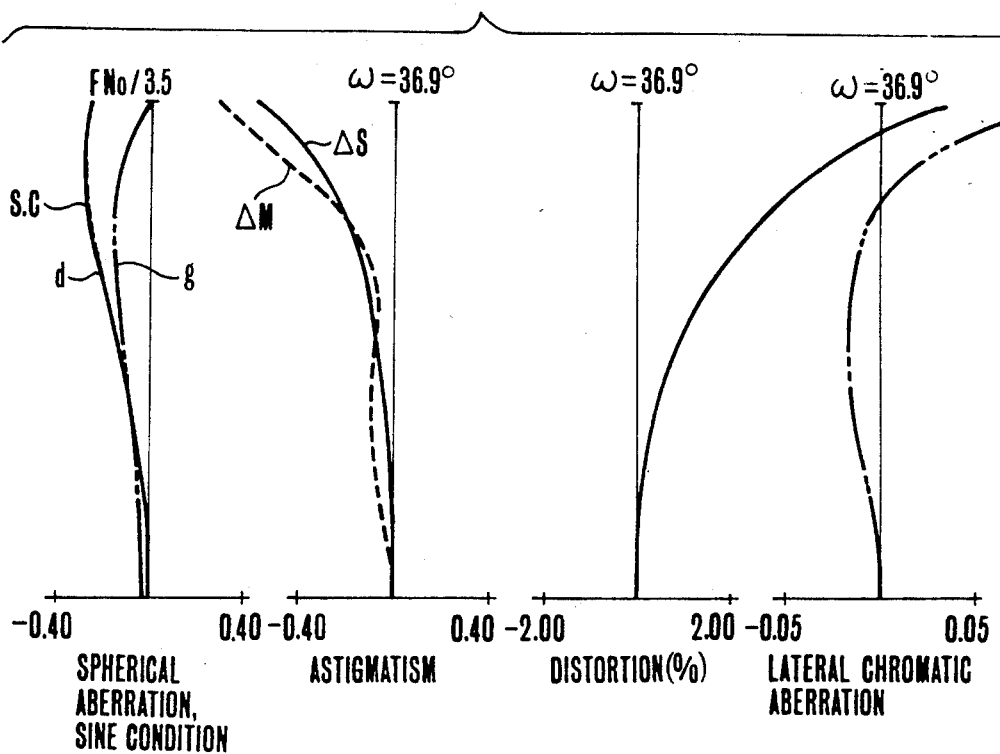
Figure 14D:
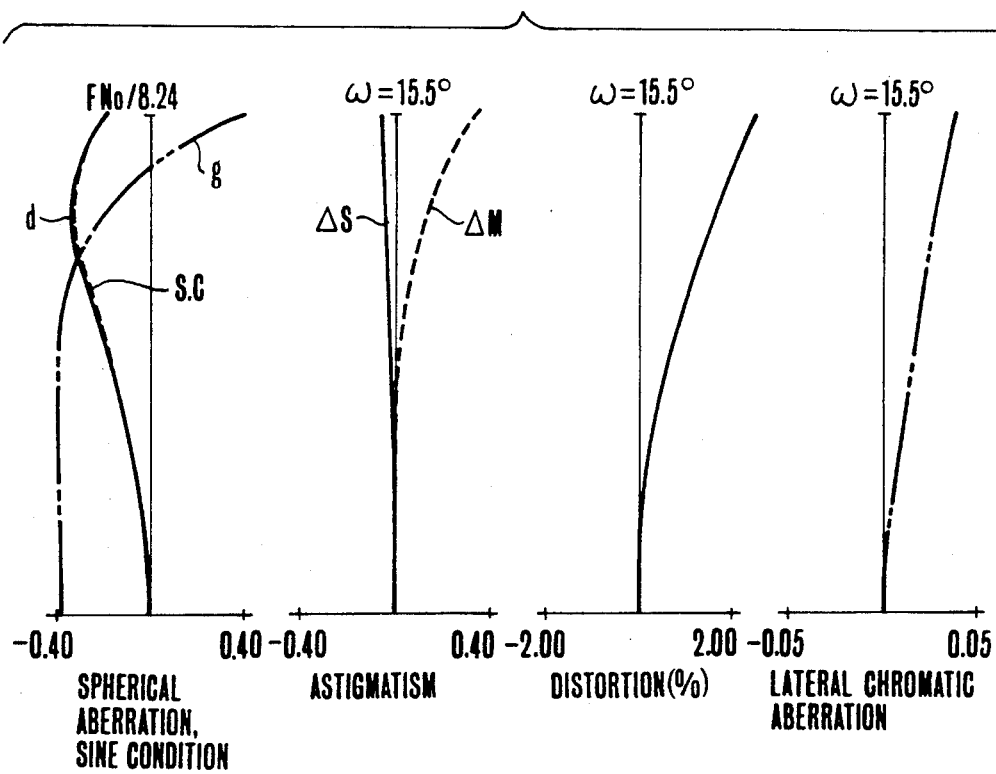
Figure 15A:
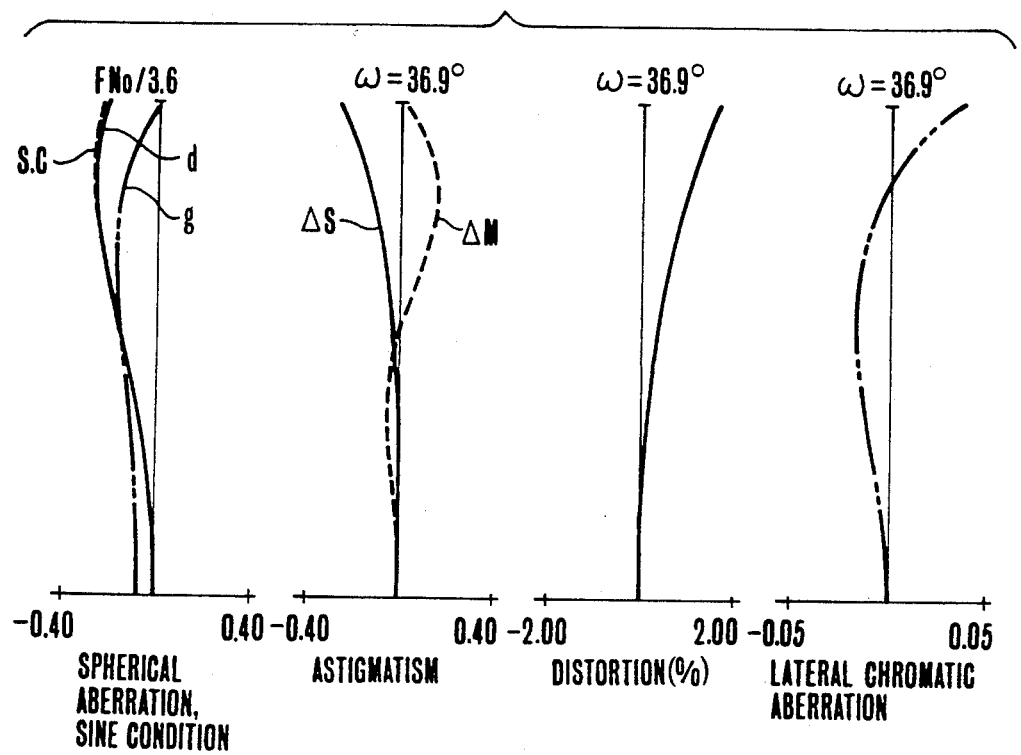
Figure 15B:
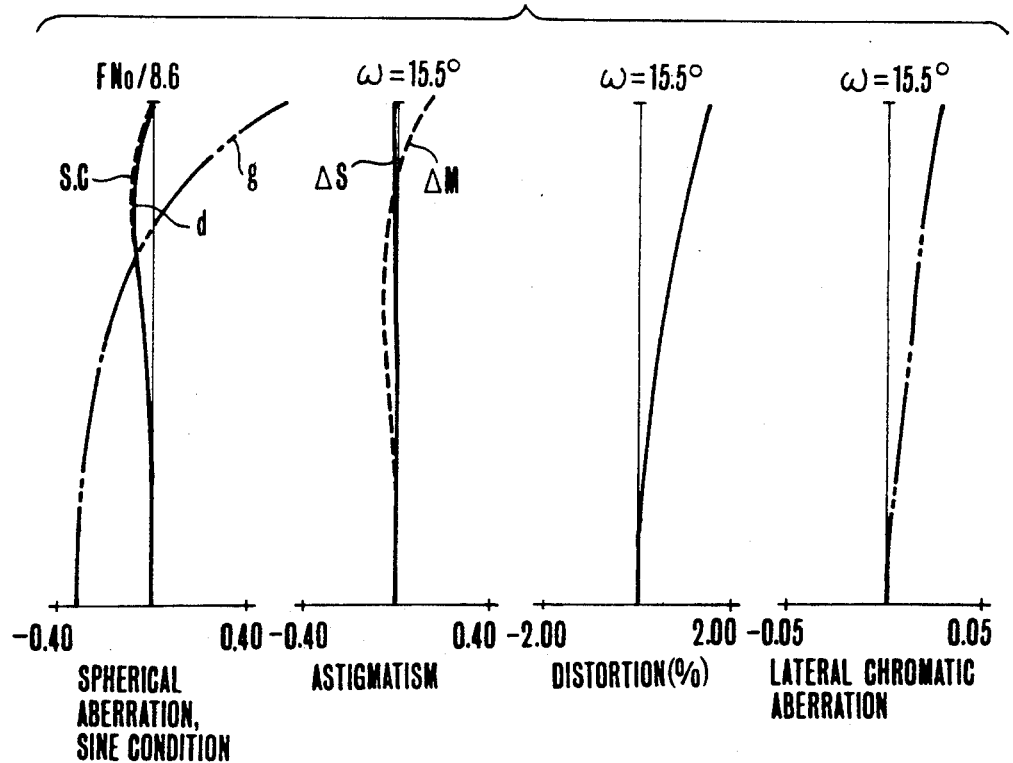
Figure 15C:
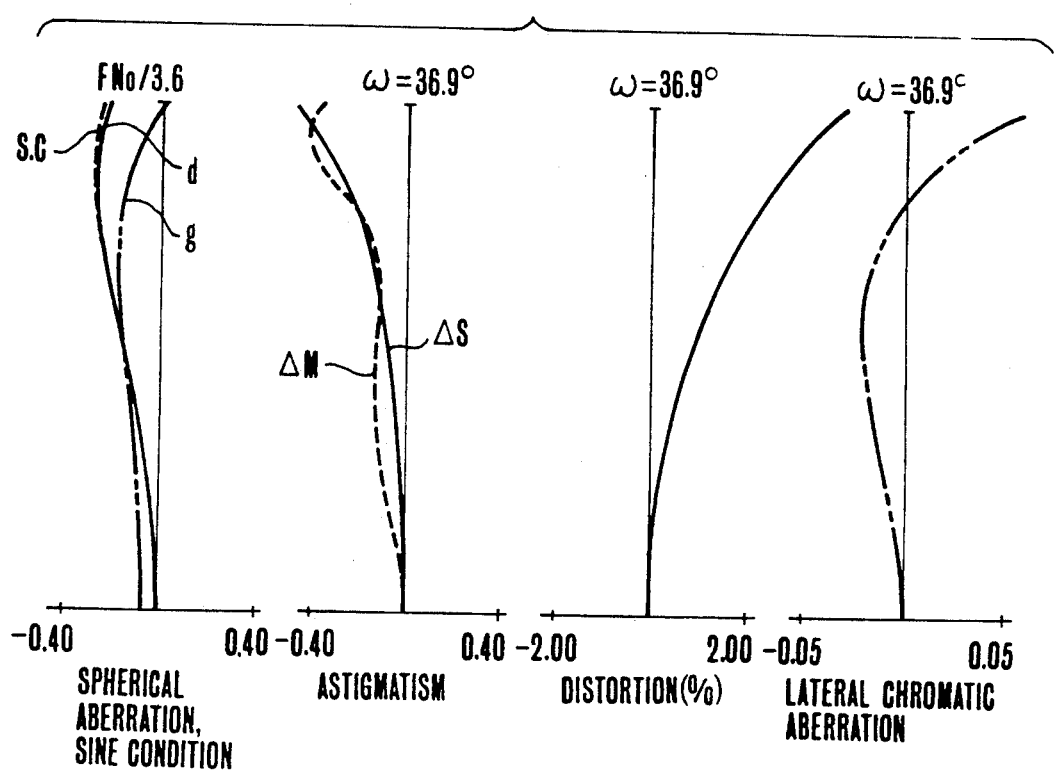
Figure 15D:
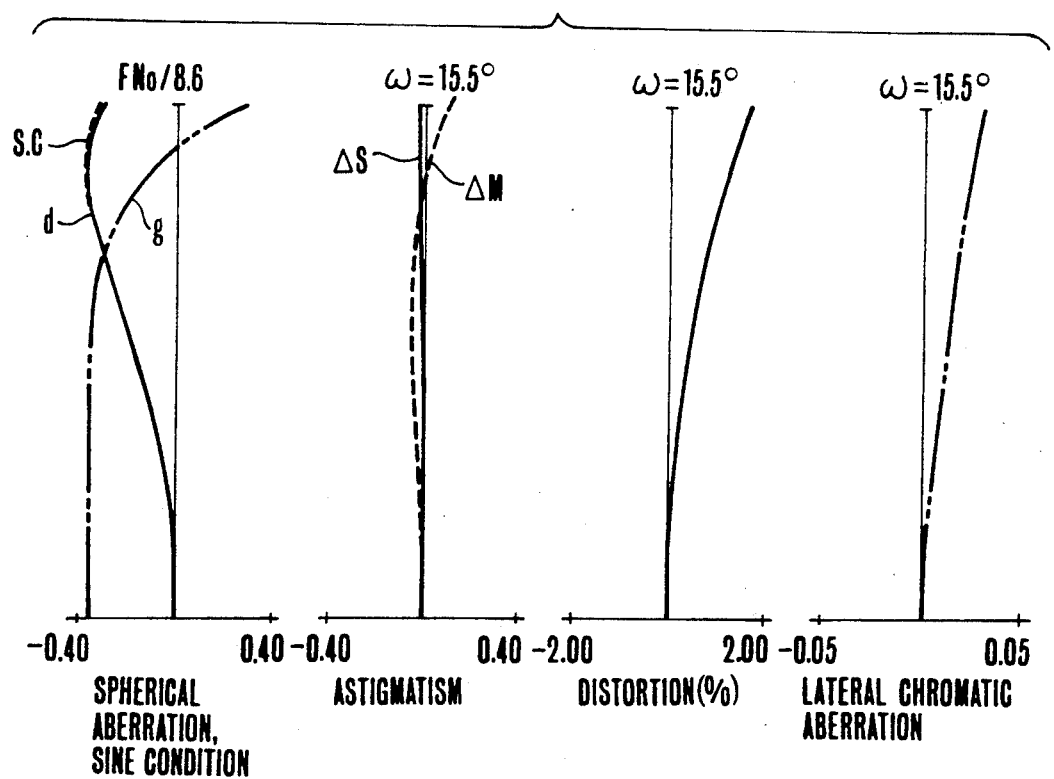
Figure 16C:
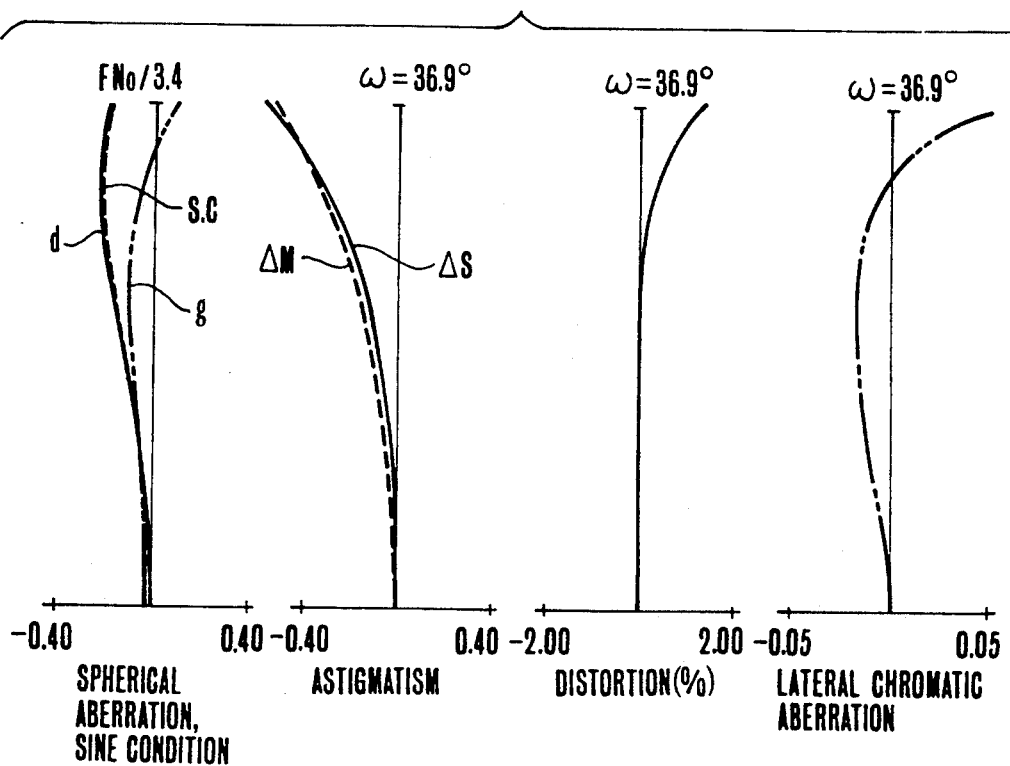
Figure 16D:
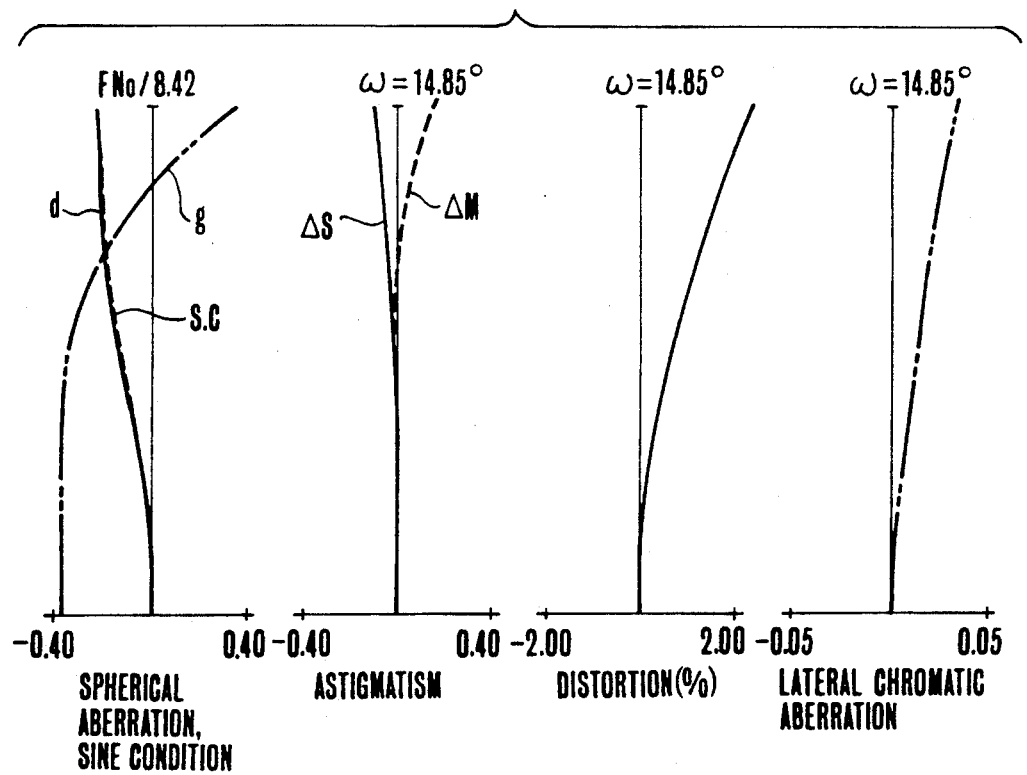
Figure 17A:
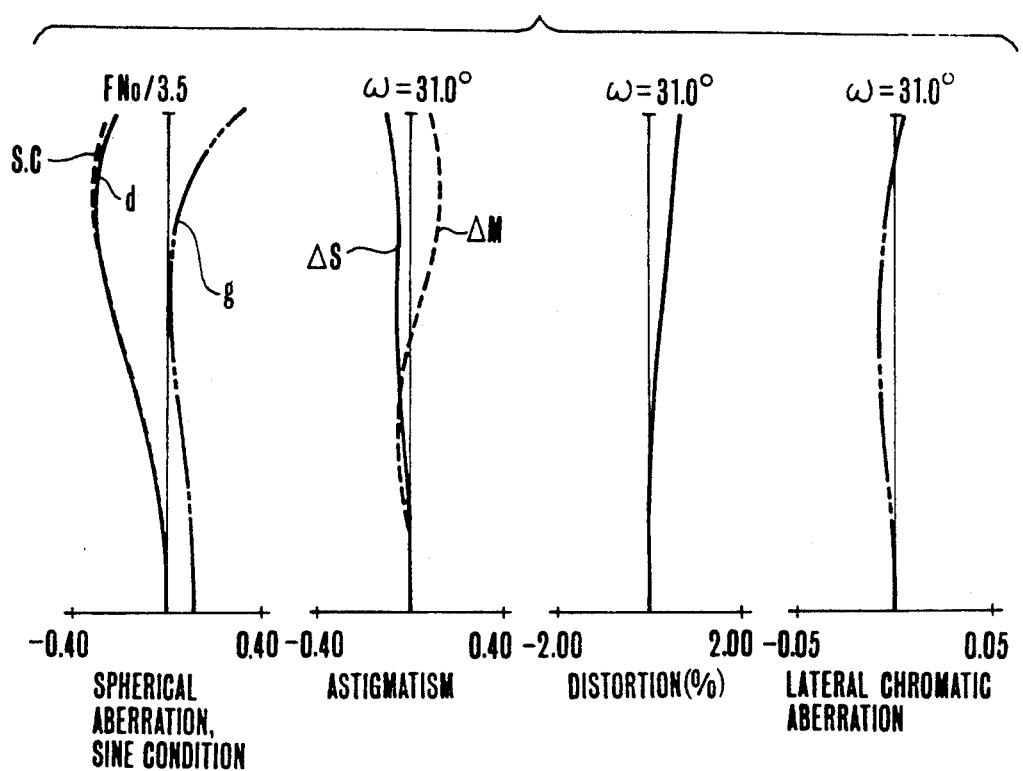
Figure 17B:
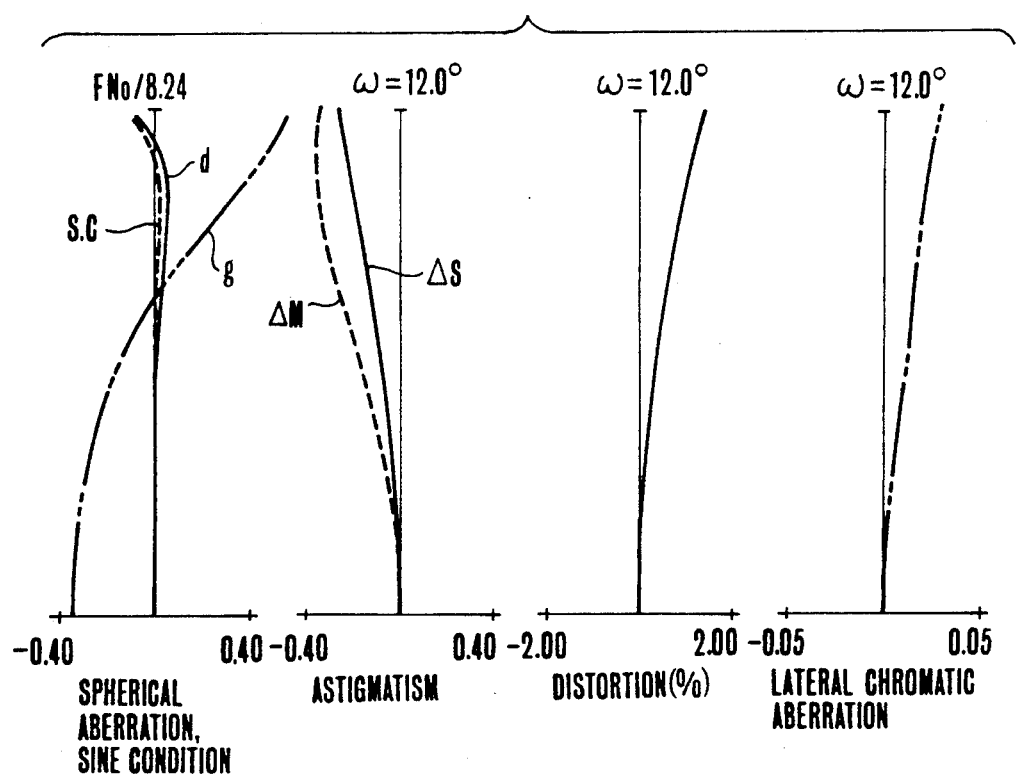
Figure 17C:
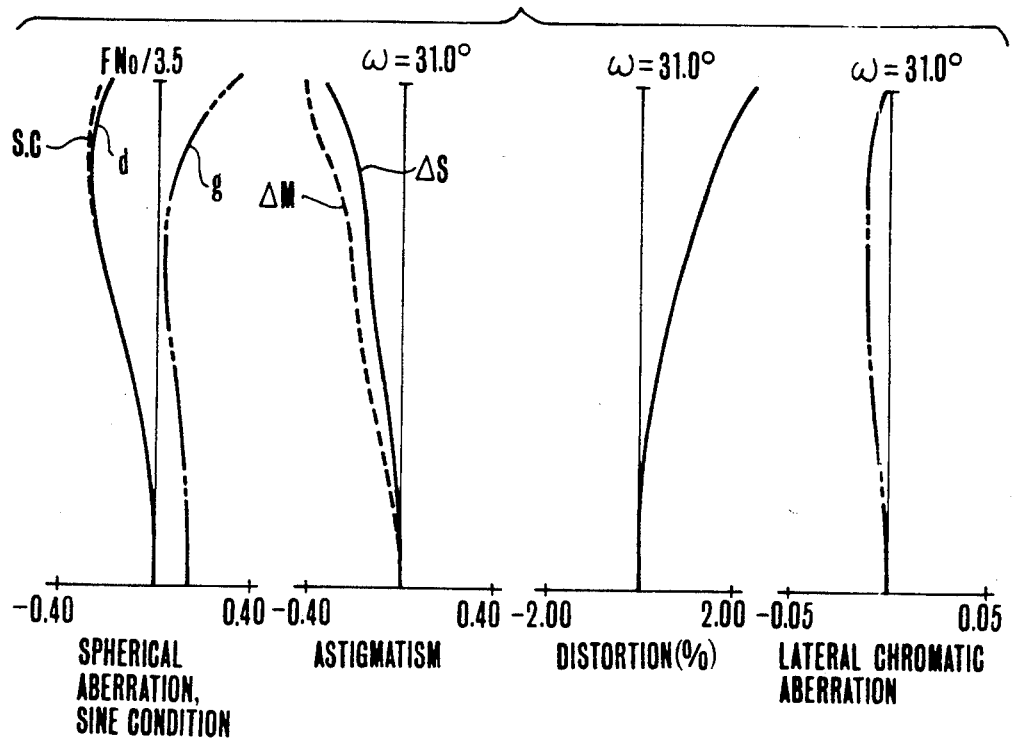
Figure 17D:
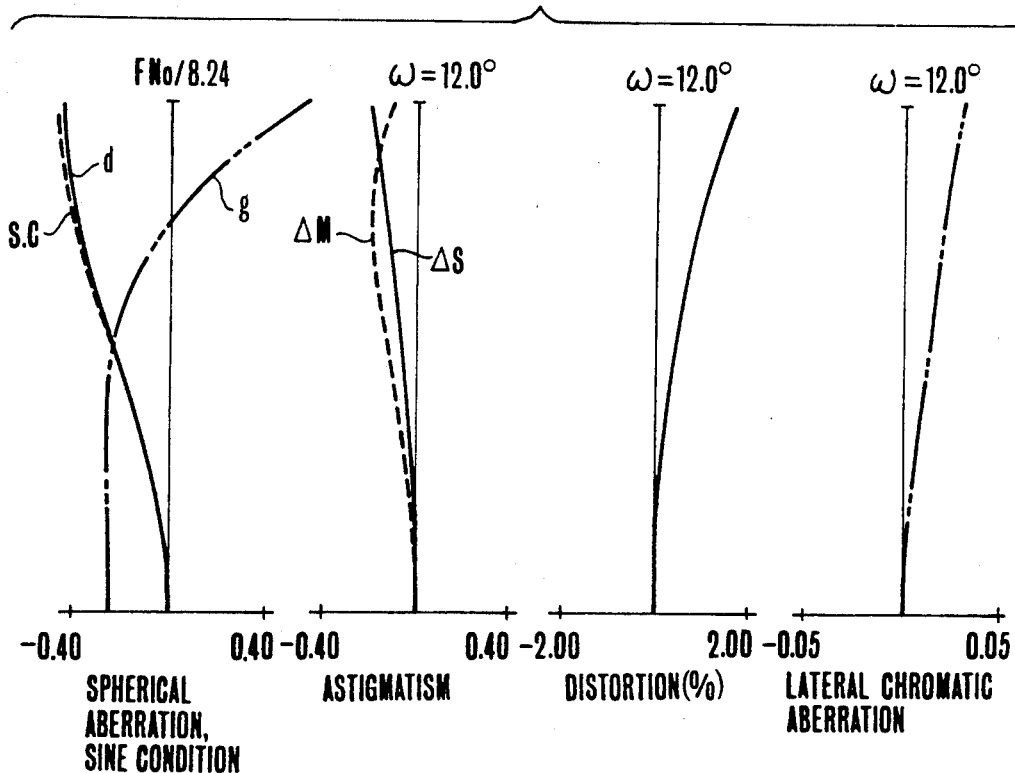
Figure 18:
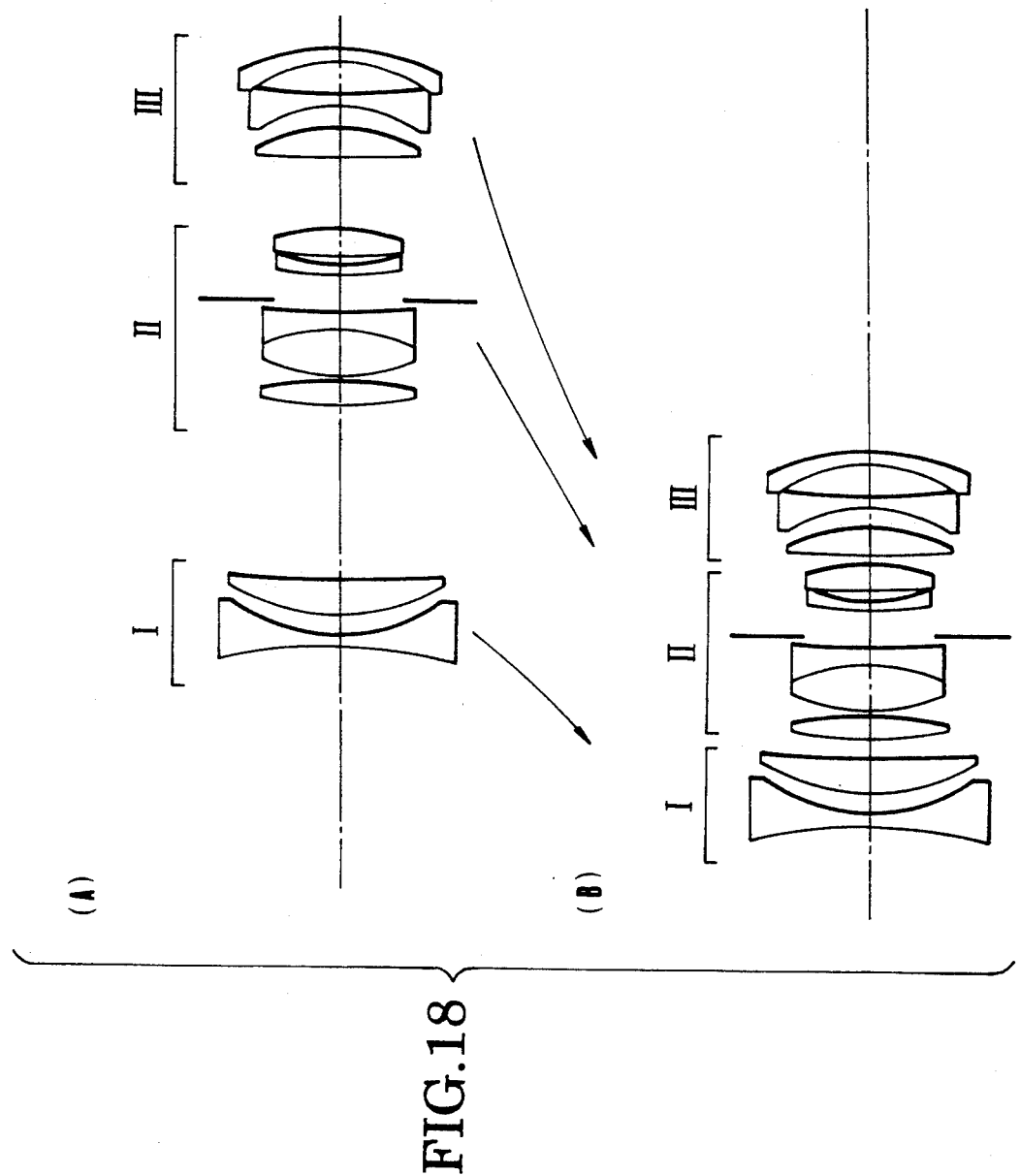
FIG. 18(A) and (E) to FIG. 26(A) and (B) are longitudinal section views of numerical examples 9 to 17 of zoom lenses respectively.
Figure 19:
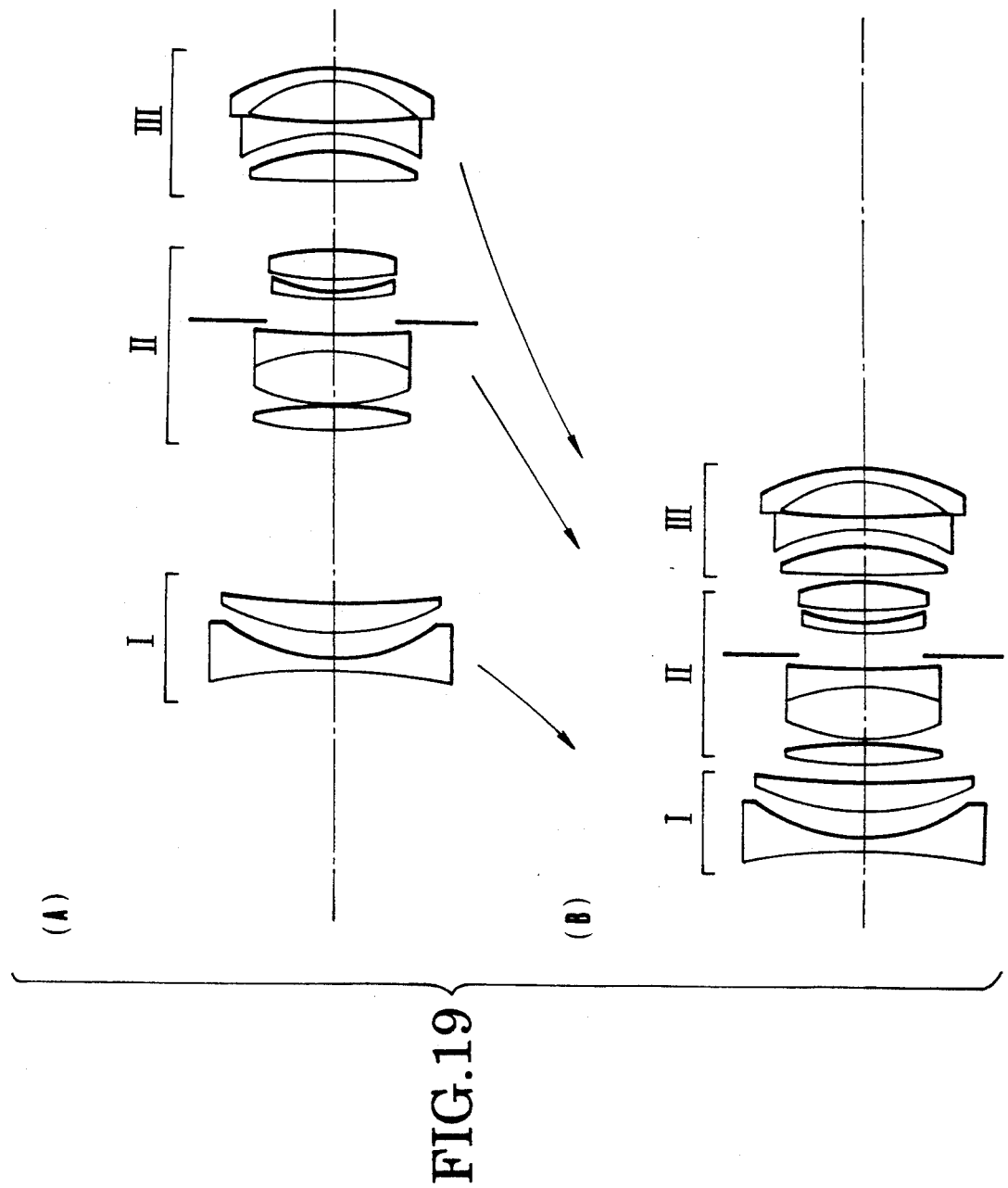
Figure 20:
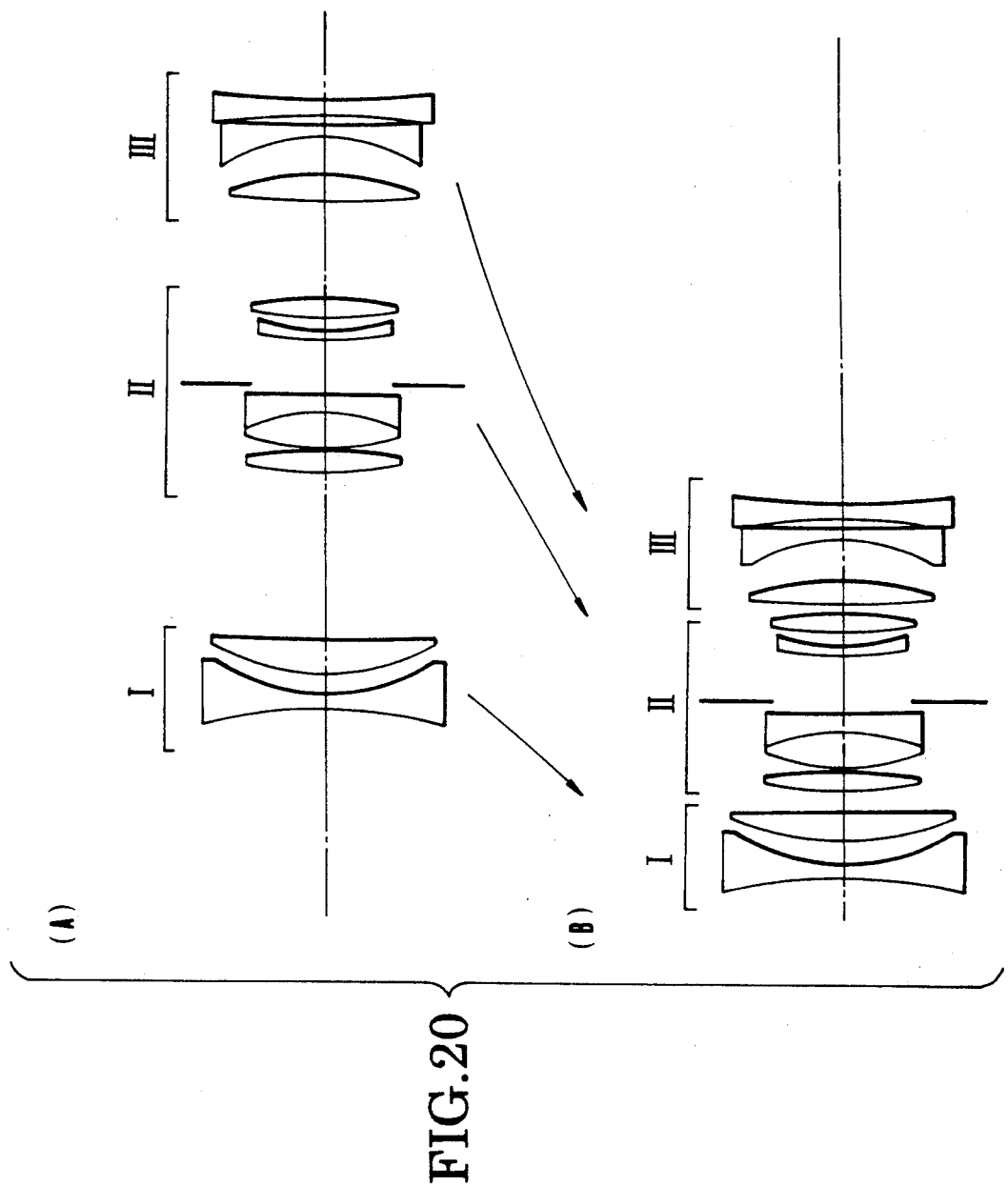
Figure 21:
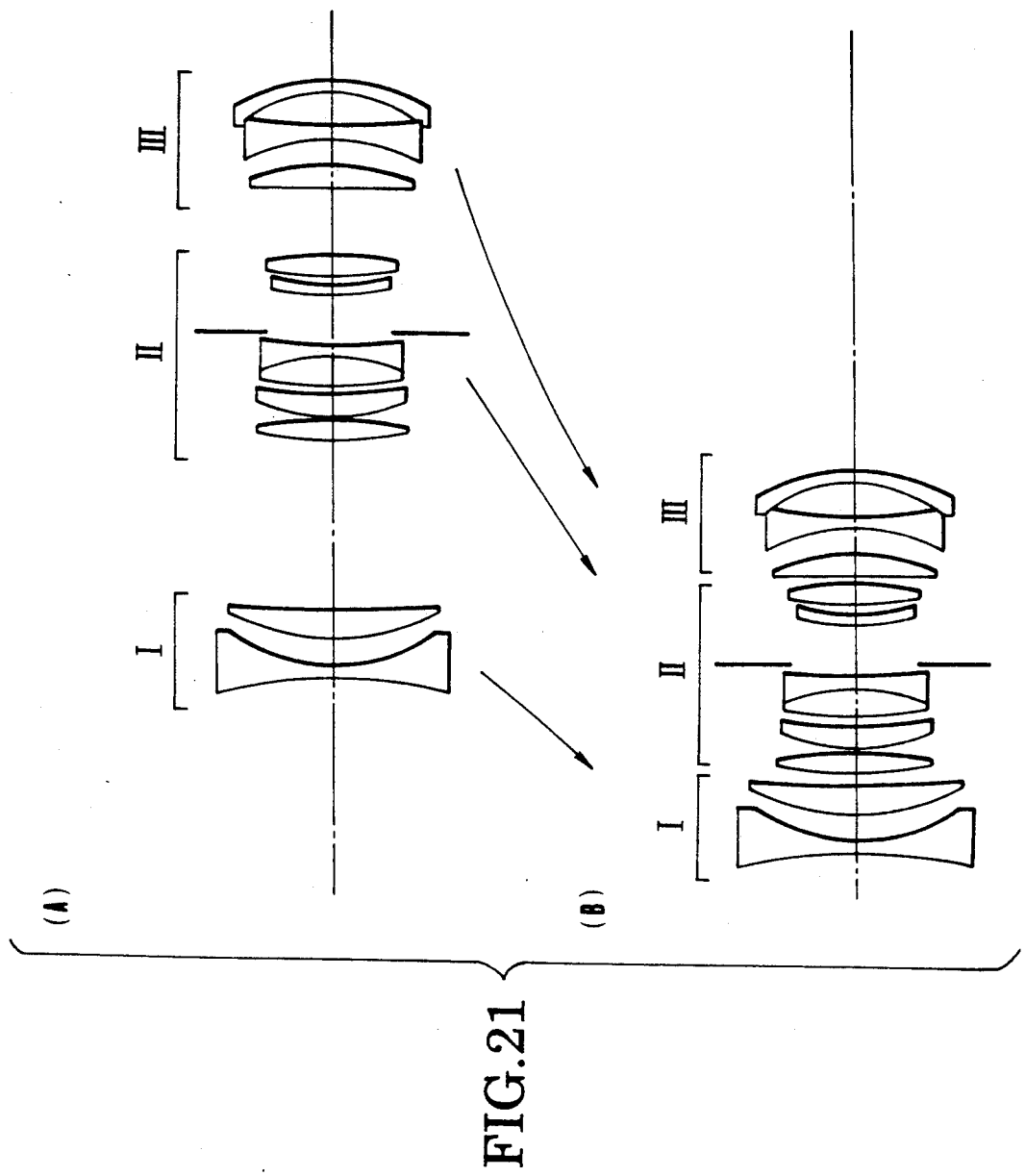
Figure 22:
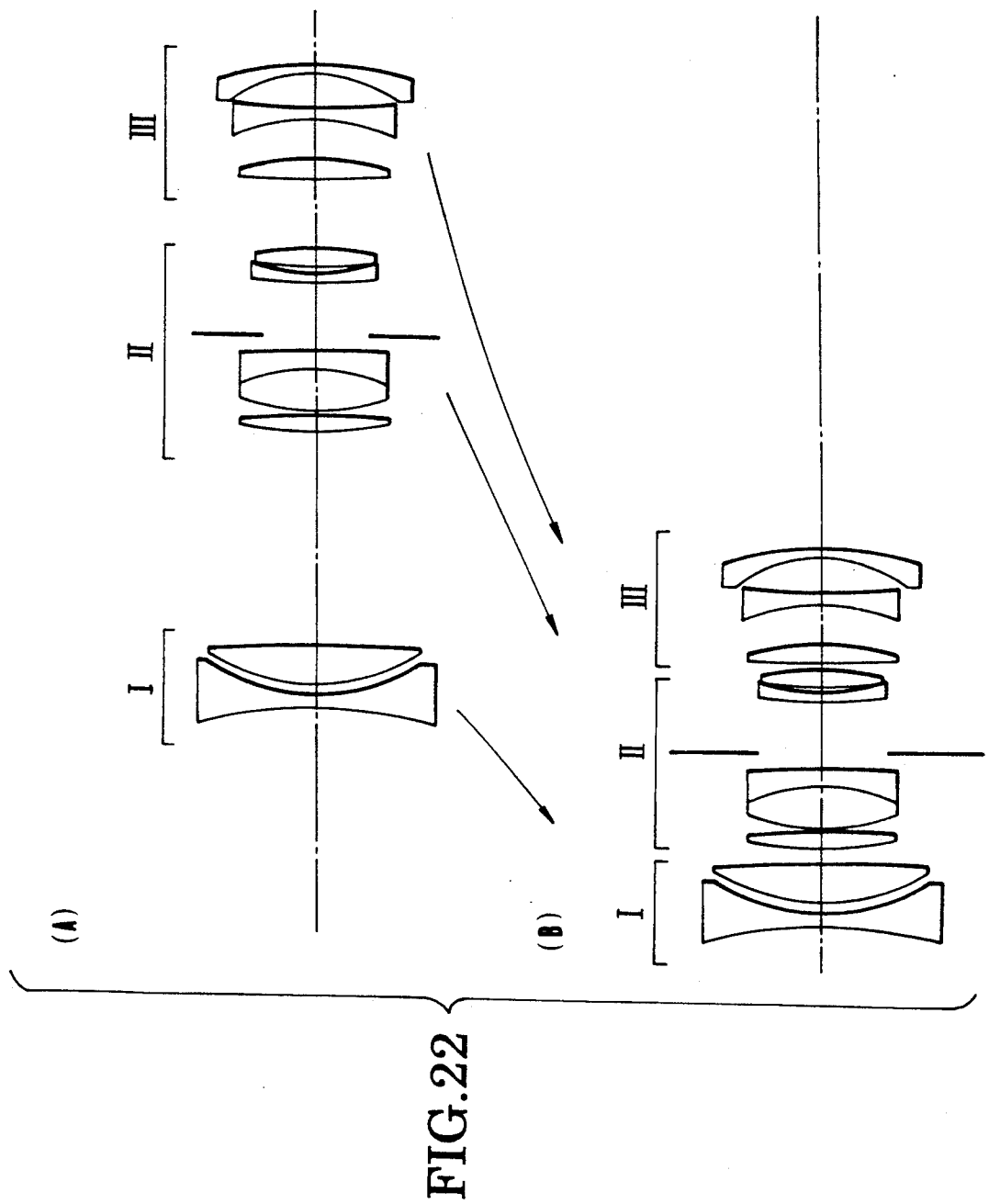
Figure 23:
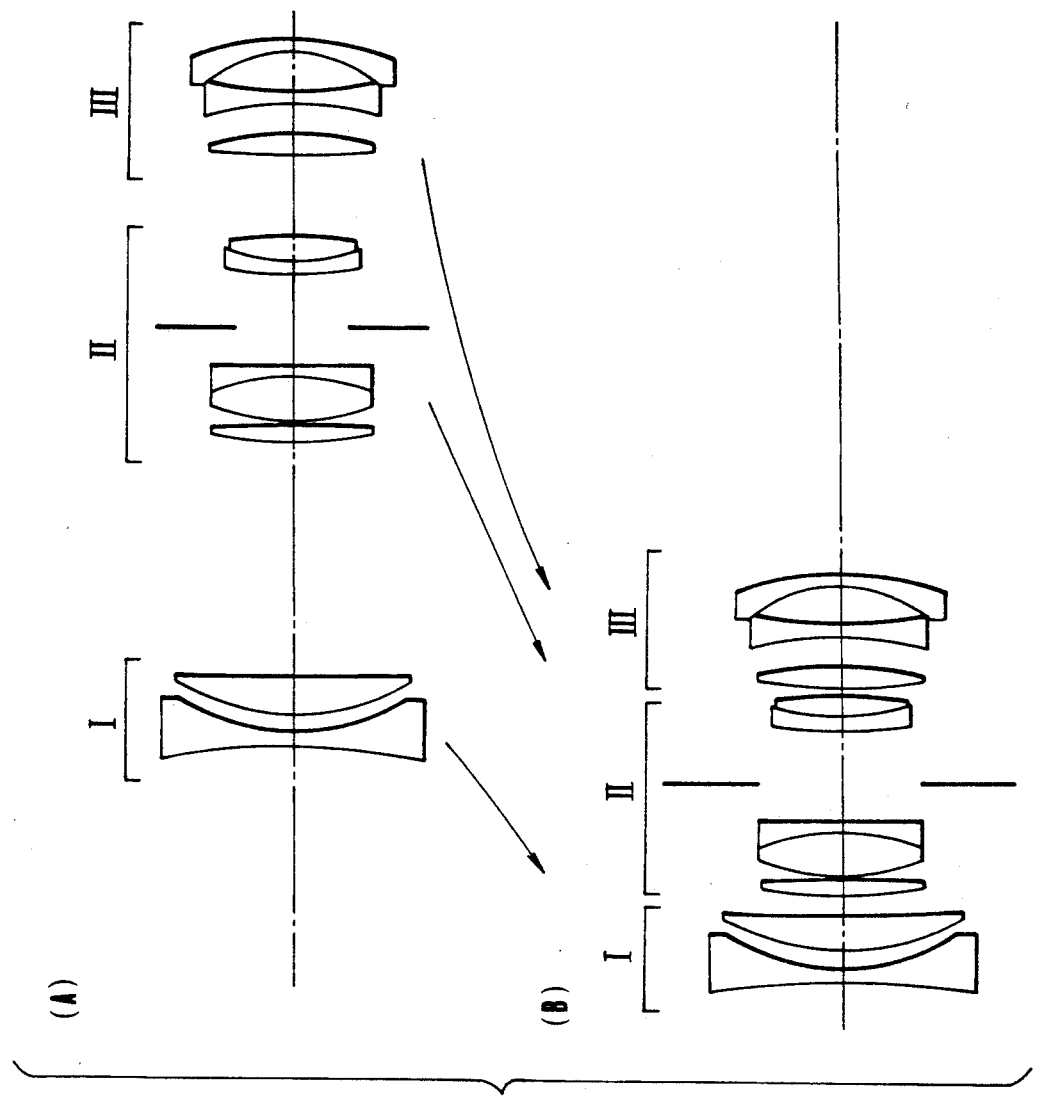
Figure 24:
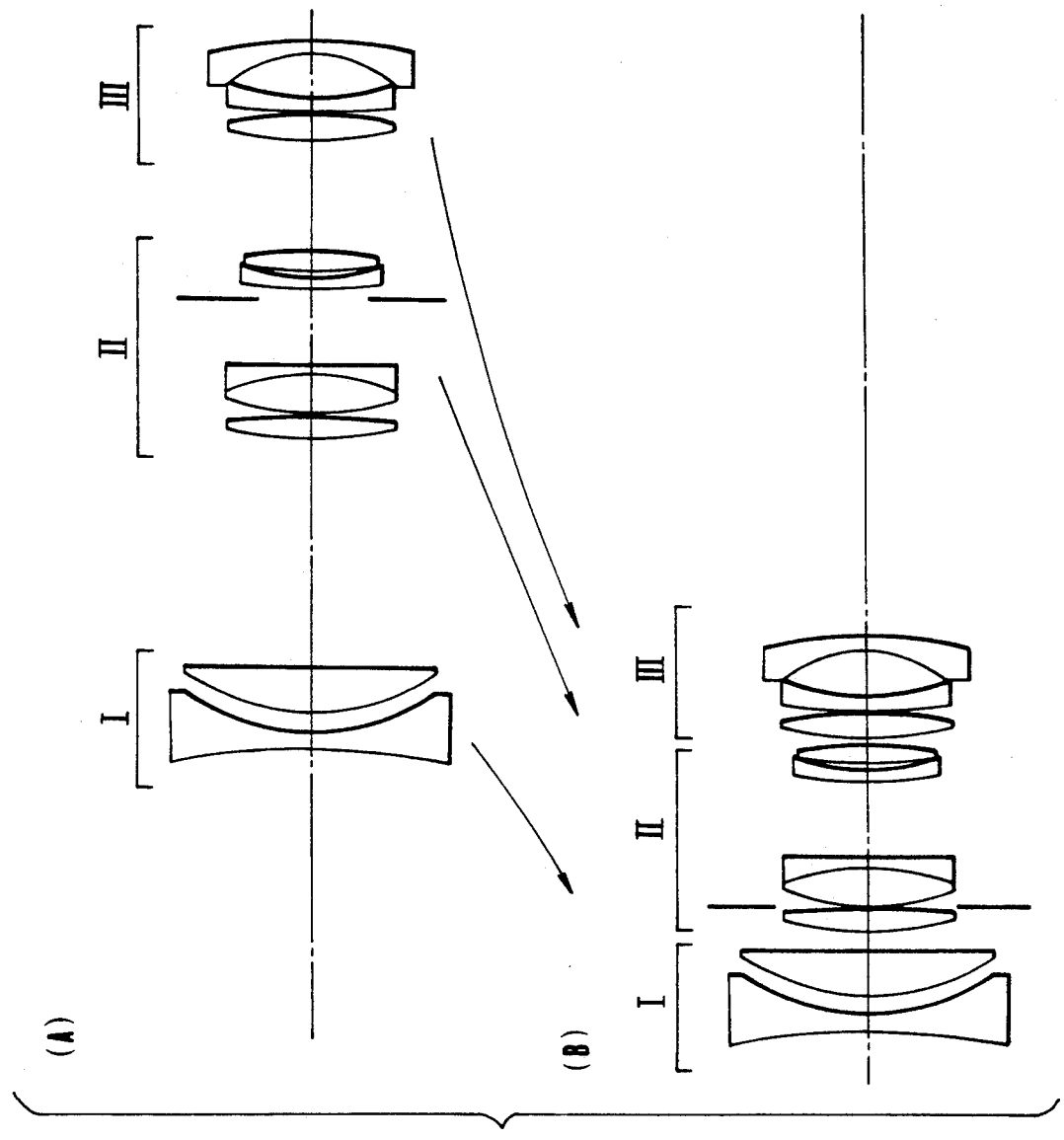
Figure 25:
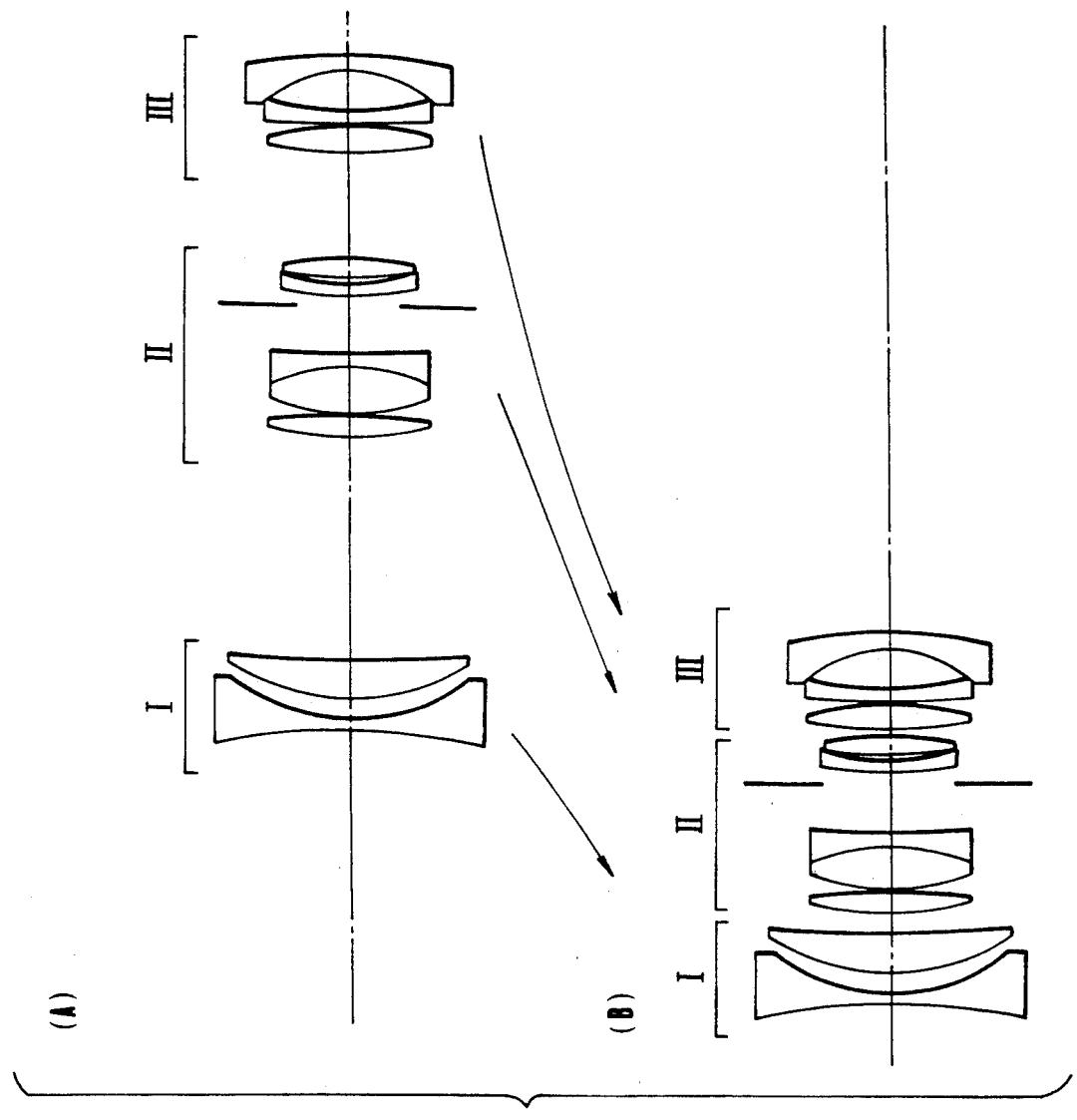
Figure 26:
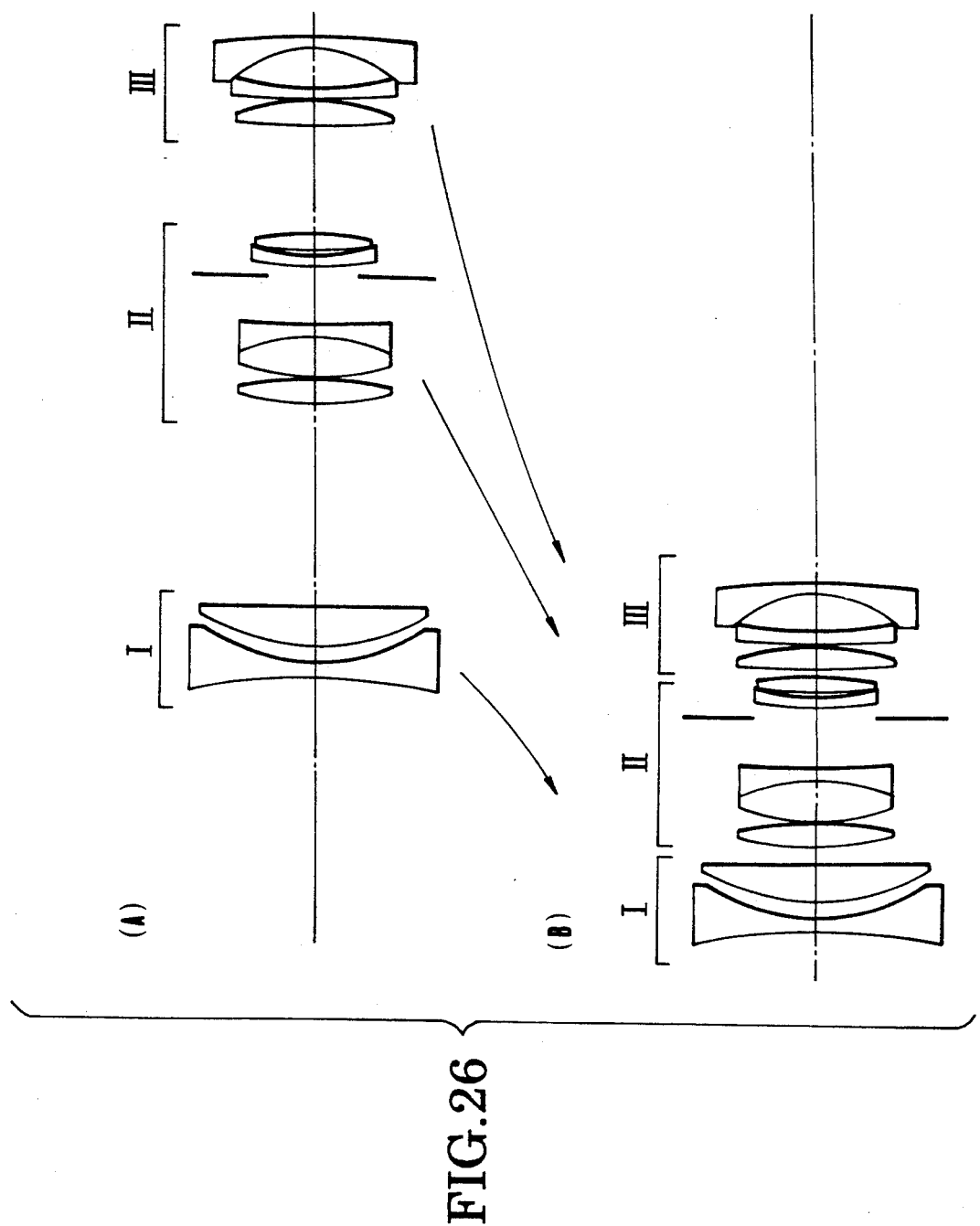
Figure 27A:
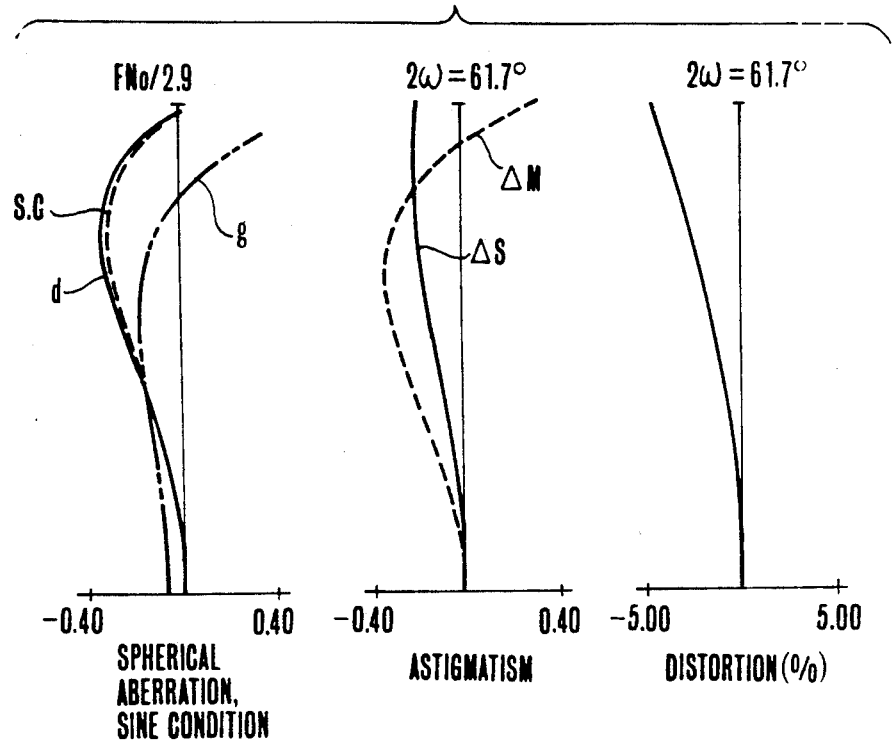
Figure 27B:
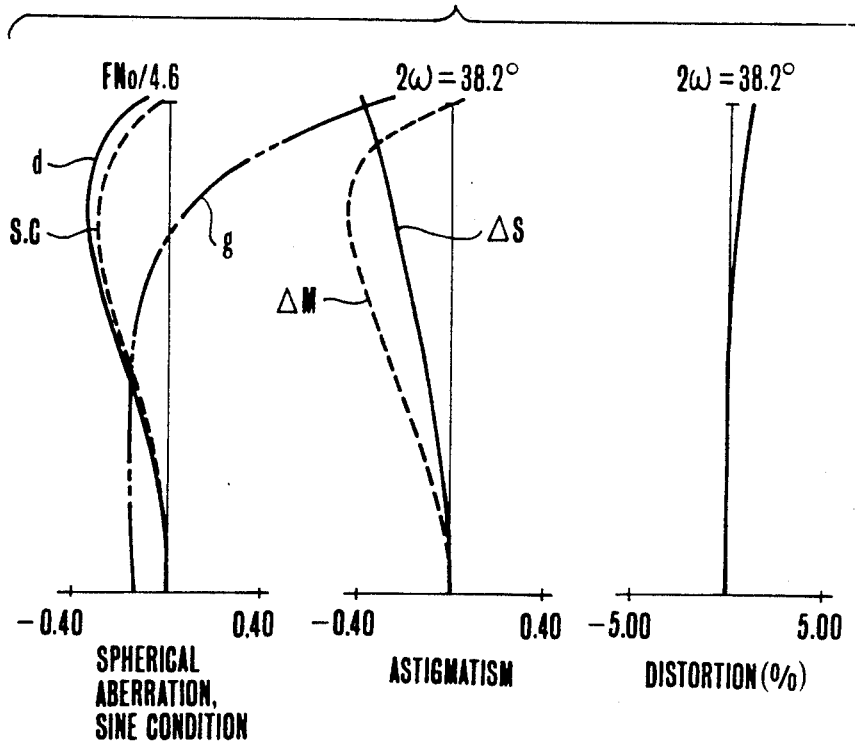
Figure 27C:
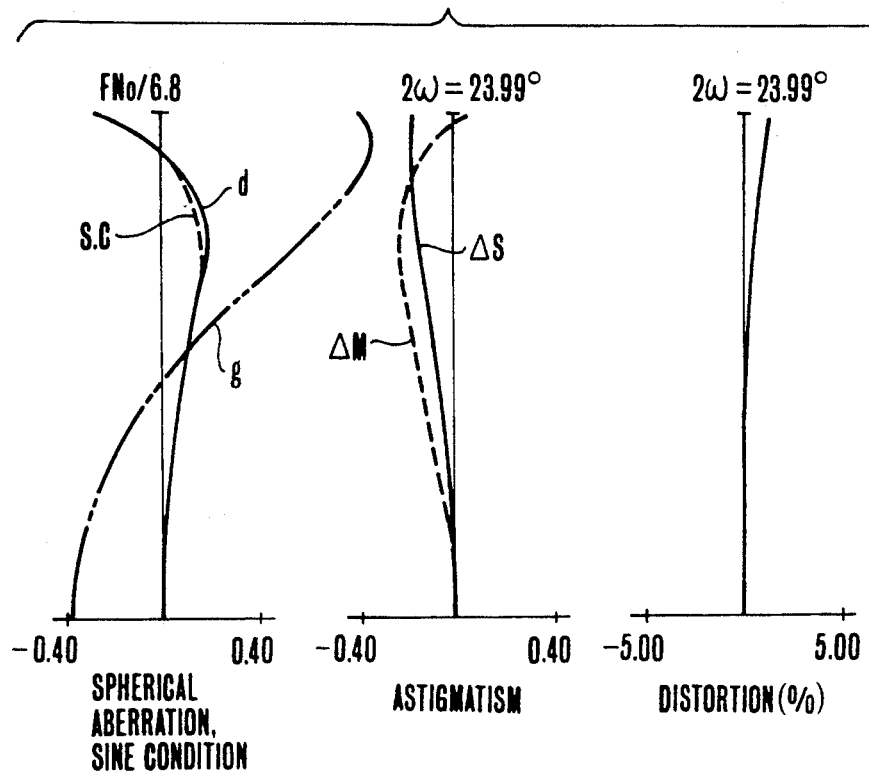
Figure 28A:
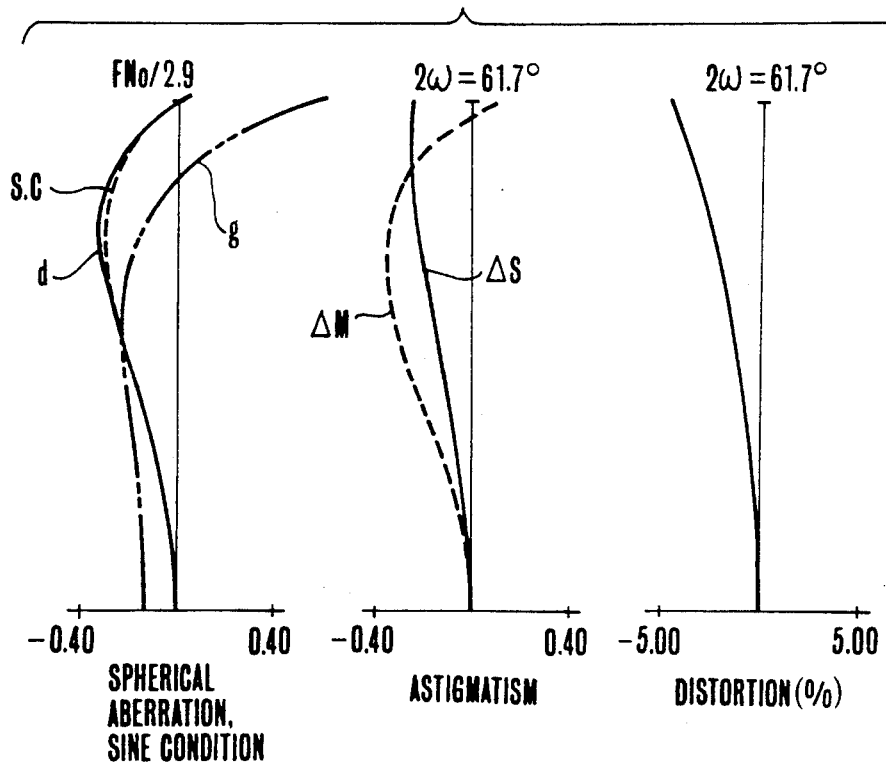
Figure 28B:
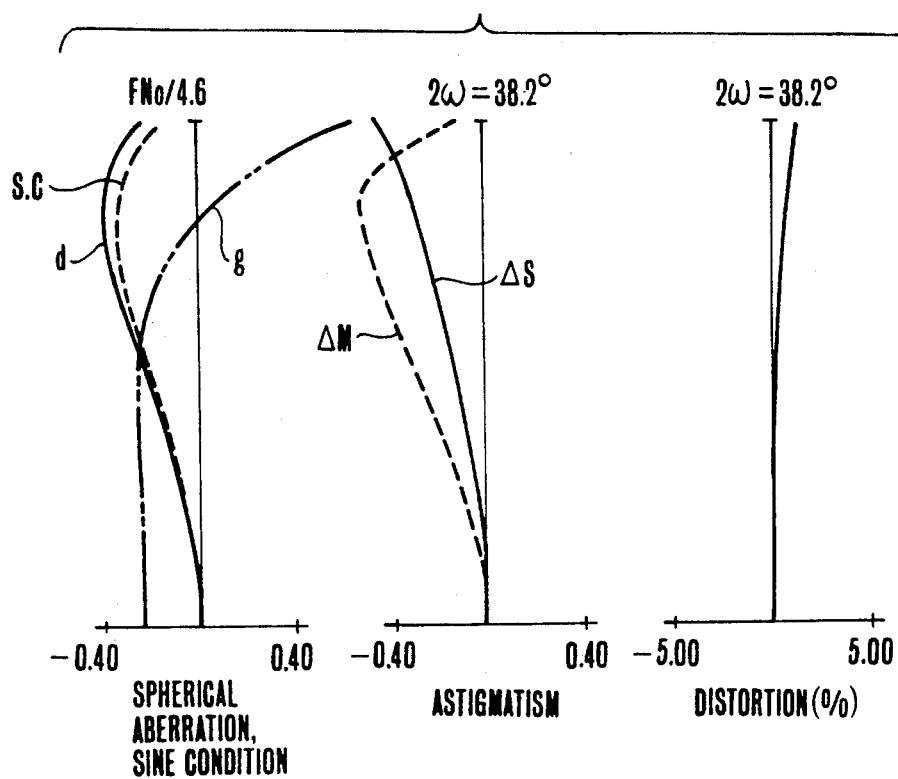
Figure 28C:
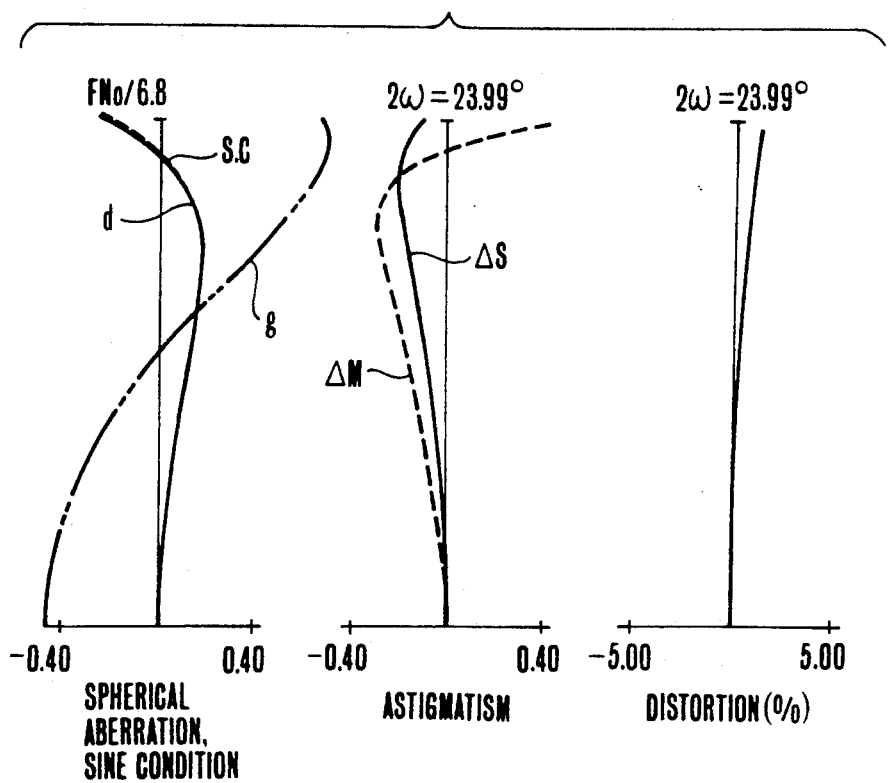
Figure 29A:
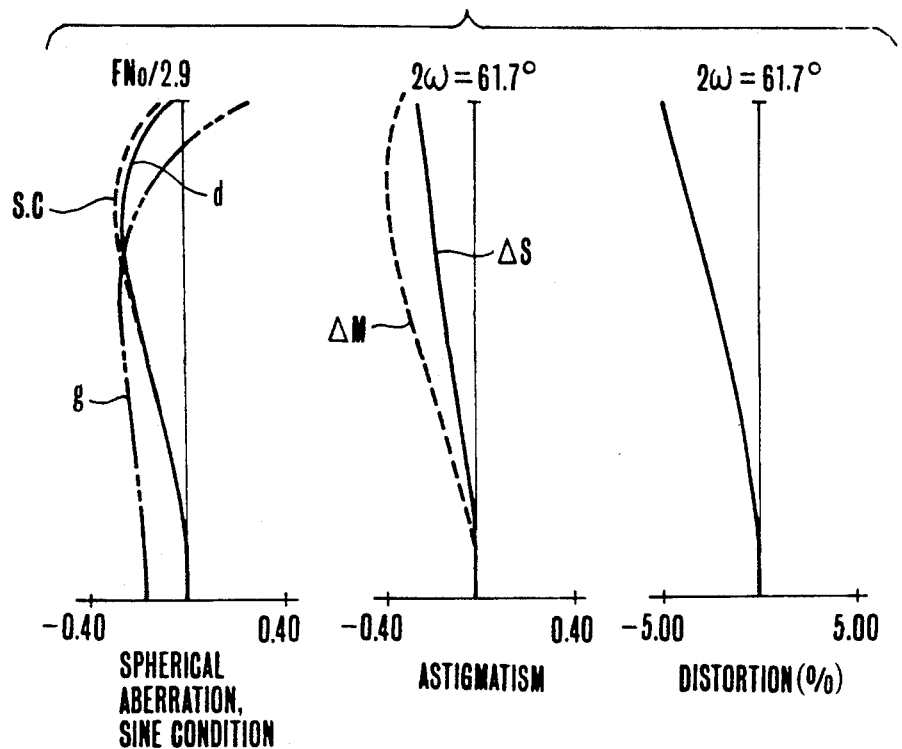
Figure 29B:
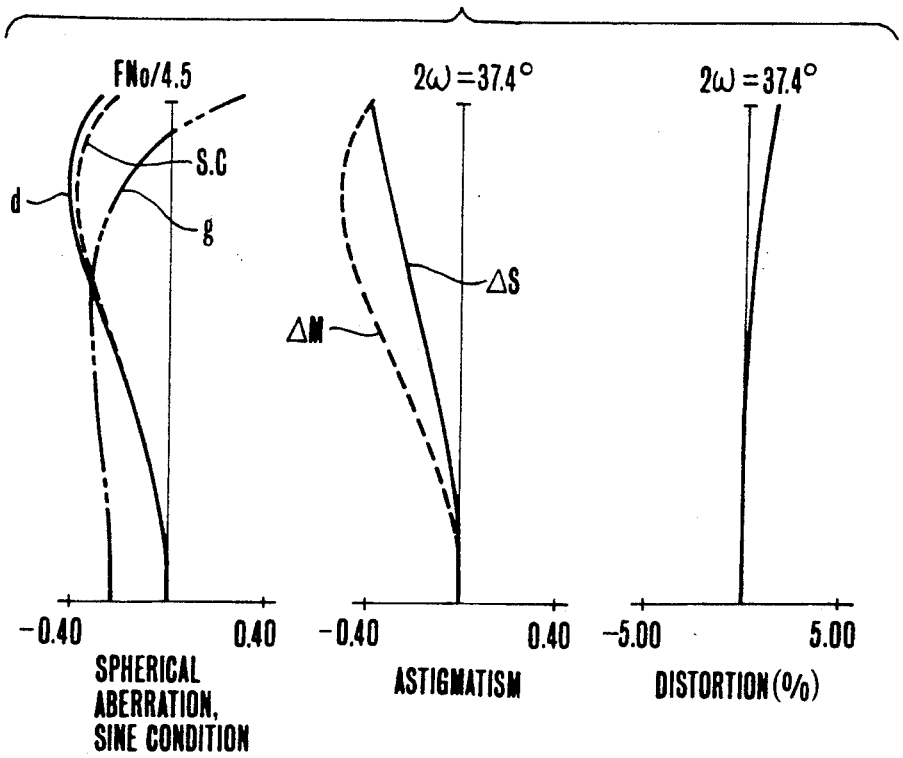
Figure 29C:
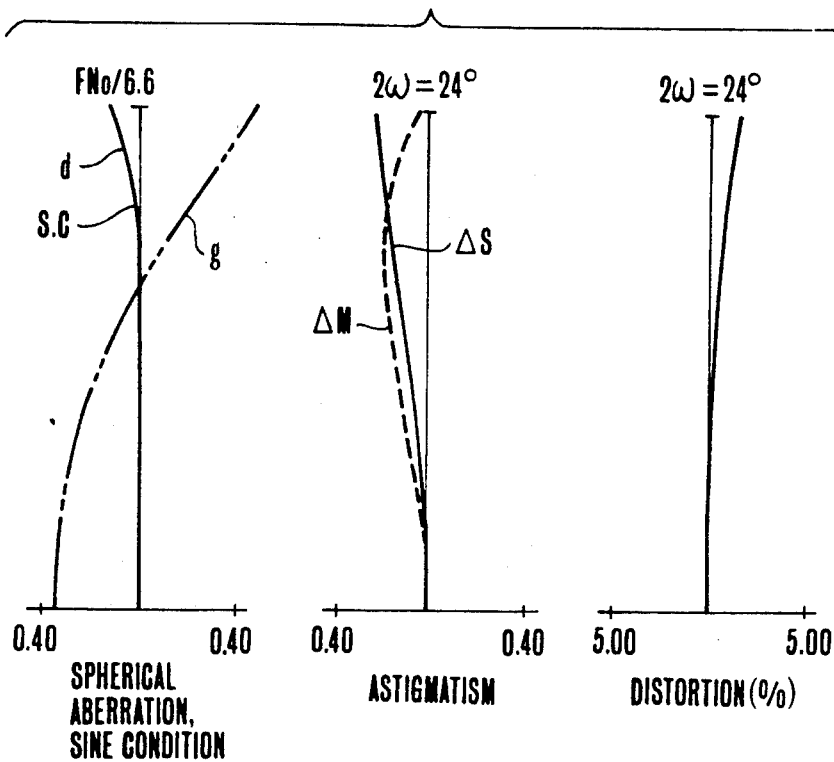
Figure 30A:
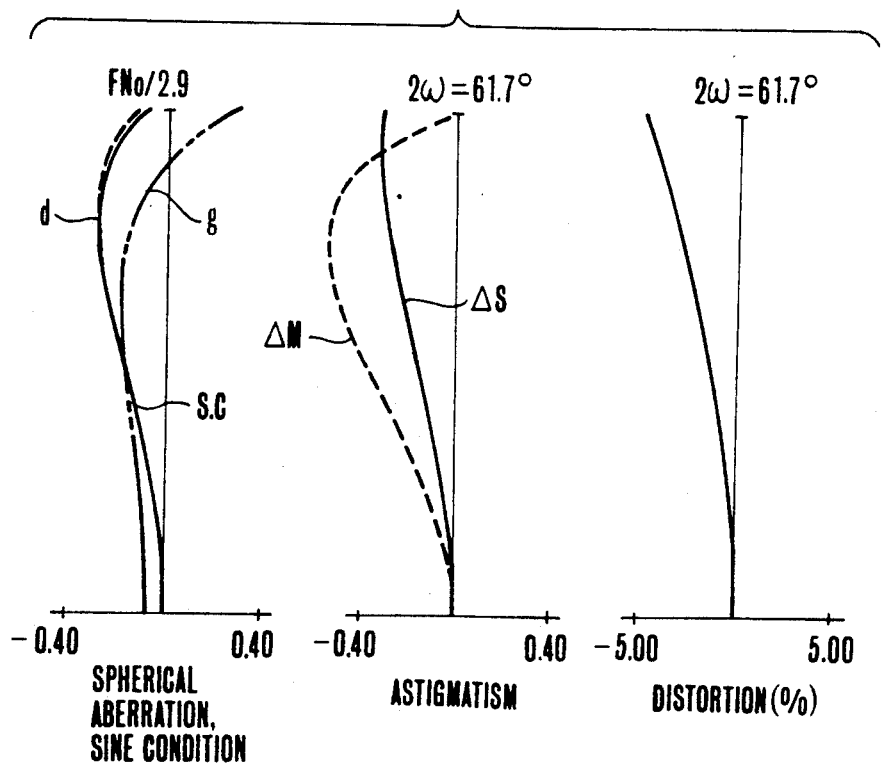
Figure 30B:
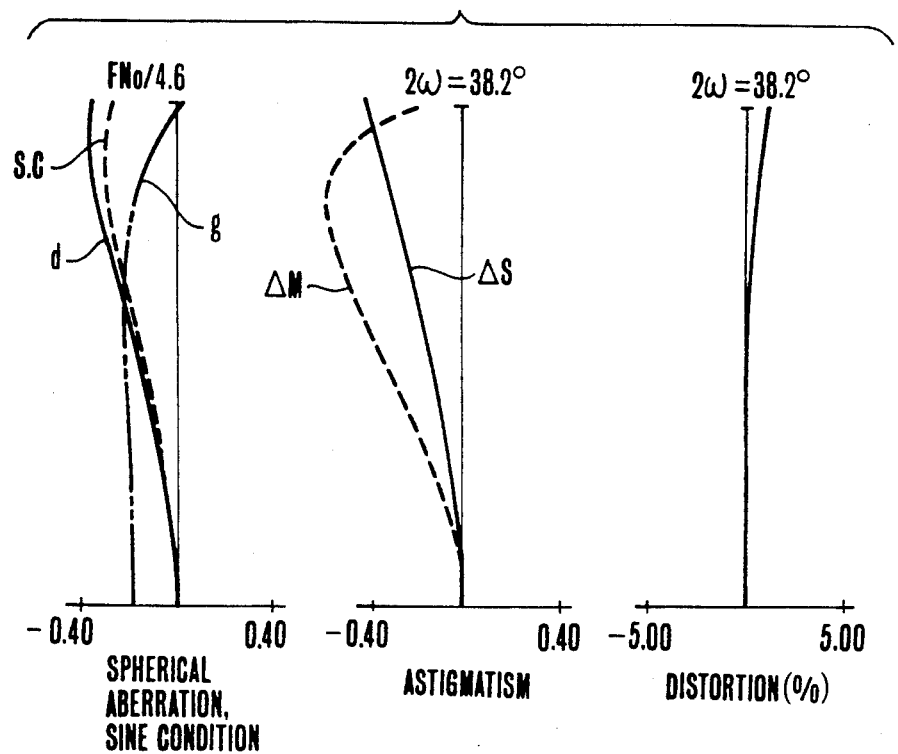
Figure 30C:
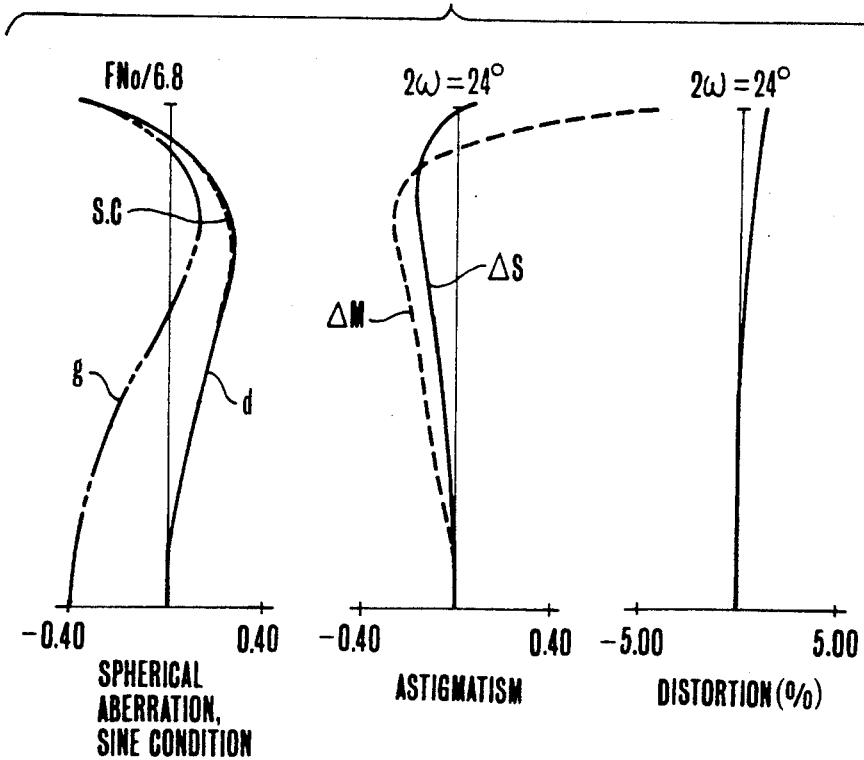
Figure 31A:
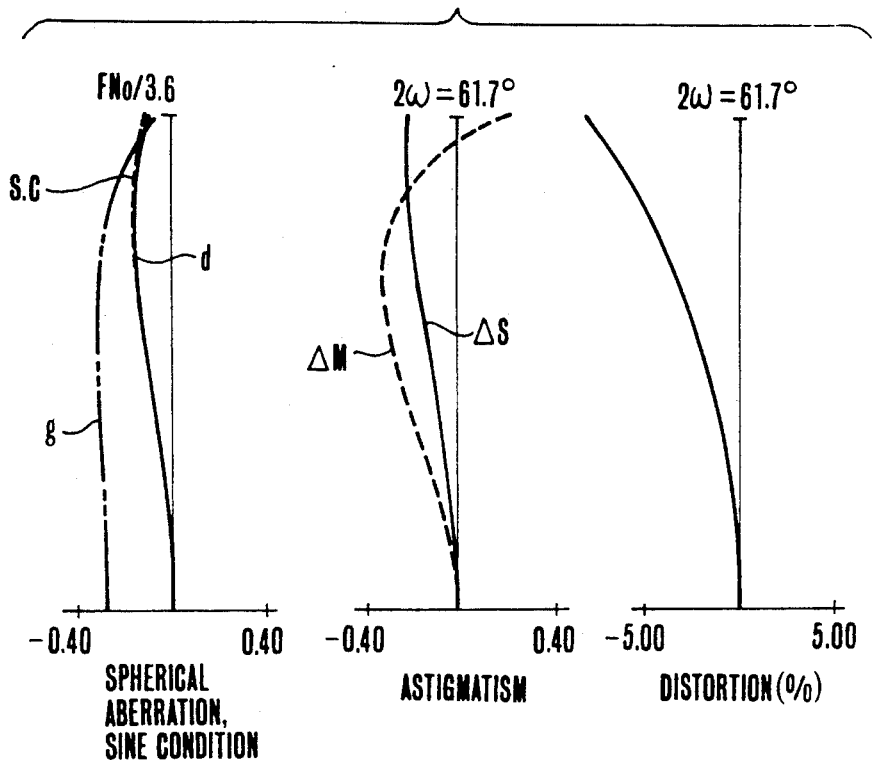
Figure 31B:
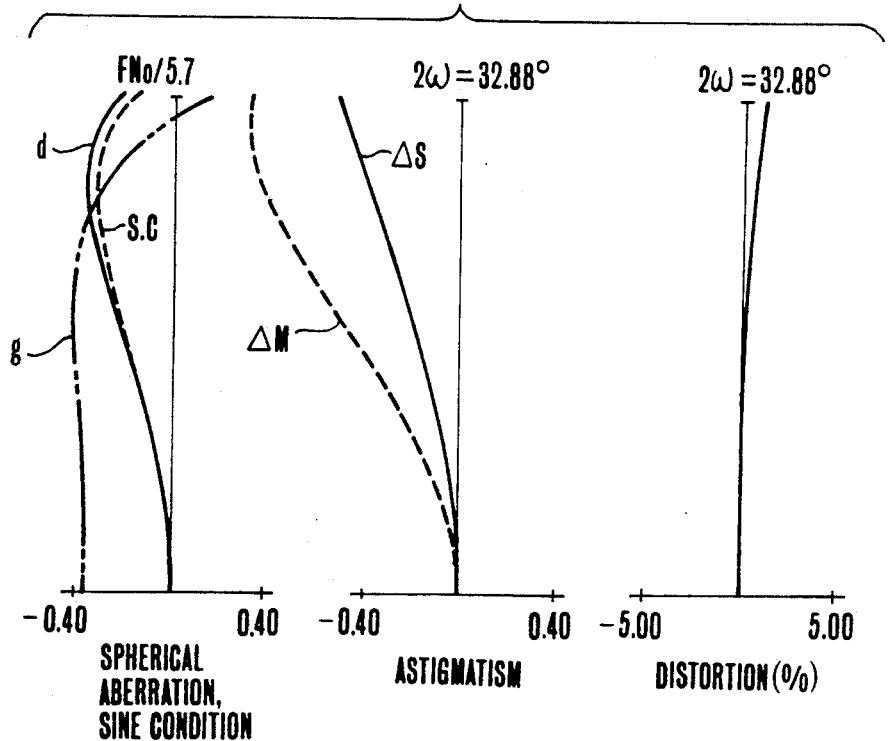
Figure 31C:
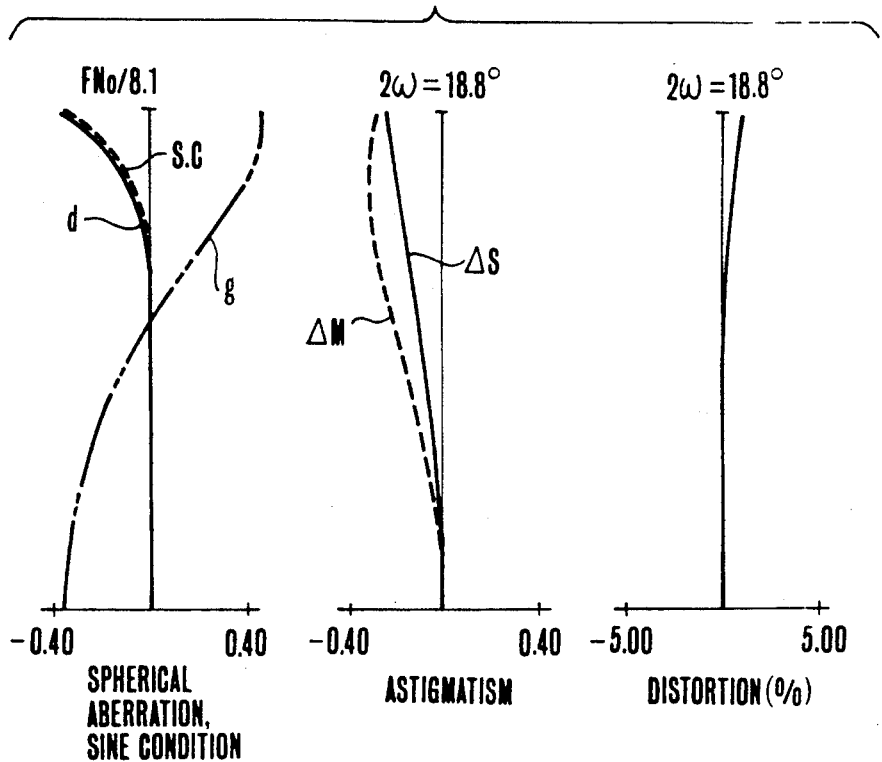
Figure 32A:
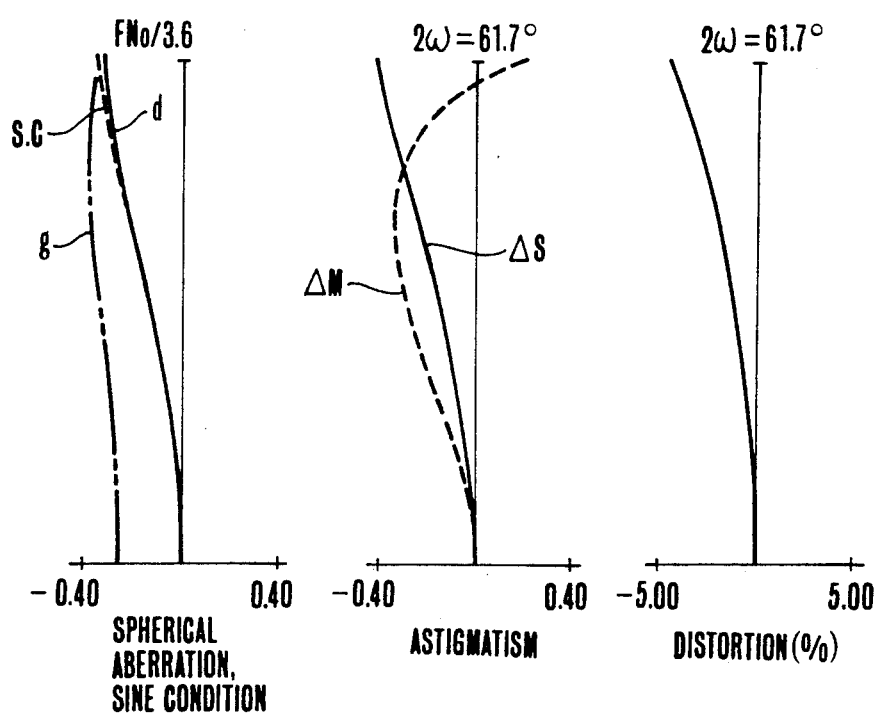
Figure 32B:
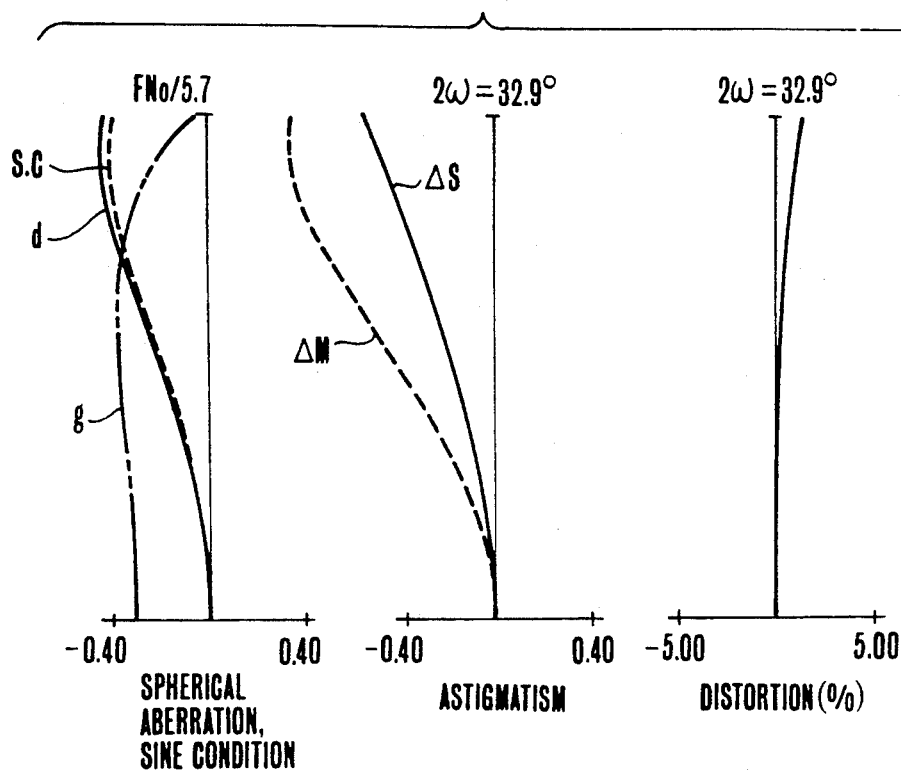
Figure 32C:
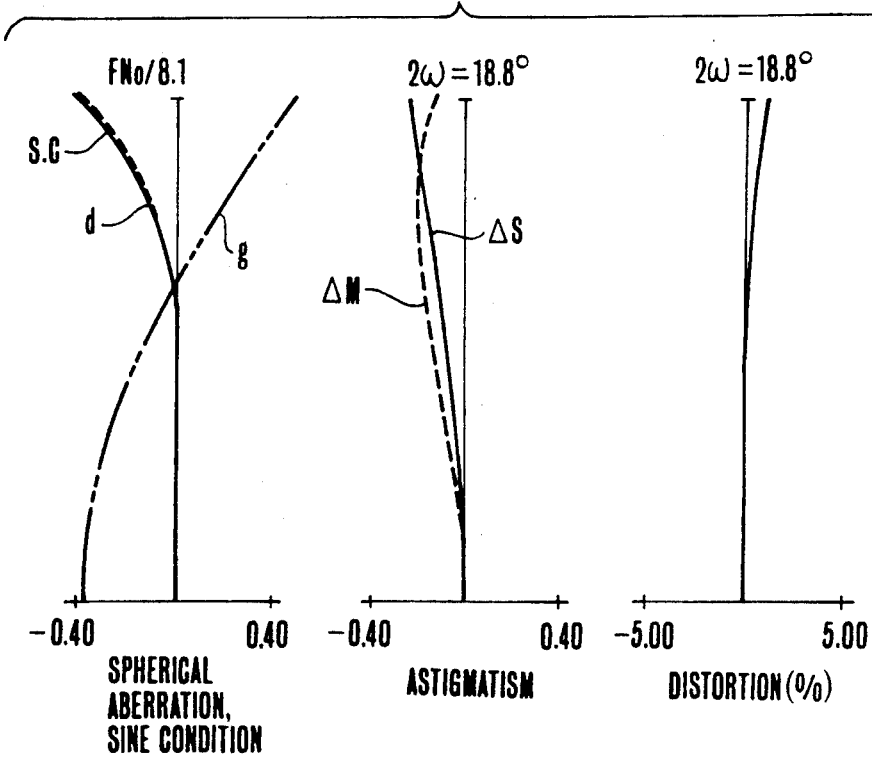
Figure 33A:
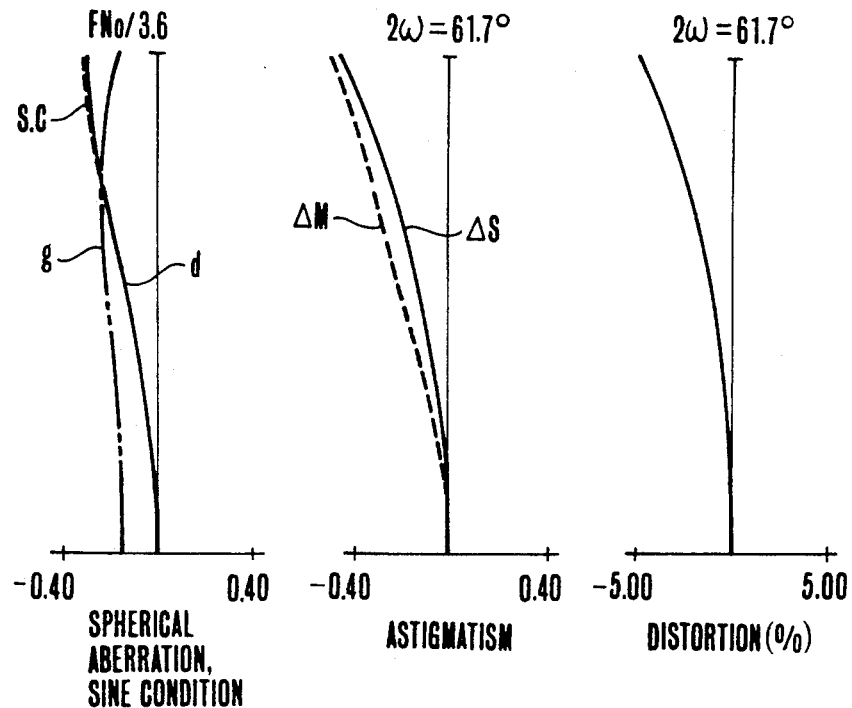
Figure 33B:
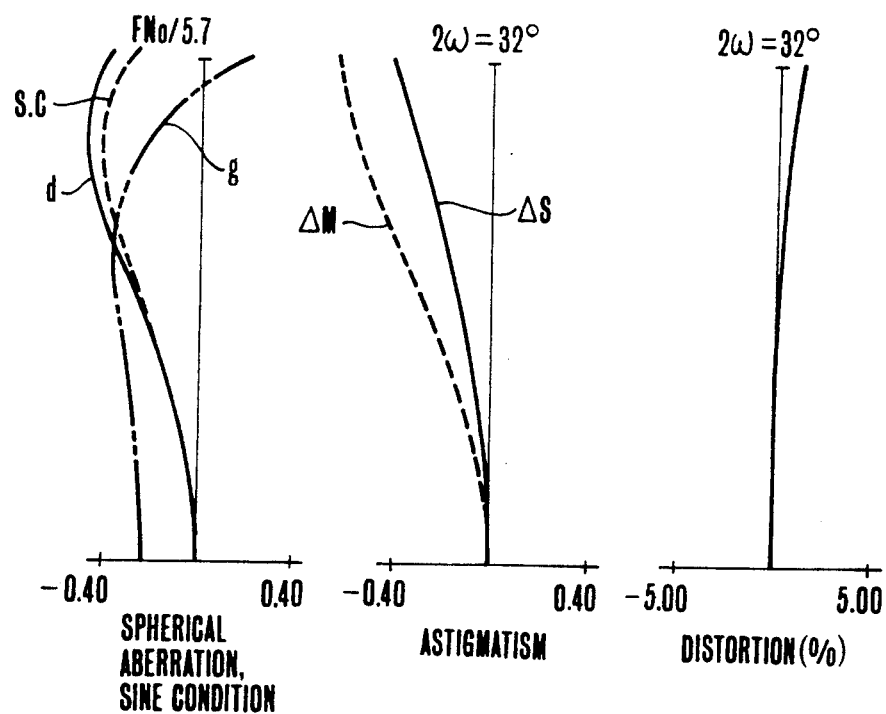
Figure 33C:
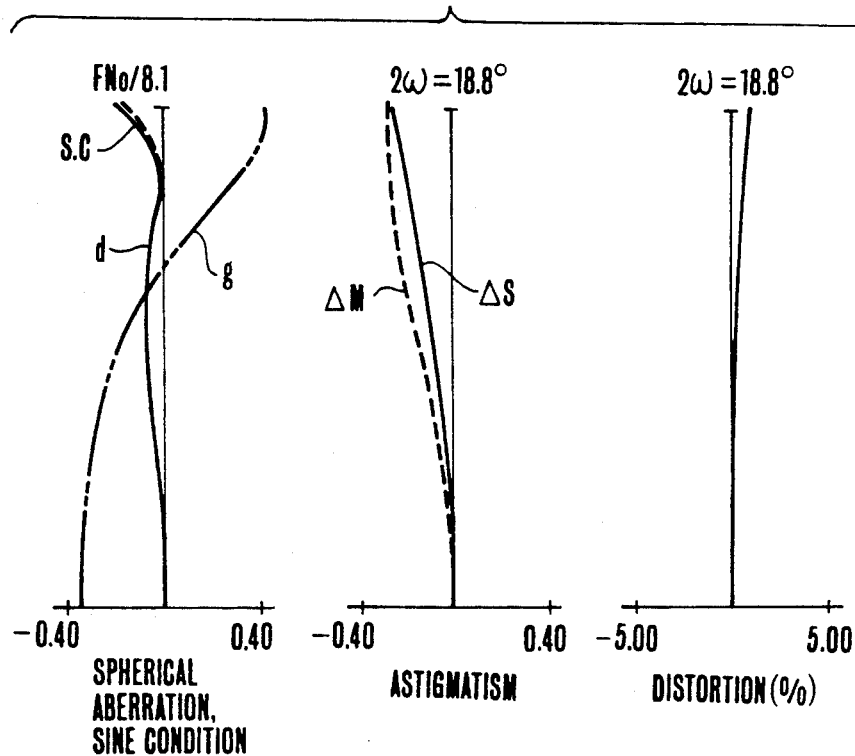
Figure 34A:
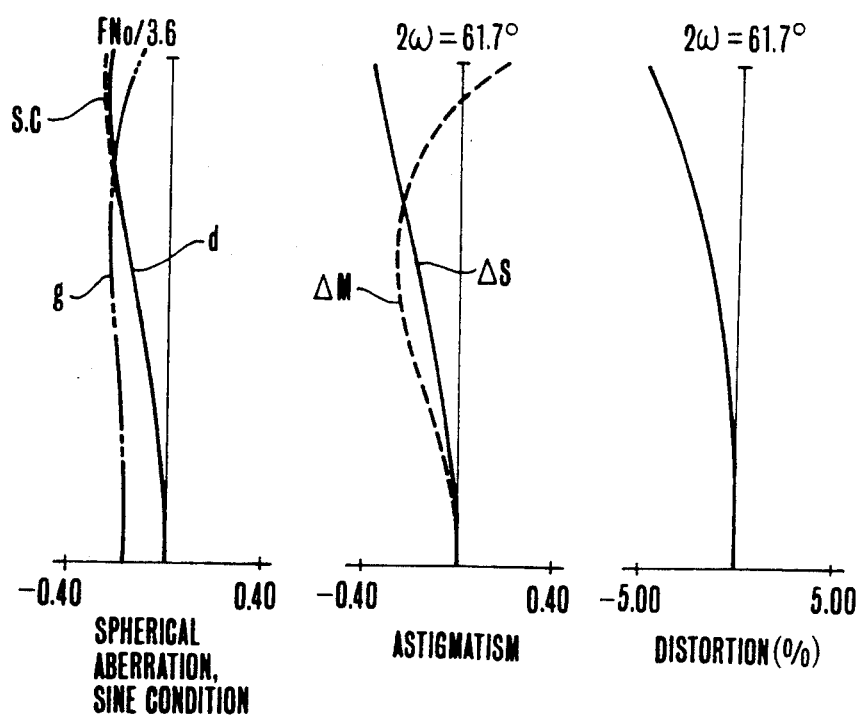
Figure 34B:
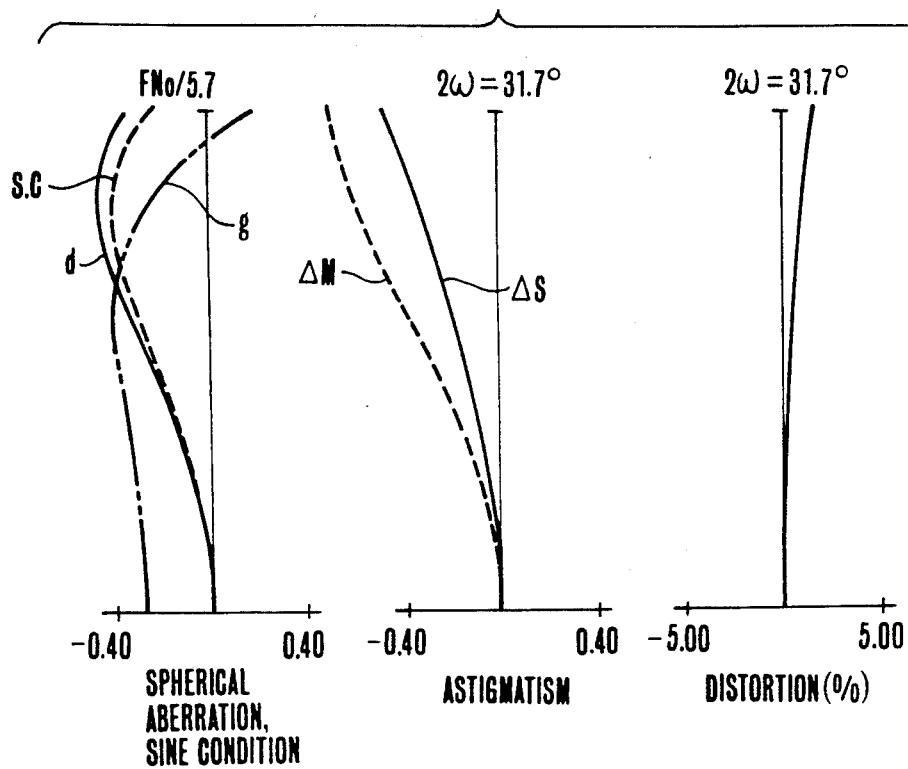
Figure 34C:
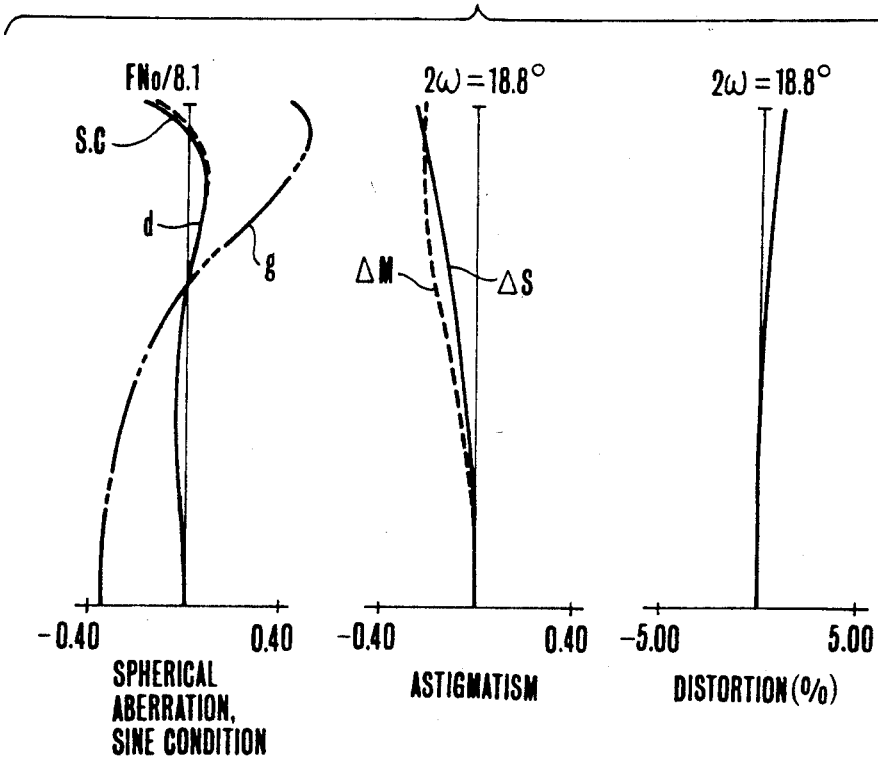
Figure 35A:
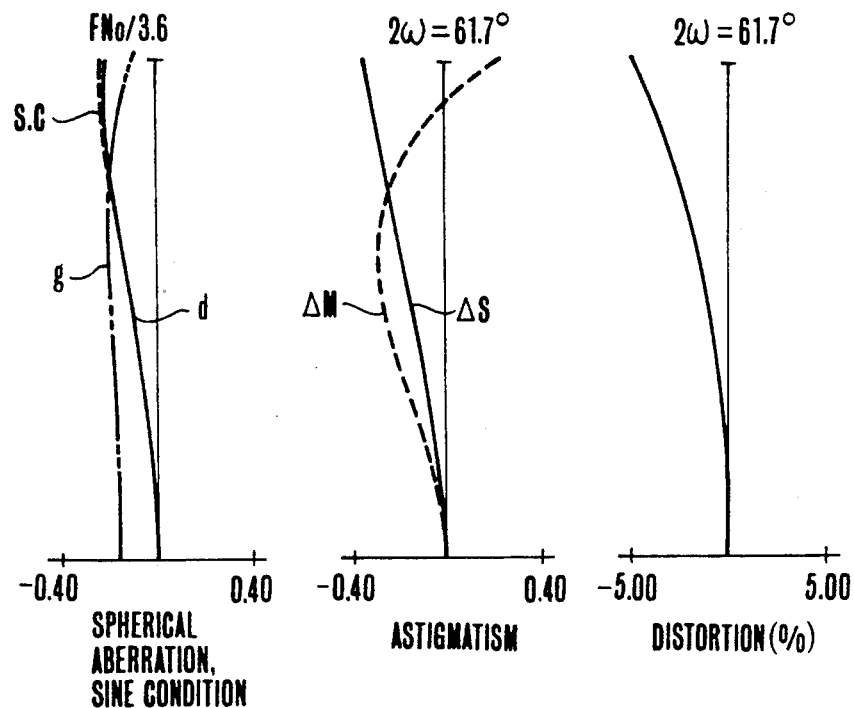
Figure 35B:
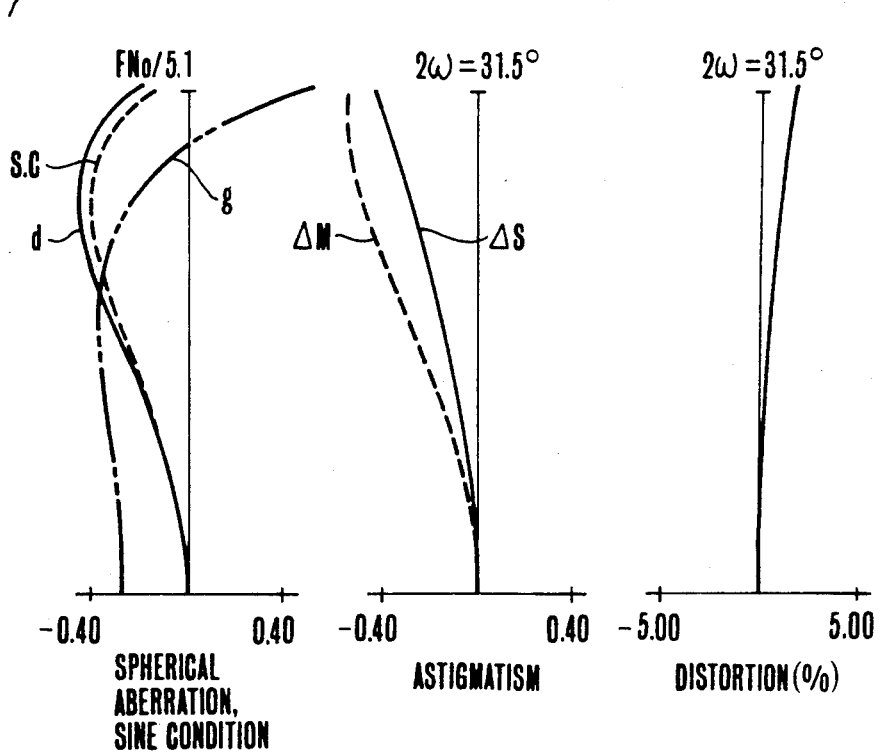
Figure 35C:
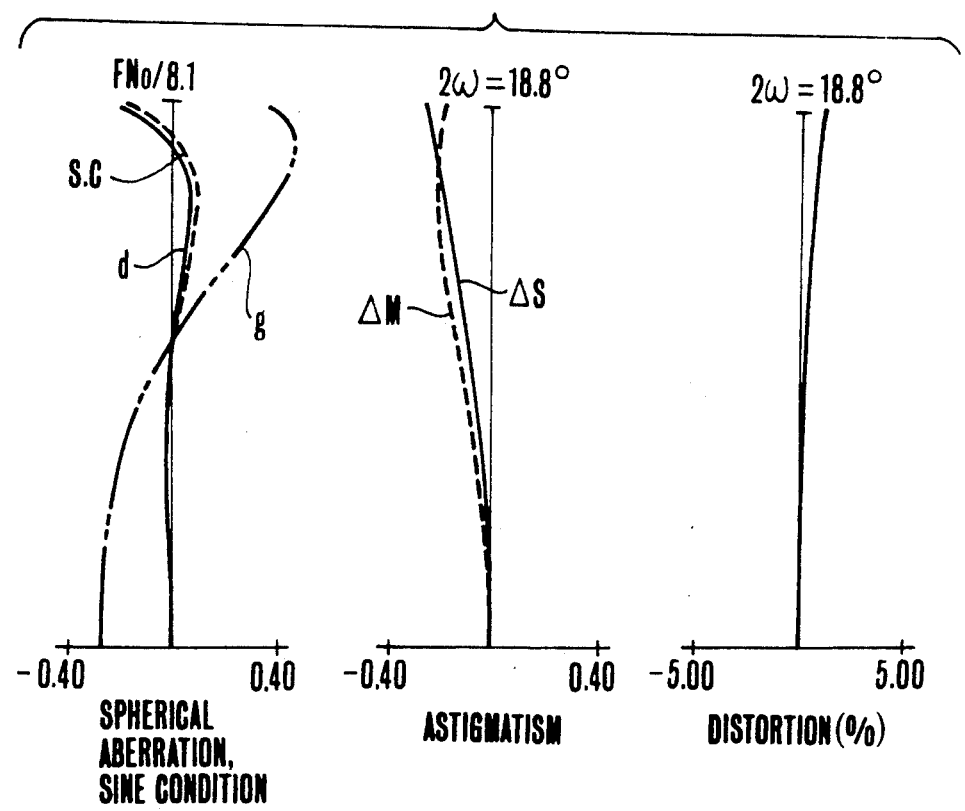
Figure 36:
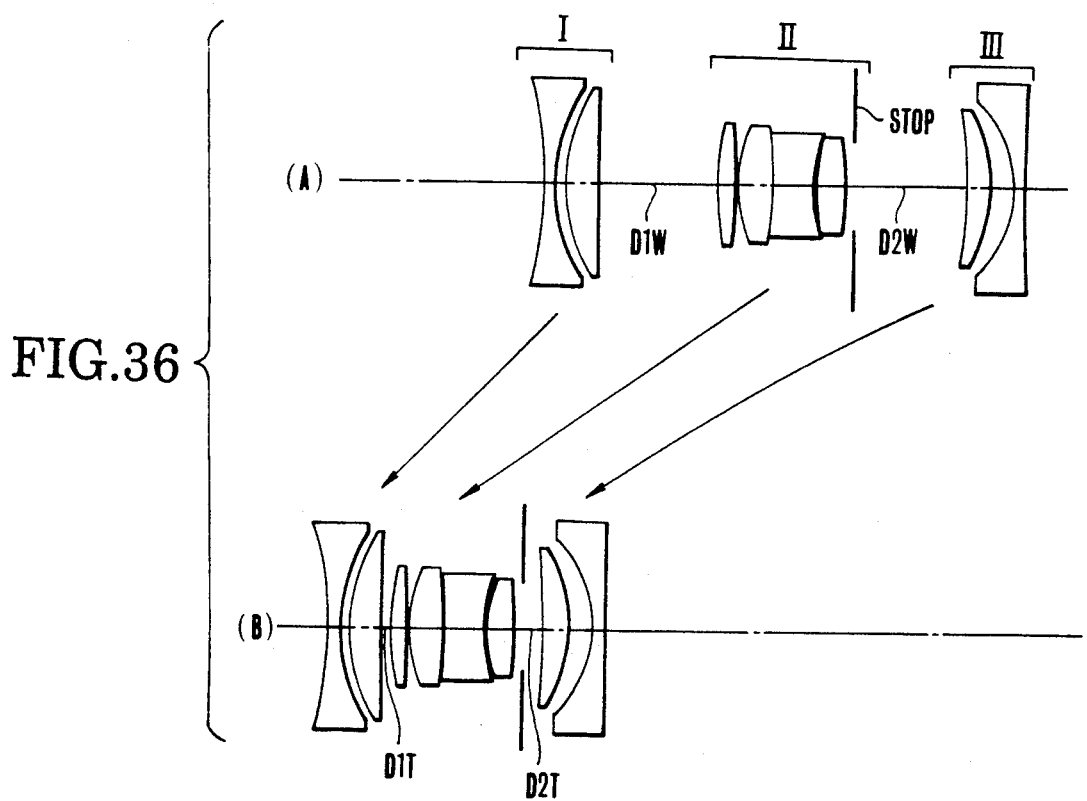
FIG. 36(A) and (B) to FIG. 40(A) and (B) are longitudinal section views of numerical examples 18 to 22 of zoom lenses respectively.
Figure 37:
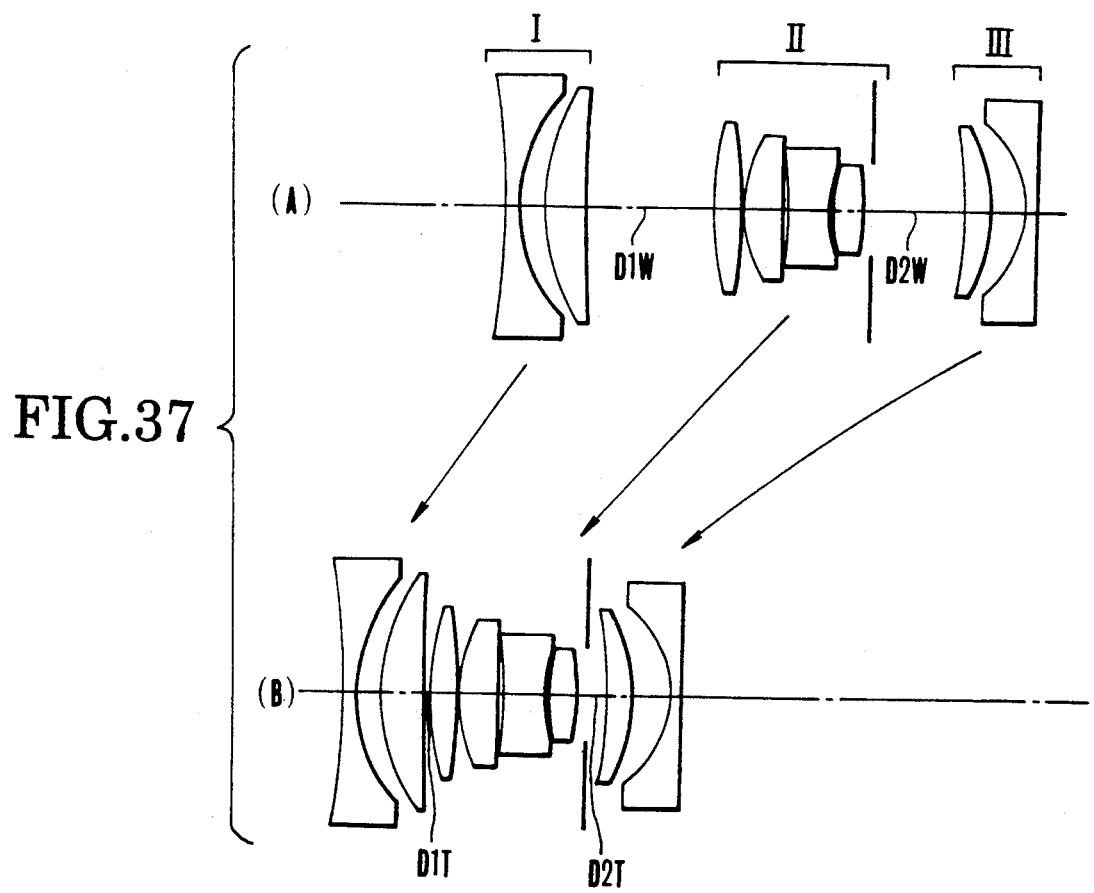
Figure 38:
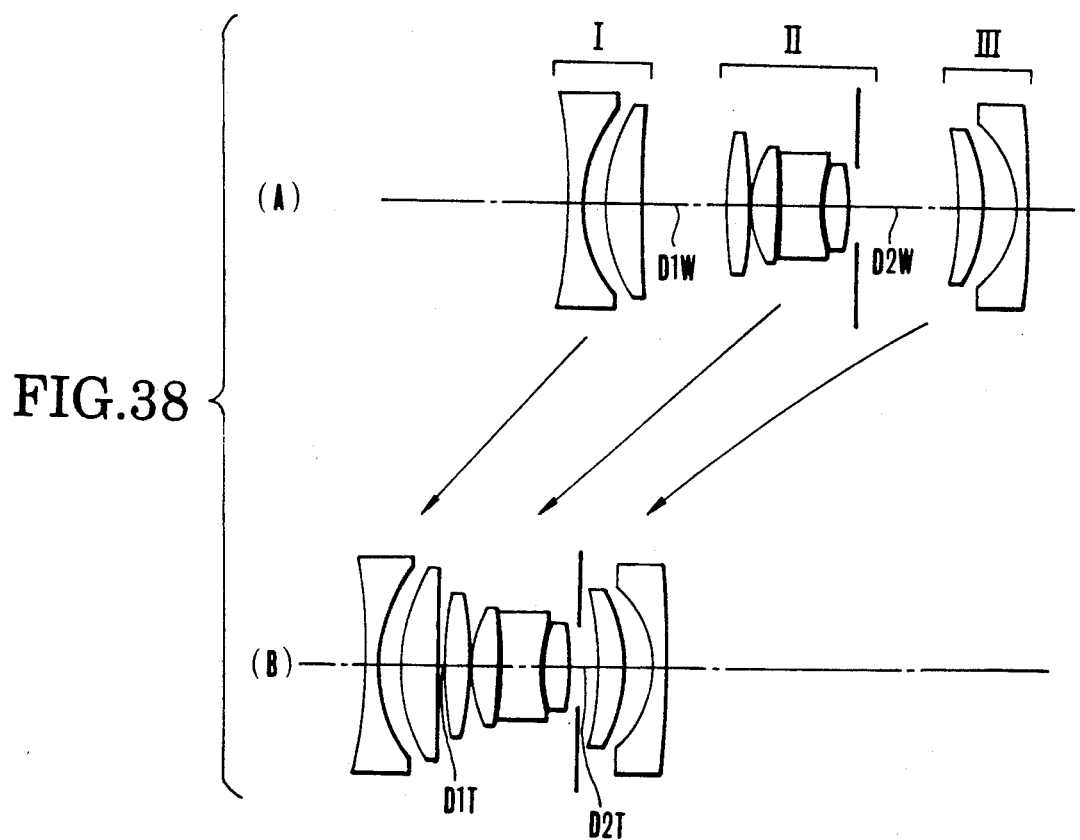
Figure 39:
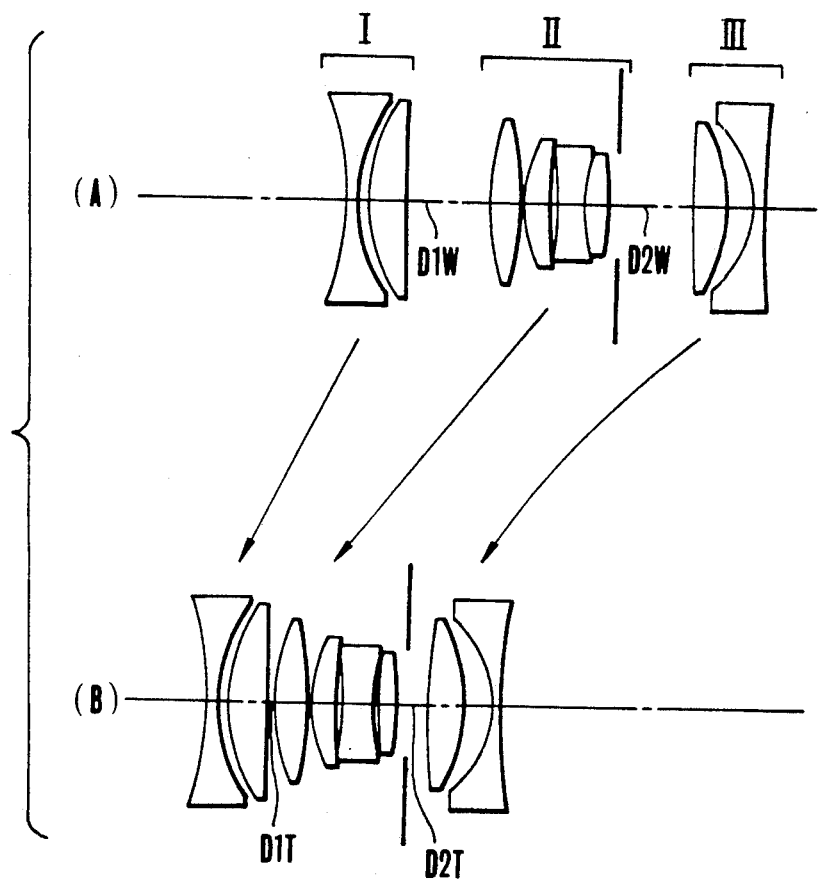
Figure 40:
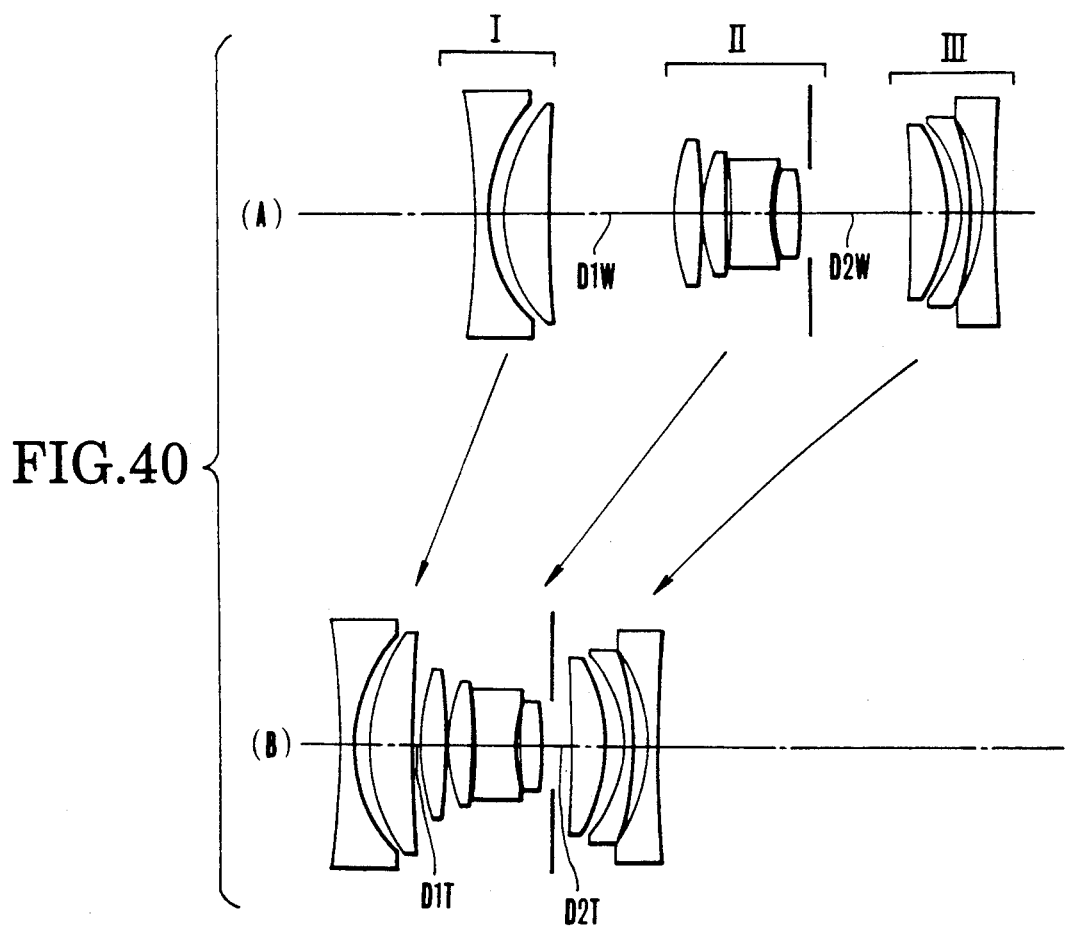
Figure 41A:
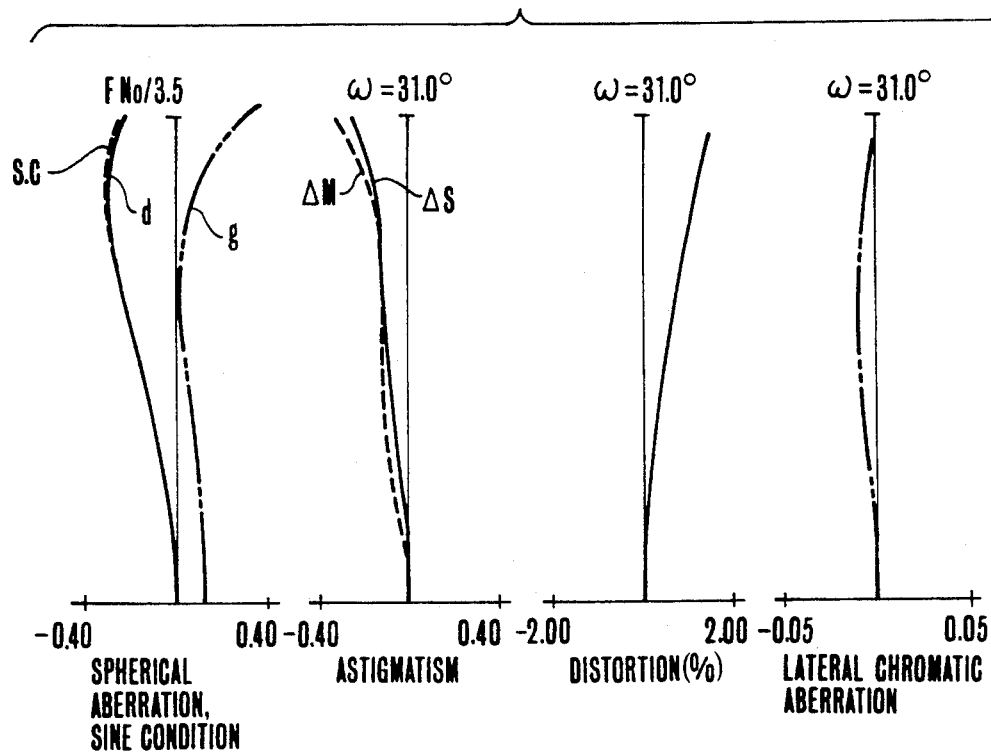
Figure 41B:
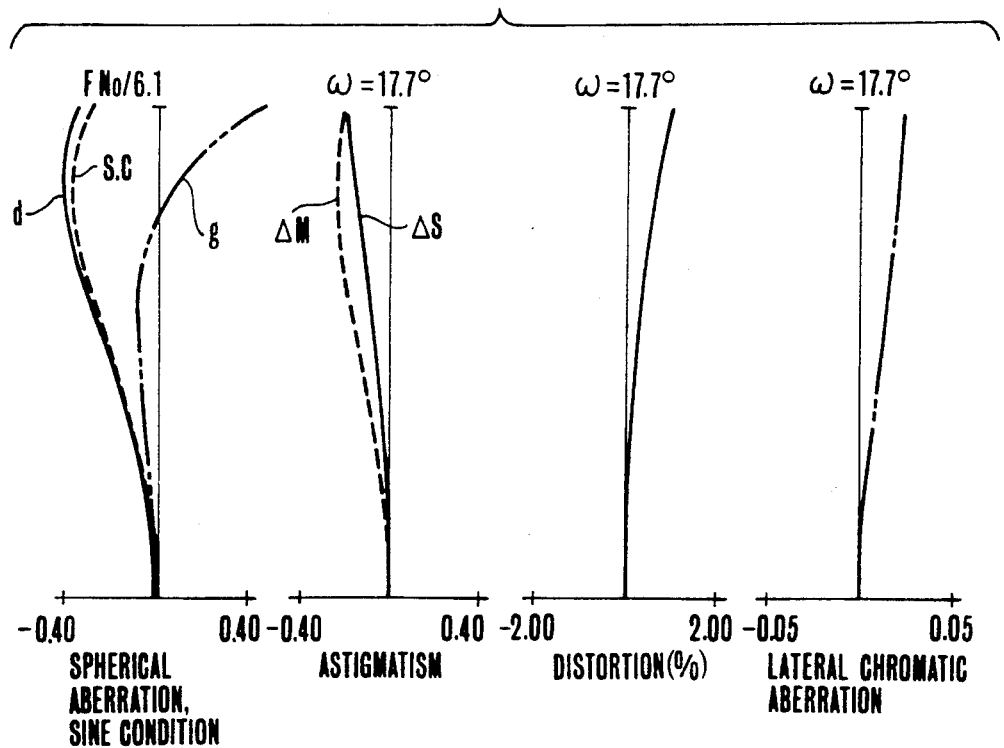
Figure 41C:
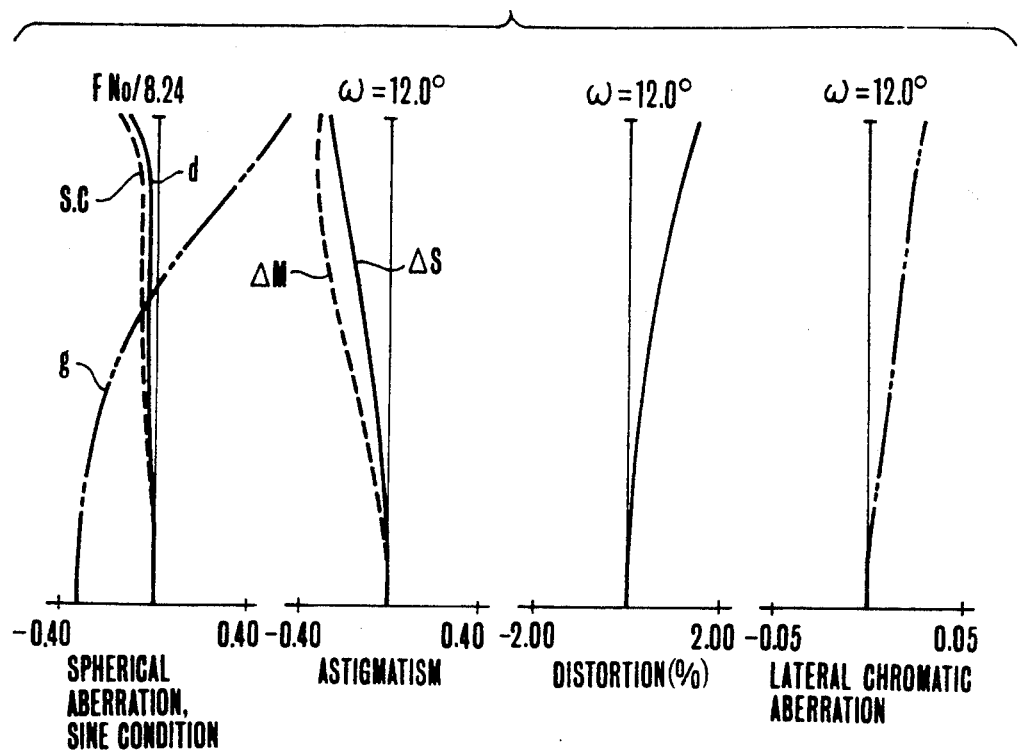
Figure 42A:
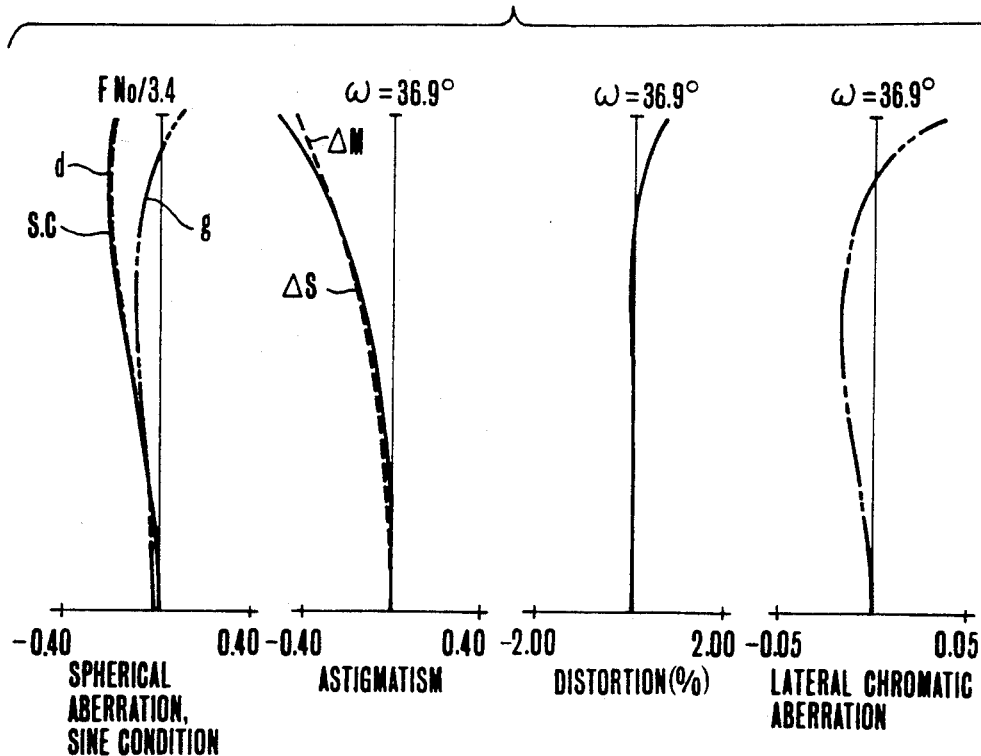
Figure 42B:
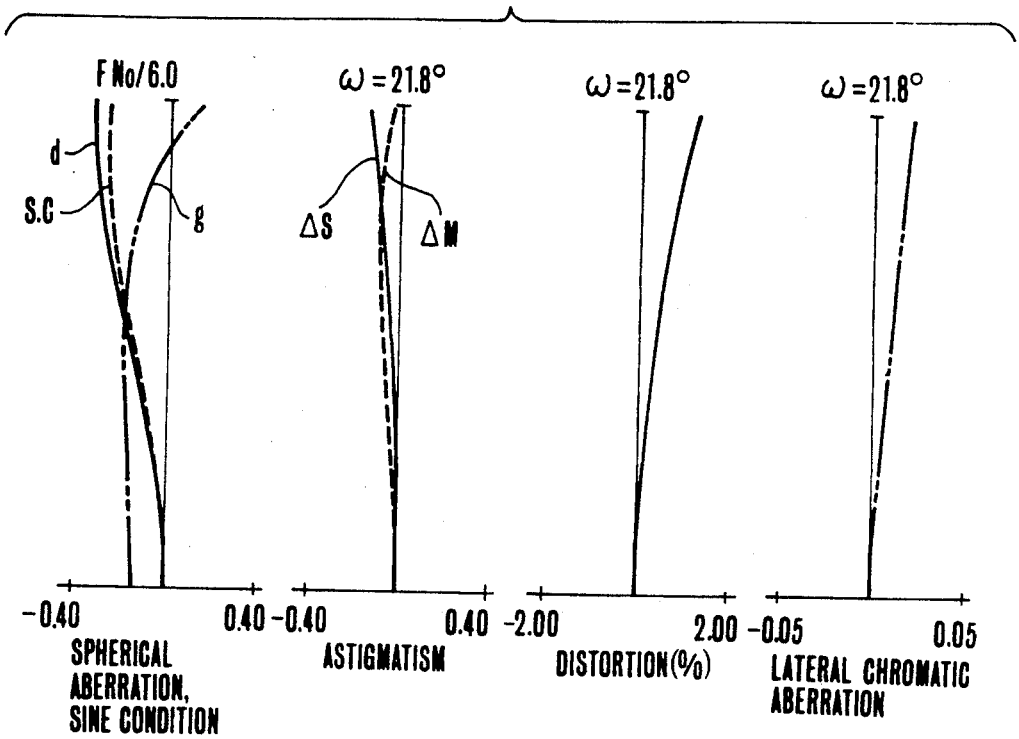
Figure 42C:
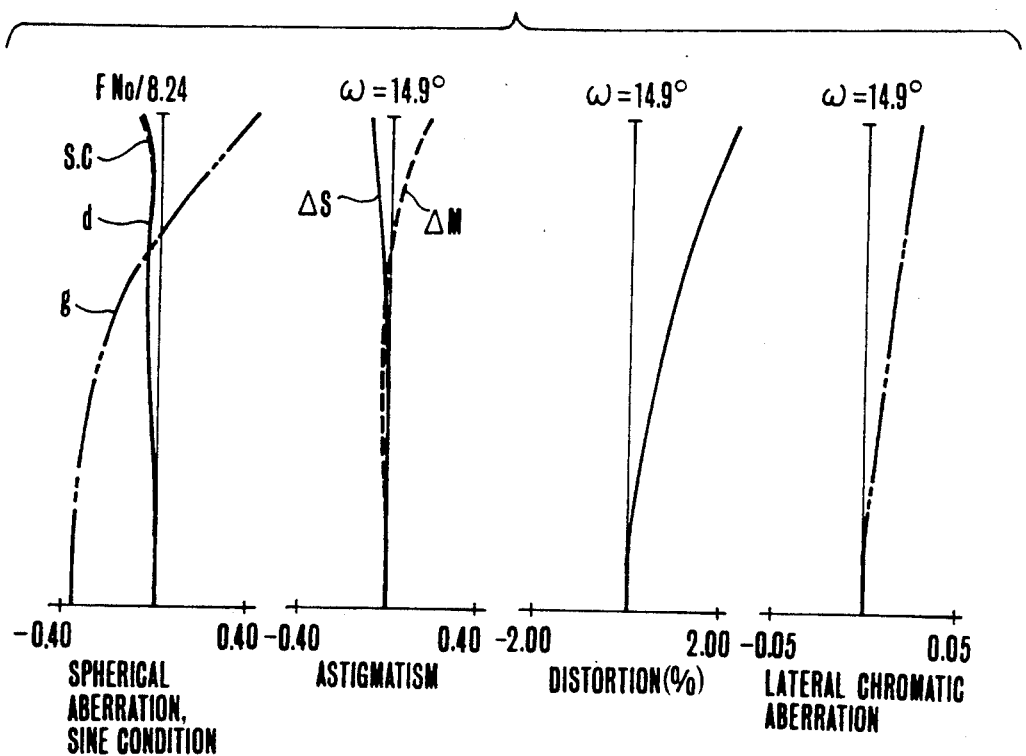
Figure 43A:
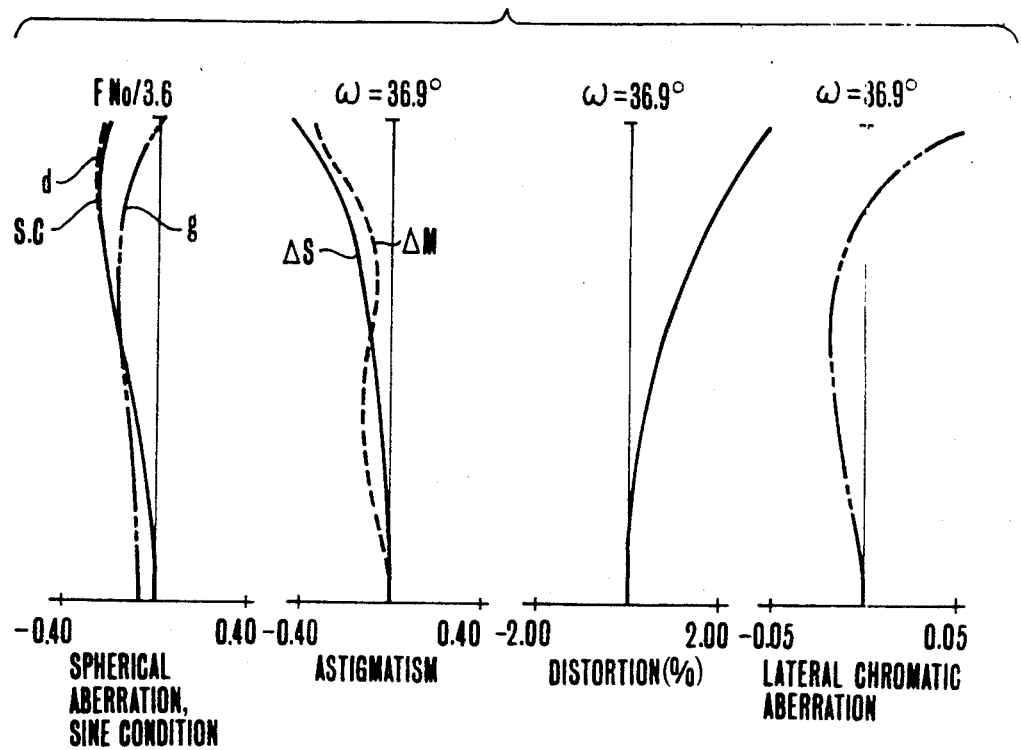
Figure 43B:
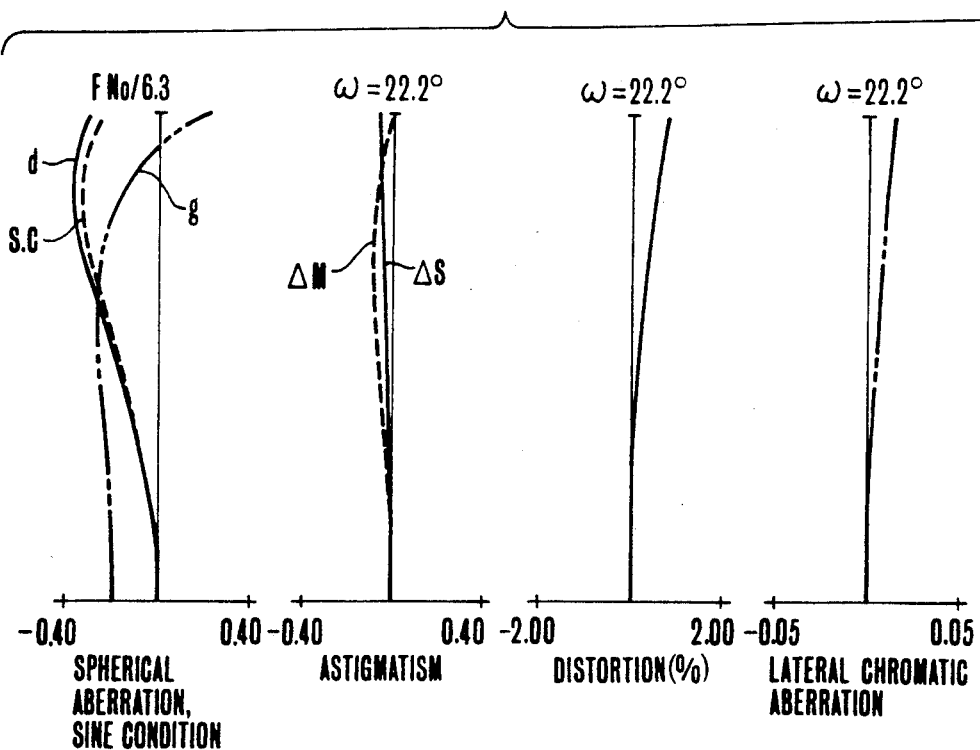
Figure 43C:
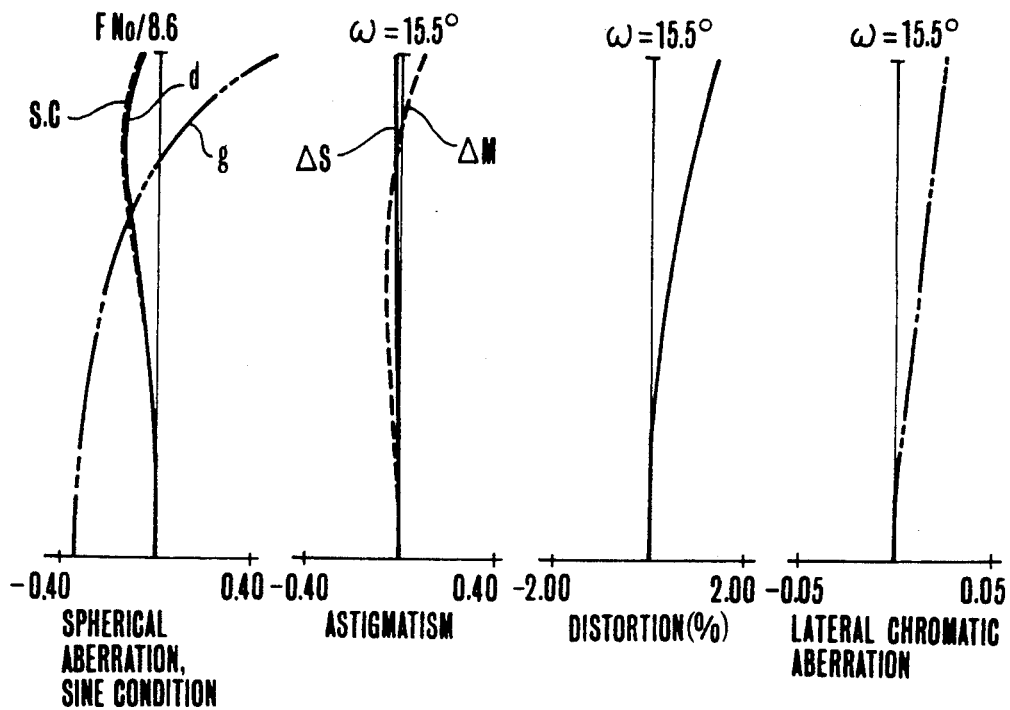

FIG. 9 is a schematic diagram of a practical example of the paraxial refractive power arrangement of the invention. FIG. 10 to FIG. 13 are lens block diagrams of numerical examples 5 to 8 to be described later.

In these drawings, the parts (A) and (B) show the positions of all the lens groups when focused on an infinitely distant object in the wide-angle end and the telephoto end respectively, and the parts (C) and (D) when focused on a close object (for example, at a distance of about 20 times the focal length of the entire system) in the wide-angle end and the telephoto end respectively.

The arrows show the directions of movement of each lens group when zooming or focusing. I denotes a first lens group of negative power, II a second lens group of positive power and III a third lens group of negative power.

In the present embodiment, the three lens groups, or the first to the third ones, are made to move all forward independently of each other, when zooming from the wide-angle end to the telephoto end. Further, at any position in the zooming range, focusing from an infinitely distant object to a close object is performed by moving the third lens group of negative power to the image side. And, in the telephoto end, the third lens group III is made able to move further rearward until a position shown by dashed lines in the part (D) of FIG. 9, thereby giving a capability of performing ultra close-up photography (so-called macro photography).

Another feature of the present embodiment is that as the zoom lens is constructed with the three lens groups of negative, positive and negative powers in this order from the front and all these lens groups move forward when zooming from the wide-angle end to the telephoto end, its configuration is made to take the retrofocus type at the wide-angle end and to take the telephoto type at the telephoto end with advantages that when at the wide-angle end, the view angle is easy to widen, while when at the telephoto end, the back focal distance is shortened and a shortening of the total length of the entire lens system is effectively achieved.

And, with the third lens group of negative power, when focusing from an infinitely distant object to a close object, its movement is made to be directed rearward, thus efficiently utilizing the space for the back focal distance. For this reason, the present invention is very advantageous at application to, in particular, the lens shutter camera of short back focal distance, when its objective lens system is reduced in size.

Yet another feature is that, as shown in the part (D) of FIG. 9, the third lens group when in the telephoto end is brought as far ahead as possible from the position it takes when in the wide-angle end in order to increase the total focusing movement. Thus, it is made possible to increase the image magnification, in other words, to perform so-called "ultra close-up" photography.

In the present invention, the focusing or third lens group is constructed with two lenses of which the first counting from front is positive and the second is negative, satisfying the following condition:

$$1 < f31/|f3| < 2 \ldots \qquad (7)$$

where f31 is the focal length of the positive lens and f3 is the focal length of the third lens group. And it is in the wide-angle end at the minimum object distance that the height of incidence of the off-axial light ray on the last negative lens is made lower. By this, a shortening of the lens diameter and a decrease of the weight of the third lens group are achieved to improve the stress of the operating mechanism when the third lens group is used in focusing.

The technical significance of the above-described inequalities of condition (7) is explained below. The condition (7) concerns with the ratio of the refractive power of the third lens group to that of the positive lens in the third lens group. The use of the rear focus type in the zoom lens of the rear generally leads to large variations of the astigmatism for the wide-angle end and of the spherical aberration for the telephoto end, which are difficult to correct well.

In more detail, as the object distance decreases from infinity to a minimum, the astigmatism for the wide-angle end tends to get under-corrected and the spherical aberration for the telephoto end to get under-corrected. The positive lens of the third lens group has an effect of making the astigmatism under-corrected when focusing down in the wide-angle end, and the spherical aberration over-corrected in the telephoto end.

The inequalities of condition (7) gives a proper range for the refractive power of the positive lens in the third lens group so that these aberrations are corrected in good balance throughout the focusing range.

When the focal length of the positive lens increases above the upper limit of the inequalities of condition (7), the effect of correcting the spherical aberration for the telephoto end gets weaker so that under-correction of the spherical aberration results at the minimum object distance, and its correction becomes difficult to do. When the focal length of the positive lens decreases below the lower limit of the inequalities of condition (7), the variation of the astigmatism for the wide-angle end shifts toward more under-correction, and its correction becomes difficult to do.

The above-described conditions suffice for realizing a rear focus type zoom lens of reduced size while still permitting the variations with focusing of the aberrations to be minimized for high optical performance. Yet, to achieve a further improvement of the optical performance throughout the entire zooming range as well as the focusing range with the preservation of the compact form, the present invention sets forth the following additional conditions:

$$N31 < N32 \ldots \qquad (8)$$

$$1 < RIII2/RIII3 < 2 \ldots \qquad (9)$$

$$(RIII2 < 0, RIII3 < 0)$$

where N31 and N32 are the refractive indices of the materials of the positive and negative lenses respectively, and RIIIi is the radius of curvature of the i-th lens surface counting from front in the third lens group.

The inequality of condition (8) concerns with the relationship of the refractive indices of the positive and negative lenses of the third lens group. Since the third lens group has the negative refractive power, the violation of the condition (8), or the choice of a material of higher refractive index for use in the positive lens than that of the material of the negative lens, leads to a large value in the negative sense of the Petzval sum of the third lens group, which makes worse the curvature of field. Hence, when the condition (8) is violated, good correction of field curvature is hardly maintained over the entire zooming and focusing ranges.

The inequalities of condition (9) concern with the ratio of the radius of curvature of the rear surface of the positive lens to that of curvature of the front surface of the negative lens in the third lens group.

If the front surface of the negative lens in the third lens group is made convex toward the front (or RIII3>0), the rear surface of that negative lens has to be of strong curvature concave toward the rear, causing large distortion to be produced in the wide-angle end. In the present embodiment, therefore, the front surface of the negative lens is made concave (or RIII3<0). And, because such a front surface of the negative lens produces spherical aberration in the telephoto end, for this is well corrected, the rear surface of the positive lens is made convex toward the rear (or RIII2<0).

In addition, as the object distance decreases from infinity to the minimum, the rear surface of the positive lens gets some effect of over-correcting the spherical aberration for the telephoto end, and the front surface of the negative lens gets some effect of over-correcting the astigmatism for the wide-angle end.

With such points in mind, an especial range for the ratio is given by the inequalities of condition (9). When the upper limit of the inequalities of condition (9) is exceeded, or the curvature of the rear surface of the positive lens becomes weak compared with the curvature of the front surface of the negative lens, the spherical aberration for the telephoto end varies to large extent. At the minimum object distance, therefore, a large under-correction results. Hence, its correction gets harder to do. Conversely when the lower limit of the inequalities of condition (9) is exceeded, or the curvature of the front surface of the negative lens becomes weak compared with the curvature of the rear surface of the positive lens, the astigmatism for the wide-angle end varies to large extent. At the minimum object distance, therefore, a large under-correction results. Hence, its correction gets harder to do.

To further improve the stability of aberration correction against zooming, while still permitting the reduction of the size of the entire lens system to be achieved, the present embodiment may have another feature that the first lens group is constructed with inclusion of two lenses, of which the first counting from front is negative and the second is positive, and the second lens group is constructed with inclusion of four lenses, i.e., two positive lenses, a negative lens and a positive lens.

The numerical data for examples 5 to 8 of the invention are shown below. In the numerical examples 5 to 8, Ri denotes the radius of curvature of the i-th lens surface counting from front, Di the i-th axial lens thickness or air separation counting from front, and Ni and $\nu i$ the refractive index and Abbe number of the material of the i-th lens element counting from front respectively. The variable separation D13 has two values, one of which outside the parentheses is taken when with an infinitely distance object, and the other of which within the parentheses is taken when the object distance is 1 meter.

The shape of the aspheric surface is expressed in the coordinates of an X axis in the optical axis and an H axis in a direction perpendicular to the optical axis with the direction in which light advances being taken as positive, by the following equation:

$$X = \frac{(1/R)H^2}{1 + \sqrt{1 - (H/R)^2}} + a_1 H^2 + a_2 H^4 + a_3 H^6 + a_4 H^8 + a_5 H^{10}$$

where R represents the radius of the osculating sphere and $a_1, a_2, \ldots, a_5$ are the aspheric coefficients.

In addition, the notation of, for example, D-03 means $10^{-3}$.

Numerical Example 5: (FIGS. 10, 14(A), 14(B), 14(C) and 14(D))
F = 28.8-78  FNo = 1:3.5-8.24  2ω = 73.8°-31.0°

| | | | |
|---|---|---|---|
| R1 = −84.53 | D1 = 1.50 | N1 = 1.77250 | ν1 = 49.6 |
| R2 = 18.21 | D2 = 2.17 | | |
| R3 = 21.31 | D3 = 4.58 | N2 = 1.68893 | ν2 = 31.1 |
| R4 = 150.23 | D4 = Variable | | |
| R5 = 39.85 | D5 = 3.04 | N3 = 1.49831 | ν3 = 65.0 |
| R6 = −51.65 | D6 = 0.15 | | |
| R7 = 14.63 | D7 = 3.25 | N4 = 1.57250 | ν4 = 57.8 |
| R8 = 8638.77 | D8 = 0.57 | | |
| R9 = −41.74 | D9 = 5.00 | N5 = 1.80518 | ν5 = 25.4 |
| R10 = 15.67 | D10 = 0.45 | | |
| R11 = 29.07 | D11 = 3.32 | N6 = 1.64769 | ν6 = 33.8 |
| R12 = −21.54 | D12 = 1.00 | | |
| R13 = Stop | D13 = Variable | | |
| R14 = −83.44 | D14 = 3.83 | N7 = 1.58500 | ν7 = 29.3 |
| R15 = −19.54 | D15 = 3.19 | | |
| R16 = −13.04 | D16 = 1.50 | N8 = 1.77250 | ν8 = 49.6 |
| R17 = 1897.07 | | | |

| Variable | Focal length | |
|---|---|---|
| separation | 28.8 | 78 |
| D4 | 12.01 | 1.00 |
| D13 | 11.86(13.78) | 2.5(3.73) |

R5: Aspheric
$a_1 = 0$
$a_2 = -1.06D-05$
$a_3 = -1.68D-07$
$a_4 = 1.57D-09$
$a_5 = -1.33D-11$
$f31/|f3| = 1.40$
$RIII2/RIII3 = 1.5$ Numerical Example 6: (FIGS. 11, 15(A), 15(B), 15(C) and 15(D))
F = 28.8-78  FNo = 1:3.6-8.6  2ω = 73.8°-31.0°

| | | | |
|---|---|---|---|
| R1 = −71.65 | D1 = 1.70 | N1 = 1.77250 | ν1 = 49.6 |
| R2 = 18.30 | D2 = 2.65 | | |
| R3 = 22.20 | D3 = 4.64 | N2 = 1.68893 | ν2 = 31.1 |
| R4 = 171.88 | D4 = Variable | | |
| R5 = 49.94 | D5 = 3.00 | N3 = 1.51633 | ν3 = 64.1 |
| R6 = −43.75 | D6 = 0.15 | | |
| R7 = 14.25 | D7 = 3.08 | N4 = 1.56384 | ν4 = 60.7 |
| R8 = 235.18 | D8 = 0.45 | | |
| R9 = −46.18 | D9 = 5.03 | N5 = 1.80518 | ν5 = 25.4 |
| R10 = 15.53 | D10 = 0.31 | | |
| R11 = 26.56 | D11 = 3.30 | N6 = 1.66680 | ν6 = 33.0 |
| R12 = −23.33 | D12 = 1.00 | | |
| R13 = Stop | D13 = Variable | | |
| R14 = −39.19 | D14 = 3.16 | N7 = 1.58500 | ν7 = 29.3 |
| R15 = −17.18 | D15 = 3.71 | | |
| R16 = −12.98 | D16 = 1.50 | N8 = 1.77250 | ν8 = 49.6 |
| R17 = −146.58 | | | |

| Variable | Focal length | |
|---|---|---|
| separation | 28.8 | 78 |
| D4 | 10.50 | 1.00 |
| D13 | 12.70(14.50) | 2.50(3.65) |

R5: Aspheric
$a_1 = 0$
$a_2 = -2.34D-07$
$a_3 = -1.07D-07$
$a_4 = 1.78D-09$
$a_5 = -1.58D-11$
$f31/|f3| = 1.57$
$RIII2/RIII3 = 1.32$ Numerical Example 7: (FIGS. 12, 16(A), 16(B), 16(C) and 16(D))
F = 28.8-81.6  FNo = 1:3.4-8.24  2ω = 73.8°-29.7°

| | | | |
|---|---|---|---|
| R1 = −83.96 | D1 = 1.70 | N1 = 1.77250 | ν1 = 49.6 |
| R2 = 20.24 | D2 = 3.04 | | |
| R3 = 25.12 | D3 = 47.5 | N2 = 1.69895 | ν2 = 30.1 |
| R4 = 180.77 | D4 = Variable | | |
| R5 = 34.03 | D5 = 3.44 | N3 = 1.51633 | ν3 = 64.1 |
| R6 = −79.83 | D6 = 0.15 | | |
| R7 = 16.19 | D7 = 4.63 | N4 = 1.56384 | ν4 = 60.7 |
| R8 = −430.50 | D8 = 0.49 | | |
| R9 = −49.84 | D9 = 5.00 | N5 = 1.84666 | ν5 = 23.9 |
| R10 = 14.22 | D10 = 0.28 | | |
| R11 = 17.59 | D11 = 3.77 | N6 = 1.58500 | ν6 = 29.3 |
| R12 = −22.50 | D12 = 1.00 | | |
| R13 = Stop | D13 = Variable | | |
| R14 = −45.28 | D14 = 3.23 | N7 = 1.58500 | ν7 = 29.3 |
| R15 = −18.91 | D15 = 4.06 | | |
| R16 = −12.77 | D16 = 1.50 | N8 = 1.71299 | ν8 = 53.8 |
| R17 = −540.53 | | | |

| Variable | Focal length | |
|---|---|---|
| separation | 28.8 | 81.6 |
| D4 | 14.81 | 1.00 |
| D13 | 11.08(12.83) | 2.50(3.80) |

| R5: Aspheric | R5: Aspheric |
|---|---|
| $a_1 = 0$ | $a_1 = 0$ |
| $a_2 = 7.57D-06$ | $a_2 = -9.62D-06$ |
| $a_3 = 1.33D-08$ | $a_3 = -1.46D-07$ |
| $a_4 = -3.82D-10$ | $a_4 = 4.57D-10$ |
| $a_5 = -2.99D-11$ | $a_5 = -6.22D-12$ |
| $f31/|f3| = 1.75$ | |
| $RIII2/RIII3 = 1.48$ | |

Numerical Example 8: (FIGS. 13, 17(A), 17(B), 17(C) and 17(D))
F = 36-102  FNo = 1:3.5-8.24  2ω = 62.0°-24.0°

| | | | |
|---|---|---|---|
| R1 = −55.52 | D1 = 1.50 | N1 = 1.71299 | ν1 = 53.8 |
| R2 = 20.98 | D2 = 1.35 | | |
| R3 = 23.04 | D3 = 4.20 | N2 = 1.64769 | ν2 = 33.8 |
| R4 = 778813.68 | D4 = Variable | | |
| R5 = 33.41 | D5 = 2.42 | N3 = 1.51633 | ν3 = 64.1 |
| R6 = −119.99 | D6 = 0.15 | | |
| R7 = 17.10 | D7 = 4.35 | N4 = 1.56384 | ν4 = 60.7 |
| R8 = −199.64 | D8 = 0.25 | | |
| R9 = −65.04 | D9 = 5.05 | N5 = 1.80518 | ν5 = 25.4 |
| R10 = 16.03 | D10 = 0.55 | | |
| R11 = 28.18 | D11 = 3.77 | N6 = 1.64769 | ν6 = 33.8 |
| R12 = −34.44 | D12 = 1.00 | | |
| R13 = Stop | D13 = Variable | | |
| R14 = −86.76 | D14 = 3.39 | N7 = 1.58500 | ν7 = 29.3 |
| R15 = −19.83 | D15 = 3.06 | | |
| R16 = −13.97 | D16 = 1.50 | N8 = 1.71299 | ν8 = 53.8 |

-continued

R17 = 1037.24

| Variable separation | Focal length | |
|---|---|---|
| | 36 | 102 |
| D4 | 15.12 | 1.00 |
| D13 | 14.40(17.45) | 2.50(4.58) |

R15: Aspheric
$a_1 = 0$
$a_2 = -1.19D-05$
$a_3 = -5.05D-09$
$a_4 = -5.95D-10$
$a_5 = -1.31D-12$
$f3_1/|f3| = 1.11$
$RIII2/RIII3 = 1.42$ FIG. 18 to FIG. 26 are block diagrams of numerical examples 9 to 17 of another specific embodiment of zoom lenses according to the invention. Here, an explanation is made with emphasis on the optical powers of the second and third lens groups.

In these drawings, I denotes a first lens group of negative power, II a second lens group of positive power and III a third lens group of negative power, and the arrows indicate the directions of movement of these lens groups when zooming from the wide-angle side to the telephoto side.

The zoom lens according to the present embodiment has a feature that when zooming from the wide-angle end to the telephoto end, the first to third lens groups each are moved forward independently of each other as shown in each of these drawings. By imparting such forward axial movement into the first lens group as zooming from the wide-angle end to the telephoto end, a shortening of the total length of the zoom lens in the wide-angle end is effectively done. In other words, a refractive power arrangement is employed that the total length of the zoom lens is short on the wide-angle side and long on the telephoto side.

And, another features are to satisfy the following conditions:

$$1.0 < |f3/f2| < 1.4 \ldots \quad (10)$$

$$0.7 < E1W/fW < 1.5 \ldots \quad (11)$$

$$0.83 < E2W/fW < 1.50 \ldots \quad (12)$$

where f2 and f3 are the focal lengths of the second and third lens groups respectively, fW is the shortest focal length of the entire lens system, and E1W and E2W are the the intervals between the principal points of the first and second lens groups and between the principal points of the second and third lens groups respectively in the wide-angle end.

By this, the requirement of getting the predetermined zoom ratio is easily fulfilled and the requirement of shortening the back focal distance in the wide-angle end so that a great shortening of the total length of the zoom lens is achieved in the wide-angle end while maintaining good stability of optical performance throughout the entire zooming range is satisfied.

The technical significance of each of the above-described features is explained below.

The inequalities of condition (10) concern with the ratio of the focal lengths of the second and third lens groups which contribute to vary the magnification of the 3-group zoom lens of the invention. When the upper limit of the inequalities of condition (10) is exceeded, the refractive power of the third lens group having the largest contribution to the variation of the magnification becomes too weak to obtain the predetermined zoom ratio by minimizing the total zooming movement of the third lens group. This must be avoided. Otherwise, the entire lens system would be caused to increase objectionably. Alternatively suppose the refractive power of the second lens group become too strong, then the Petzval sum increases in the positive direction. Particularly when in the intermediate focal length positions, therefore, the curvature of field is largely undercorrected. When the lower limit of the inequalities of condition (10) is exceeded, the refractive power of, in particular, the second lens group becomes too weak. Therefore, necessity arises that the space required for its zooming movement, that is, the sum of its spacings from the first lens group and the third lens group, must be secured larger. This leads to an increase in the size of the entire lens system.

When the upper limit of equalities of condition (11) is exceeded, the total length of the zoom lens gets larger, making it difficult to achieve a compact form of the entire lens system. When the lower limit is exceeded, it becomes difficult that the zoom ratio takes a large value.

The inequalities of condition (12), too, are similar to the inequalities of condition (11). When the upper limit of the inequalities of condition (12) is exceeded, the total length of the zoom lens gets larger, and it becomes difficult to achieve the compact form of the entire lens system. When the lower limit is exceeded, it becomes difficult that the zoom ratio takes a large value. These inequalities (11) and (12) are the indispensable conditions for the increase of the zoom ratio and the compact form as far as the zoom lens of the type in which as zooming from the wide-angle end to the telephoto end, the first, second and third lens groups move forward and particularly when at the telephoto end each of their air separations becomes the narrowest is concerned.

To obtain, in particular, a good optical performance over the entire zooming range, according to the invention, the second lens group is preferably constructed in such a way as to include at least two negative lenses. For this case, it is recommended that the second lens group is divided into two parts, i.e., a front lens group and a rear lens group, with a diaphragm intervening therebetween, and the front and rear lens groups each include at least one negative lens.

Along with such a lens arrangement, the first lens group has a negative form and the third lens group has a negative form. Since the second lens group, too, has its two parts divided on either side of the diaphragm and further included each with at least one negative lens, the entire lens system is made nearly symmetric with respect to the diaphragm, thereby giving an advantage that mainly distortion is little produced throughout the entire zooming range.

To well correct the barrel type distortion particularly on the wide-angle side, the second lens group may be constructed in such a way that at least one surface of the negative lens in the front lens group is made convex toward the front, and at least one surface of the negative lens in the rear lens group is made concave toward the rear.

Besides these, for improved results, the invention sets forth the following rules of lens design:

(a) The first is that the front lens group of the second lens group is formed to a positive refractive power in order that the diameter of the diaphragm in the second lens group is made as small as possible, and that the over-correction of mainly spherical aberration is well corrected.

(b) The second is that, for zooming purposes, the interval E1 between the principal points of the first and second lens groups and the interval E2 between the principal points of the second and third lens groups are made large so that the total zooming movements of the second and third lens groups can be secured sufficiently long to obtain the predetermined zoom ratio easily. In this connection, the following condition is set forth:

$$0.6 < |O_1'/L1| < 1.5 \ldots \quad (13)$$

where $O_1'$ is the distance from the rear principal point of the first lens group to the rear vertex of the second lens group and L1 is the axial length of the first lens group.

When the upper limit of the inequalities of condition (13) is exceeded, the total length of the zoom lens increases. When the lower limit is exceeded, the total movement of each of the lens groups is restricted to increase the difficulty of obtaining the predetermined zoom ratio.

(c) The third is that, letting the distance from the rear vertex of the second lens group to the front vertex of the third lens group in the wide-angle end be denoted by B2W, the following condition is satisfied:

$$3 < E2W/B2W < 5 \ldots \quad (14)$$

By this, the contribution of the third lens group to the variation of the image magnification is made sufficiently large, that is, a sufficiently large total zooming movement of the third lens group is secured. When the upper limit of the inequalities of condition (14) is exceeded, the space in which the third lens group can move gets smaller, increasing the difficulty of securing the predetermined zoom ratio.

Further, when the lower limit is exceeded, either an elongation of the total length of the zoom lens for the wide-angle end results, or the principal point of the third lens group has to be brought more forward by strengthening the negative refractive power of the third lens group. This results in an increase of the Petzval sum in the negative direction, which more or less over-corrects the curvature of field.

(d) The fourth is that the first lens group is constructed from at least one positive lens and at least one negative lens and letting the refractive index of the material of any of these lenses be denoted by $n_1$, it is desirable to satisfy the following condition:

$$1.55 < n_1 < 1.8 \ldots \quad (i)$$

The smaller the difference between the refractive indices of the materials of the aforesaid positive and negative lenses, the more desirable. For this reason, it is desirable that the refractive index of the material of any lens lies within the range defined by the inequalities of condition (i). When the upper limit is violated, the spherical aberration is under-corrected. When the lower limit is violated, it is over-corrected. Thus, no proper results are effected.

(e) The fifth is that letting the Abbe number of the material of a positive lens included in the front lens group of the second lens group be denoted by $\nu_{2P}$, it is desirable to satisfy the following condition:

$$\nu_{2P} > 40 \ldots \quad (ii)$$

When this range is overstepped, the longitudinal chromatic aberration particularly for the telephoto end is objectionably under-corrected. It is more desirable on chromatic aberration correction that, in particular, the front lens group is included with a positive lens at the frontmost position, and, letting the Abbe number of the material of this positive lens be denoted by $\nu_{21P}$, $$\nu_{21P} > 55 \ldots \quad (iii)$$

is satisfied.

(f) The sixth is that in order to eliminate the inward coma flare owing to the rays from the lower margin of the lens and the barrel type distortion in the wide-angle end, one of the lens surfaces of the first lens group may be made aspheric in such a shape that the positive refractive power gets progressively stronger, or the negative refractive power gets progressively weaker, toward the margin.

Also, in order to eliminate the barrel type distortion in the wide-angle end and the inward coma owing to the rays from the upper margin in the telephoto end, one of the lens surfaces of the third lens group may be made aspheric in such a shape that the positive or negative refractive power gets progressively weaker or stronger respectively toward the margin.

(g) The seventh is that when zooming from the wide-angle end to the telephoto end, the front lens group and the rear lens group are preferably made to move in differential relation, for the variation of the aberrations is lessened and the zoom ratio is further increased.

It should be noted that in the present embodiment of the invention, focusing (distance adjustment) is performed desirably by the first lens group, but it may otherwise be done by the third lens group. Also, the use of the third lens group for focusing purposes may be limited only to a region of the zooming range, or a region of the focusing range.

Next, numerical examples 9 to 17 of zoom lenses of the invention are shown.

Also, the values of the factors of the above-described conditions (10) to (14) for the numerical examples 9 to 17 are listed in Table-2.

| Numerical Example 9: (FIGS. 18, 27(A), 27(B) and 27(C)) $F = 36.214 \, 101.85 \quad FNo = 1:29-6.8 \quad 2\omega = 61.7°-23.99°$ | | | |
|---|---|---|---|
| R1 = −72.15 | D1 = 1.70 | N1 = 1.69680 | ν1 = 55.5 |
| R2 = 24.07 | D2 = 2.44 | | |
| R3 = 28.01 | D3 = 4.10 | N2 = 1.68893 | ν2 = 31.1 |
| R4 = 166.66 | D4 = Variable | | |
| R5 = 46.03 | D5 = 3.25 | N3 = 1.48749 | ν3 = 70.2 |
| R6 = −53.87 | D6 = 0.20 | | |
| R7 = 22.75 | D7 = 5.97 | N4 = 1.58267 | ν4 = 46.4 |
| R8 = −22.75 | D8 = 1.98 | N5 = 1.84666 | ν5 = 23.9 |
| R9 = 93.76 | D9 = 1.48 | | |
| R10 = Stop | D10 = 3.10 | | |
| R11 = 45.81 | D11 = 1.23 | N6 = 1.83400 | ν6 = 37.2 |
| R12 = 22.25 | D12 = 1.13 | | |
| R13 = 60.32 | D13 = 3.50 | N7 = 1.68893 | ν7 = 31.1 |
| R14 = −31.53 | D14 = Variable | | |
| R15 = 283.83 | D15 = 3.69 | N8 = 1.62004 | ν8 = 36.3 |
| R16 = −24.21 | D16 = 2.33 | | |
| R17 = −20.32 | D17 = 1.20 | N9 = 1.74400 | ν9 = 44.8 |
| R18 = 68.93 | D18 = 4.47 | | |
| R19 = −18.45 | D19 = 1.50 | N10 = 1.62299 | ν10 = 58.1 |
| R20 = −31.43 | | | |

Numerical Example 10: (FIGS. 19, 28(A), 28(B) and 28(C))
F = 36.22–101.94  FNo = 1:29–6.8  2ω = 61.7°–23.99°

| | Focal length | | |
|---|---|---|---|
| Variation separation | W 36.22 | M 62.53 | T 101.85 |
| D4 | 19.34 | 9.26 | 0.89 |
| D14 | 8.49 | 2.98 | 0.86 |

| R1 = −80.18 | D1 = 1.70 | N1 = 1.69680 | ν1 = 55.5 |
|---|---|---|---|
| R2 = 24.36 | D2 = 2.88 | | |
| R3 = 29.00 | D3 = 3.76 | N2 = 1.68893 | ν2 = 31.1 |
| R4 = 127.96 | D4 = Variable | | |
| R5 = 48.25 | D5 = 2.98 | N3 = 1.51633 | ν3 = 64.1 |
| R6 = −60.51 | D6 = 0.20 | | |
| R7 = 22.94 | D7 = 6.80 | N4 = 1.58267 | ν4 = 46.4 |
| R8 = −23.54 | D8 = 2.09 | N5 = 1.84666 | ν5 = 23.9 |
| R9 = 117.47 | D9 = 1.57 | | |
| R10 = Stop | D10 = 2.63 | | |
| R11 = 44.19 | D11 = 1.20 | N6 = 1.83400 | ν6 = 37.2 |
| R12 = 20.70 | D12 = 1.42 | | |
| R13 = 50.37 | D13 = 3.79 | N7 = 1.64769 | ν7 = 33.8 |
| R14 = −31.99 | D14 = Variable | | |
| R15 = 246.66 | D15 = 3.72 | N8 = 1.62004 | ν8 = 36.3 |
| R16 = −24.28 | D16 = 2.08 | | |
| R17 = −22.30 | D17 = 1.20 | N9 = 1.74400 | ν9 = 44.8 |
| R18 = 69.07 | D18 = 4.94 | | |
| R19 = −16.60 | D19 = 1.50 | N10 = 1.62299 | ν10 = 58.1 |
| R20 = −28.50 | | | |

| | Focal length | | |
|---|---|---|---|
| Variation separation | W 36.22 | M 62.53 | T 101.94 |
| D | 19.20 | 9.11 | 0.74 |
| D14 | 8.20 | 2.66 | 0.69 |

Numerical Example 11: (FIGS. 20, 29(A), 29(B) and 29(C))
F = 36.20–101.51  FNo = 1:2.9–6.6  2ω = 61.7°–24.0°

| R1 = −65.20 | D1 = 1.70 | N1 = 1.77250 | ν1 = 49.6 |
|---|---|---|---|
| R2 = 28.29 | D2 = 2.56 | | |
| R3 = 33.11 | D3 = 4.27 | N2 = 1.72825 | ν2 = 28.5 |
| R4 = 946.73 | D4 = Variable | | |
| R5 = 50.03 | D5 = 2.80 | N3 = 1.51633 | ν3 = 64.1 |
| R6 = −80.62 | D6 = 0.20 | | |
| R7 = 29.19 | D7 = 4.84 | N4 = 1.57135 | ν4 = 53.0 |
| R8 = −25.51 | D8 = 2.10 | N5 = 1.84666 | ν5 = 23.9 |
| R9 = 394.09 | D9 = 1.28 | | |
| R10 = Stop | D10 = 5.70 | | |
| R11 = 59.07 | D11 = 1.18 | N6 = 1.83400 | ν6 = 37.2 |
| R12 = 26.22 | D12 = 1.56 | | |
| R13 = 52.16 | D13 = 3.02 | N7 = 1.69895 | ν7 = 30.1 |
| R14 = −41.07 | D14 = Variable | | |
| R15 = 112.67 | D15 = 3.83 | N8 = 1.58144 | ν8 = 40.8 |
| R16 = −36.04 | D16 = 4.74 | | |
| R17 = −24.03 | D17 = 1.20 | N9 = 1.83400 | ν9 = 37.2 |
| R18 = 370.96 | D18 = 1.51 | | |
| R19 = −61.76 | D19 = 1.50 | N10 = 1.62299 | ν10 = 58.1 |
| R20 = 114.89 | | | |

| | Focal length | | |
|---|---|---|---|
| Variation separation | W 36.20 | M 63.81 | T 101.51 |
| D4 | 18.32 | 8.68 | 0.97 |
| D14 | 11.65 | 3.51 | 0.47 |

Numerical Example 12: (FIGS. 21, 30(A), 30(B) and 30(C))
F = 36.2–101.85  FNo = 1:2.9–6.8  2ω = 61.7°–24.0°

| R1 = −72.16 | D1 = 1.70 | N1 = 1.69680 | ν1 = 55.5 |
|---|---|---|---|
| R2 = 24.97 | D2 = 2.98 | | |
| R3 = 29.68 | D3 = 3.55 | N2 = 1.68893 | ν2 = 31.1 |
| R4 = 138.53 | D4 = Variable | | |
| R5 = 44.50 | D5 = 3.03 | N3 = 1.51633 | ν3 = 64.1 |
| R6 = −58.21 | D6 = 0.20 | | |
| R7 = 25.72 | D7 = 2.76 | N4 = 1.57135 | ν4 = 53.0 |
| R8 = 56.85 | D8 = 1.00 | | |
| R9 = 58.72 | D9 = 3.96 | N5 = 1.58144 | ν5 = 40.8 |
| R10 = −22.55 | D10 = 1.30 | N6 = 1.84666 | ν6 = 23.9 |
| R11 = 89.41 | D11 = 1.74 | | |
| R12 = Stop | D12 = 4.23 | | |
| R13 = 32.19 | D13 = 1.20 | N7 = 1.83400 | ν7 = 37.2 |
| R14 = 21.45 | D14 = 1.29 | | |
| R15 = 46.50 | D15 = 3.16 | N8 = 1.62004 | ν8 = 36.3 |
| R16 = −36.12 | D16 = Variable | | |
| R17 = 410.84 | D17 = 3.22 | N9 = 1.64769 | ν9 = 33.8 |
| R18 = −28.01 | D18 = 3.21 | | |
| R19 = −21.70 | D19 = 1.20 | N10 = 1.74400 | ν10 = 44.8 |
| R20 = 67.74 | D20 = 4.28 | | |
| R21 = −17.96 | D21 = 1.50 | N11 = 1.62299 | ν11 = 58.1 |
| R22 = −27.36 | | | |

| | Focal length | | |
|---|---|---|---|
| Variation separation | W 36.20 | M 62.42 | T 101.85 |
| D4 | 18.75 | 8.67 | 0.30 |
| D16 | 7.81 | 2.25 | 0.35 |

Numerical Example 13: (FIGS. 22, 31(A), 31(B) and 31(C))
F = 36.2–130.5  FNo = 1:3.6–8.1  2ω = 61.7°–18.8°

| R1 = −67.29 | D1 = 1.75 | N1 = 1.74400 | ν1 = 44.8 |
|---|---|---|---|
| R2 = 25.51 | D2 = 1.19 | | |
| R3 = 26.35 | D3 = 5.19 | N2 = 1.58347 | ν2 = 29.8 |
| R4 = −379.76 | D4 = Variable | | |
| R5 = 58.08 | D5 = 2.37 | N3 = 1.51633 | ν3 = 64.1 |
| R6 = −127.87 | D6 = 0.19 | | |
| R7 = 29.44 | D7 = 5.89 | N4 = 1.57099 | ν4 = 50.8 |
| R8 = −22.67 | D8 = 2.24 | N5 = 1.84666 | ν5 = 23.9 |
| R9 = −169.15 | D9 = 2.11 | | |
| R10 = Stop | D10 = 6.28 | | |
| R11 = 69.70 | D11 = 1.33 | N6 = 1.83400 | ν6 = 37.2 |
| R12 = 25.11 | D12 = 0.60 | | |
| R13 = 44.09 | D13 = 2.66 | N7 = 1.69895 | ν7 = 30.1 |
| R14 = −40.91 | D14 = Variable | | |
| R15 = 219.21 | D15 = 2.80 | N8 = 1.62004 | ν8 = 36.3 |
| R16 = −35.98 | D16 = 4.80 | | |
| R17 = −29.52 | D17 = 1.30 | N9 = 1.83400 | ν9 = 37.2 |
| R18 = 76.46 | D18 = 4.64 | | |
| R19 = −20.44 | D19 = 1.50 | N10 = 1.62299 | ν10 = 58.1 |
| R20 = −42.52 | | | |

| | Focal length | | |
|---|---|---|---|
| Variation separation | W 36.22 | M 73.32 | T 130.50 |
| D4 | 25.22 | 11.50 | 0.89 |
| D14 | 8.74 | 1.82 | 0.42 |

Numerical Example 14: (FIGS. 23, 32(A), 32(B) and 32(C))
F = 36.2–130.5  FNo = 1:3.6–8.1  2ω = 61.7°–18.8°

| R1 = −92.65 | D1 = 1.75 | N1 = 1.77250 | ν1 = 49.6 |
|---|---|---|---|
| R2 = 28.49 | D2 = 2.10 | | |
| R3 = 30.18 | D3 = 4.41 | N2 = 1.58347 | ν2 = 29.8 |
| R4 = 1023.82 | D4 = Variable | | |
| R5 = 49.55 | D5 = 2.37 | N3 = 1.51633 | ν3 = 64.1 |
| R6 = −193.60 | D6 = 0.19 | | |
| R7 = 28.86 | D7 = 5.57 | N4 = 1.57135 | ν4 = 53.0 |
| R8 = −26.28 | D8 = 1.37 | N5 = 1.84666 | ν5 = 23.9 |
| R9 = −333.68 | D9 = 4.34 | | |
| R10 = Stop | D10 = 6.32 | | |
| R11 = 71.21 | D11 = 1.33 | N6 = 1.83400 | ν6 = 37.2 |
| R12 = 22.22 | D12 = 0.37 | | |
| R13 = 29.49 | D13 = 2.78 | N7 = 1.68893 | ν7 = 31.1 |
| R14 = −47.57 | D14 = Variable | | |
| R15 = 88.47 | D15 = 3.03 | N8 = 1.59551 | ν8 = 39.2 |
| R16 = −36.86 | D16 = 3.29 | | |
| R17 = −37.03 | D17 = 1.30 | N9 = 1.83400 | ν9 = 37.2 |
| R18 = 57.48 | D18 = 4.80 | | |
| R19 = −16.51 | D19 = 1.50 | N10 = 1.62299 | ν10 = 58.1 |
| R20 = −36.22 | | | |

| | Focal length | | |
|---|---|---|---|
| Variation separation | W 36.21 | M 73.39 | T 130.51 |
| D4 | 25.18 | 11.46 | 0.85 |
| D14 | 8.83 | 1.88 | 0.47 |

Numerical Example 15: (FIGS. 24, 33(A), 33(B) and 33(C))
F = 36.19–130.51  FNo = 1:36–8.1  2ω = 61.7°–18.8°

| R1 = −87.60 | D1 = 1.75 | N1 = 1.77250 | ν1 = 49.6 |
|---|---|---|---|
| R2 = 26.42 | D2 = 2.35 | | |
| R3 = 28.26 | D3 = 5.33 | N2 = 1.58347 | ν2 = 29.8 |
| R4 = −2878.99 | D4 = Variable | | |
| R5 = 40.19 | D5 = 2.73 | N3 = 1.51633 | ν3 = 64.1 |
| R6 = −160.34 | D6 = 0.20 | | |
| R7 = 29.79 | D7 = 4.68 | N4 = 1.57135 | ν4 = 53.0 |

-continued

| | | | |
|---|---|---|---|
| R8 = −27.74 | D8 = 1.19 | N5 = 1.84666 | ν5 = 23.9 |
| R9 = −737.02 | D9 = 7.54 | | |
| R10 = Stop | D10 = 1.15 | | |
| R11 = 77.19 | D11 = 1.33 | N6 = 1.83400 | ν6 = 37.2 |
| R12 = 24.48 | D12 = 0.67 | | |
| R13 = 41.72 | D13 = 2.55 | N7 = 1.68893 | ν7 = 31.1 |
| R14 = −49.37 | D14 = Variable | | |
| R15 = 38.93 | D15 = 3.50 | N8 = 1.59551 | ν8 = 39.2 |
| R16 = −42.87 | D16 = 0.10 | | |
| R17 = 185.98 | D17 = 1.30 | N9 = 1.83400 | ν9 = 37.2 |
| R18 = 27.46 | D18 = 5.62 | | |
| R19 = −14.34 | D19 = 1.50 | N10 = 1.62299 | ν10 = 58.1 |
| R20 = −61.83 | | | |

-continued

| | | | |
|---|---|---|---|
| R16 = −35.21 | D16 = 0.18 | | |
| R17 = 218.03 | D17 = 1.30 | N9 = 1.83400 | ν9 = 37.2 |
| R18 = 40.90 | D18 = 5.41 | | |
| R19 = −15.49 | D19 = 1.50 | N10 = 1.60311 | ν10 = 60.7 |
| R20 = −104.28 | | | |

| | Focal length | | |
|---|---|---|---|
| Variation | W | M | T |
| separation | 36.20 | 76.71 | 130.52 |
| D4 | 24.24 | 8.71 | 0.99 |
| D14 | 13.49 | 3.97 | 0.48 |

TABLE 2

| Numerical examples | Conditions | | | | |
|---|---|---|---|---|---|
| | (10) \|f3/f2\| | (11) E1W/fW | (12) E2W/fW | (13) \|0₁'/L1\| | (14) E2W/B2W |
| 9 | 1.19 | 0.92 | 0.85 | 0.98 | 3.62 |
| 10 | 1.248 | 0.91 | 0.88 | 0.99 | 3.87 |
| 11 | 1.225 | 0.98 | 1.08 | 1.14 | 3.37 |
| 12 | 1.238 | 0.95 | 0.91 | 1.02 | 4.24 |
| 13 | 1.07 | 1.11 | 1.00 | 0.92 | 4.15 |
| 14 | 1.053 | 1.13 | 1.02 | 0.98 | 4.18 |
| 15 | 1.205 | 1.07 | 1.10 | 1.04 | 3.21 |
| 16 | 1.262 | 1.01 | 1.07 | 0.91 | 3.13 |
| 17 | 1.300 | 1.02 | 1.13 | 1.00 | 3.03 |

| | Focal length | | |
|---|---|---|---|
| Variation | W | M | T |
| separation | 36.19 | 75.56 | 130.51 |
| D4 | 24.22 | 9.65 | 0.98 |
| D14 | 12.19 | 3.24 | 0.48 |

Numerical Example 16: (FIGS. 25, 34(A), 34(B) and 34(C))
F = 36.20–130.52  FNo = 1:3.6–8.1  2ω = 61.7° −18.8°

| | | | |
|---|---|---|---|
| R1 = −93.07 | D1 = 1.75 | N1 = 1.77250 | ν1 = 49.6 |
| R2 = 24.99 | D2 = 1.97 | | |
| R3 = 27.34 | D3 = 4.98 | N2 = 1.68893 | ν2 = 31.1 |
| R4 = 235.34 | D4 = Variable | | |
| R5 = 36.39 | D5 = 2.94 | N3 = 1.51633 | ν3 = 64.1 |
| R6 = −114.42 | D6 = 0.20 | | |
| R7 = 29.41 | D7 = 5.48 | N4 = 1.58267 | ν4 = 46.4 |
| R8 = −25.99 | D8 = 1.60 | N5 = 1.84666 | ν5 = 23.9 |
| R9 = 279.52 | D9 = 5.82 | | |
| R10 = Stop | D10 = 1.15 | | |
| R11 = 59.15 | D11 = 1.33 | N6 = 1.83400 | ν6 = 37.2 |
| R12 = 24.49 | D12 = 0.76 | | |
| R13 = 51.41 | D13 = 2.45 | N7 = 1.68893 | ν7 = 31.1 |
| R14 = −45.44 | D14 = Variable | | |
| R15 = 57.07 | D15 = 3.43 | N8 = 1.59551 | ν8 = 39.2 |
| R16 = −36.03 | D16 = 0.12 | | |
| R17 = 376.81 | D17 = 1.30 | N9 = 1.83400 | ν9 = 37.2 |
| R18 = 35.32 | D18 = 5.30 | | |
| R19 = −14.65 | D19 = 1.50 | N10 = 1.60311 | ν10 = 60.7 |
| R20 = −84.79 | | | |

| | Focal length | | |
|---|---|---|---|
| Variation | W | M | T |
| separation | 36.20 | 76.18 | 130.52 |
| D4 | 24.24 | 8.95 | 0.99 |
| D14 | 12.41 | 3.64 | 0.48 |

Numerical Example 17: (FIGS. 26, 35(A), 35(B) and 35 (C))
F = 36.20–130.5  FNo = 1:3.6–8.1  2ω = 61.7° −18.8°

| | | | |
|---|---|---|---|
| R1 = −77.35 | D1 = 1.75 | N1 = 1.80400 | ν1 = 46.6 |
| R2 = 27.02 | D2 = 2.02 | | |
| R3 = 29.80 | D3 = 5.04 | N2 = 1.69895 | ν2 = 30.1 |
| R4 = 1478.05 | D4 = Variable | | |
| R5 = 39.14 | D5 = 3.15 | N3 = 1.51633 | ν3 = 64.1 |
| R6 = −79.32 | D6 = 0.20 | | |
| R7 = 30.57 | D7 = 5.62 | N4 = 1.58267 | ν4 = 46.4 |
| R8 = −27.06 | D8 = 1.60 | N5 = 1.84666 | ν5 = 23.9 |
| R9 = 351.10 | D9 = 6.42 | | |
| R10 = Stop | D10 = 1.14 | | |
| R11 = 72.18 | D11 = 1.33 | N6 = 1.83400 | ν6 = 37.2 |
| R12 = 25.68 | D12 = 0.70 | | |
| R13 = 55.31 | D13 = 2.32 | N7 = 1.68893 | ν7 = 31.1 |
| R14 = −47.77 | D14 = Variable | | |
| R15 = 97.80 | D15 = 3.21 | N8 = 1.59551 | ν8 = 39.2 |

FIG. 36 to FIG. 40 are block diagrams of numerical examples 18 to 22 of zoom lenses of the invention. In these drawings, (A) represents the wide-angle end and (B) the telephoto end.

In these drawings, I denotes a first lens group of negative power, II a second lens group of positive power, and III a third lens group of negative power. The arrow indicates the direction of movement of each lens group when zooming from the wide-angle end to the telephoto end.

Zooming from the wide-angle end to the telephoto end is performed by moving any of the first, second and third lens groups forward under the following condition:

$$0.8 < (D1W\text{-}D1T)/(D2W\text{-}D2T) < 2 \ldots \quad (15)$$

wherein D1W-D1T>0, D2W-D2T>0, where D1W and D1T are the air separations between the first and second lens groups in the wide-angle end and the telephoto end respectively, and D2W and D2T are the air separations between the second and third lens groups.

By this, the predetermined zoom ratio is easily obtained and, while maintaining good stability of optical performance throughout the entire zooming range, the back focal distance for the wide-angle end is shortened and a great shortening of the total length of the zoom lens for the wide-angle end is achieved.

Next, the technical significance of the above-described condition is explained.

The inequalities of condition (15) have aims that all the lens groups are made to move in such relation that each of their air separations is narrower when in the telephoto end than when in the wide-angle end and that the ratio of the changed amount of the separation between the first and second lens groups to the changed amount of the separation between the second and third lens groups when zooming is made properly.

When the upper limit of the inequalities of condition (15) is exceeded, the separation D1W tends to be too much large, and the separation D2W to be too much small, and the total zooming movements of the first lens group and the third lens group get smaller. Such a decrease of the movement of the first lens group causes the total length of the zoom lens for the wide-angle end to increase and the height of incidence of the off-axial light ray on the first lens group to increase. In turn, the lens diameter increases, making it difficult to achieve the desired increase of the view angle in the wide-angle end. Such a decrease of the movement of the third lens group causes the back focal distance for the wide-angle end to increase, which in turn causes the total length of the zoom lens to increase objectionably. As the separation D1W increases, the height of incidence of the on-axial light ray on the second lens group in the wide-angle end increases to increase the difficulty of well correcting the various aberrations on the wide-angle side.

Meanwhile, when the lower limit of the inequalities of condition (15) is exceeded, the separation D1W tends to be too much small and the separation D2W to be too much large, and the movements of the first lens group and the third lens group increase to increase the difficulty of achieving the increase of the zoom ratio on the mechanical structure.

Particularly with the third lens group, when its movement increases, the back focal distance shortens in the wide-angle end to increase the difficulty of increasing the view angle in the wide-angle end. Also, with the presumption of retaining somewhat excessive back focal distance in the wide-angle end, the distance from the second lens group to the image plane increases to increase the height of incidence of the on-axial light ray on the second lens group, causing the F-number to be hardly made faster in the telephoto end.

The zoom lens the present invention aims at is achieved by satisfying the above-described various conditions. Yet, to achieve a further improvement of the zoom lens by increasing the zoom ratio and by shortening the total length to the compact form in such a manner that the optical performance is kept excellent over the increased entire zooming range, the following various condition may be satisfied.

The first lens group includes at least two lenses, of which the first counting from front is a negative lens 11 having a concave surface facing the image side and the second is a positive lens 12 having a convex surface facing the object side. The second lens group includes a plurality of positive lenses and at least one negative lens. The third lens group includes a positive lens and a negative lens, i.e., at least two lenses. Letting the radius of curvature of the rear surface of that negative lens 11 be denoted by RA, and the radius of curvature of the front surface of the positive lens 12 by RB, the following condition is satisfied:

$$RA < RB, RA > 0, RB > 0 \ldots \quad (16)$$

In the zoom lens comprising three lens groups of negative, positive and negative powers in this order from front according to the invention, if the first and third lens groups of negative power each is constructed with one negative lens, the Petzval sum would increase in the negative direction and along with this the color dispersion also would increase, which deteriorates the image surface characteristics and the color dispersion characteristic in each lens group, so that the variation with zooming of the aberrations comes to increase. For this reason, in the present embodiment, each of the first and third lens groups is constructed from negative and positive lenses of predetermined forms, i.e., at least two lenses. By this, despite the increase of the zoom ratio, a high optical performance is obtained.

Particularly the negative lens, as in the first lens group, is arranged on the object side, or, as in the third lens group, on the image side, so that while maintaining the symmetry of optical arrangement over the entire lens system in good balance, the angle of incidence of the off-axial ray in the wide-angle end is made small to minimize the aberrations produced and, at the same time, a shortening of the lens diameter is achieved. In particular, it is made easy to widen the view angle in the wide-angle end.

Meanwhile, for the second lens group, because the entirety of the lens system has the positive refractive power, its positive refractive power has to take a larger value than the absolute value of the combined negative refractive power of the first and third lens groups. Also, since the axial beam comes to enter the second lens group at high heights over the entire zooming range, if it is constructed with, for example, only one positive lens, the spherical aberration tends to be under-corrected.

For this reason, in the present embodiment, the second lens group is made to include two or more positive lenses and at least one negative lens. By this, the image surface characteristic, the color dispersion characteristic and aberrations such as spherical aberration are corrected in good balance.

In addition, in the first lens group, because of its having the negative power, the refractive power of the negative lens 11 has to be larger than the refractive power of the positive lens 12. For this reason, the rear surface of the negative lens 11 is made to be a negative refracting surface concave toward the rear and having the radius of curvature RA so that mainly the distortion produced from the negative lens 11 in the wide-angle end is lessened.

And, since this also causes the rear surface of the negative lens 11 to produce positive spherical aberration in the telephoto end, the front surface of the positive lens 12 in the first lens group is made to be a positive refracting surface convex toward the front and having its radius of curvature RB satisfy the condition (16), in other words, the air lens formed by these lens surfaces is made negative in refractive power, with an advantage that along with the aforesaid distortion in the wide-angle end, that spherical aberration is corrected in good balance.

Particularly under a condition that the refractive index of the material of the negative lens 11 is made higher than that of the material of the positive lens 12 to improve the curvature of field in the first lens group, the rear surface of the negative lens 11 produces positive spherical aberration. So the front surface of the positive lens 12 is made to have its radius of curvature satisfy the condition (16), thereby well correcting that spherical aberration.

Though, in the embodiment shown FIG. 36 to FIG. 40, the zoom lens has been described as comprising only three lens groups all movable for zooming, it is to be understood that even if the third lens group is followed by an additional lens group which has little contribution to the variation of the image magnification, for example, a mere fixed lens group of positive or negative power which remains stationary or moves slightly during zooming, or a focusing lens group, a zoom lens the present invention aims at can be achieved.

Next, numerical examples 18 to 22 of zoom lenses of the invention are shown. In these numerical examples, Ri is the radius of curvature of the i-th lens surface counting from front, Di is the i-th lens thickness or air separation counting from front and Ni and $\nu i$ the refractive index and Abbe number of the glass of the i-th lens element counting from front respectively.

The aspheric surface is figured in the coordinates of an X axis in the axial direction and an H axis in the perpendicular direction to the optical axis with the direction in which light advances being taken as positive by using the following equation:

$$X = \frac{(1/R)H^2}{1 + \sqrt{1 - (H/R)^2}} + a_1 H^2 + a_2 H^4 + a_3 H^6 + a_4 H^8 + a_5 H^{10}$$

where R represents the radius of the osculating sphere and $a_1, a_2, \ldots$, and $a_5$ and $b_1, b_2, \ldots$, and $b_4$ are the aspheric coefficients.

Numerical Example 18: (FIGS. 36, 41(A), 41(B) and 41 (C))
$F = 36-102$  $FNo = 1:3.5-8.24$  $2\omega = 62.0°-24.0°$

| | | | |
|---|---|---|---|
| R1 = −55.52 | D1 = 1.50 | N1 = 1.70299 | $\nu 1$ = 53.8 |
| R2 = 20.98 | D2 = 1.35 | | |
| R3 = 23.04 | D3 = 4.20 | N2 = 1.64769 | $\nu 2$ = 33.8 |
| R4 = 778813.68 | D4 = Variable | | |
| R5 = 33.41 | D5 = 2.42 | N3 = 1.51633 | $\nu 3$ = 64.1 |
| R6 = −119.99 | D6 = 0.15 | | |
| R7 = 17.10 | D7 = 4.35 | N4 = 1.56384 | $\nu 4$ = 60.7 |
| R8 = −199.64 | D8 = 0.25 | | |
| R9 = −65.04 | D9 = 5.05 | N5 = 1.80518 | $\nu 5$ = 25.4 |
| R10 = 16.03 | D10 = 0.55 | | |
| R11 = 28.18 | D11 = 3.77 | N6 = 1.64769 | $\nu 6$ = 33.8 |
| R12 = −34.44 | D12 = 1.00 | | |
| R13 = Stop | D13 = Variable | N7 = 1.58500 | $\nu 7$ = 29.3 |
| R14 = −86.76 | D14 = 3.39 | | |
| R15 = −19.83 | D15 = 3.06 | N8 = 1.71299 | $\nu 8$ = 53.8 |
| R16 = −13.97 | D16 = 1.50 | | |
| R17 = 1037.24 | | | |

| Variable separation | Focal Length | | |
|---|---|---|---|
| | 36 | 68 | 102 |
| D4 | 15.12 | 8.06 | 1.00 |
| D13 | 14.40 | 4.03 | 2.5 |

R15: Aspheric
$a_1 = 0$
$a_2 = -1.9 \times 10^{-5}$
$a_3 = -5.05 \times 10^{-9}$
$a_4 = -5.95 \times 10^{-10}$
$a_5 = -1.31 \times 10^{-12}$

Numerical Example 19: (FIGS. 37, 42(A), 42(B) and 42(C))
$F = 28.8-81.6$  $FNo = 1:3.4-8.24$  $2\omega = 73.8°-29.7°$

| | | | |
|---|---|---|---|
| R1 = −83.96 | D1 = 1.70 | N1 = 1.77250 | $\nu 1$ = 49.6 |
| R2 = 20.24 | D2 = 3.04 | | |
| R3 = 25.12 | D3 = 4.75 | N2 = 1.69895 | $\nu 2$ = 30.1 |
| R4 = 180.77 | D4 = Variable | | |
| R5 = 34.03 | D5 = 3.44 | N3 = 1.51633 | $\nu 3$ = 64.1 |
| R6 = −79.83 | D6 = 0.15 | | |
| R7 = 16.19 | D7 = 4.63 | N4 = 1.56384 | $\nu 4$ = 60.7 |
| R8 = −430.50 | D8 = 0.49 | | |
| R9 = −49.84 | D9 = 5.00 | N5 = 1.84666 | $\nu 5$ = 23.9 |
| R10 = 14.22 | D10 = 0.28 | | |
| R11 = 17.59 | D11 = 3.77 | N6 = 1.58500 | $\nu 6$ = 29.3 |
| R12 = −22.50 | D12 = 1.00 | | |
| R13 = Stop | D13 = Variable | N7 = 1.58500 | $\nu 7$ = 29.3 |
| R14 = −45.22 | D14 = 3.23 | | |
| R15 = −18.91 | D15 = 4.06 | N8 = 1.71299 | $\nu 8$ = 53.8 |
| R16 = −12.77 | D16 = 1.50 | | |
| R17 = −540.53 | | | |

| Variable separation | Focal Length | | |
|---|---|---|---|
| | 28.8 | 54.2 | 81.6 |
| D4 | 14.81 | 7.91 | 1.00 |
| D13 | 11.08 | 3.38 | 2.50 |

| R12: Aspheric | R15: Aspheric |
|---|---|
| $a_1 = 0$ | $a_1 = 0$ |
| $a_2 = -7.57 \times 10^{-6}$ | $a_2 = -9.62 \times 10^{-6}$ |
| $a_3 = 1.33 \times 10^{-8}$ | $a_3 = -1.46 \times 10^{-7}$ |
| $a_4 = -3.82 \times 10^{-10}$ | $a_4 = 4.57 \times 10^{-10}$ |
| $a_5 = -2.99 \times 10^{-11}$ | $a_5 = -6.22 \times 10^{-12}$ |

Numerical Example 20: (FIGS. 38, 43(A), 43(B) and 43 (C))
$F = 28.8-78$  $FNo = 1:3.6-8.6$  $2\omega = 73.8°-31.0°$

| | | | |
|---|---|---|---|
| R1 = −71.65 | D1 = 1.70 | N1 = 1.77250 | $\nu 1$ = 49.6 |
| R2 = 18.30 | D2 = 2.65 | | |
| R3 = 22.20 | D3 = 4.64 | N2 = 1.68893 | $\nu 2$ = 31.1 |
| R4 = 171.88 | D4 = Variable | | |
| R5 = 49.94 | D5 = 3.00 | N3 = 1.51633 | $\nu 3$ = 64.1 |
| R6 = −43.75 | D6 = 0.15 | | |
| R7 = 14.25 | D7 = 3.08 | N4 = 1.56384 | $\nu 4$ = 60.7 |
| R8 = 235.18 | D8 = 0.45 | | |
| R9 = −46.18 | D9 = 5.03 | N5 = 1.80518 | $\nu 5$ = 25.4 |
| R10 = 15.53 | D10 = 0.31 | | |
| R11 = 26.56 | D11 = 3.30 | N6 = 1.66680 | $\nu 6$ = 33.0 |
| R12 = −23.33 | D12 = 1.00 | | |
| R13 = Stop | D13 = Variable | N7 = 1.58500 | $\nu 7$ = 29.3 |
| R14 = −39.19 | D14 = 3.16 | | |
| R15 = −17.18 | D15 = 3.71 | N8 = 1.77250 | $\nu 8$ = 49.6 |
| R16 = −12.98 | D16 = 1.50 | | |
| R17 = −146.58 | | | |

| Variable separation | Focal Length | | |
|---|---|---|---|
| | 28.8 | 53.3 | 78.0 |
| D4 | 10.50 | 5.75 | 1.00 |
| D13 | 12.70 | 4.09 | 2.50 |

R15: Aspheric
$a_1 = 0$
$a_2 = 2.34 \times 10^{-7}$
$a_3 = -1.07 \times 10^{-7}$
$a_4 = 1.78 \times 10^{-9}$
$a_5 = -1.58 \times 10^{-11}$

Figure 44A:
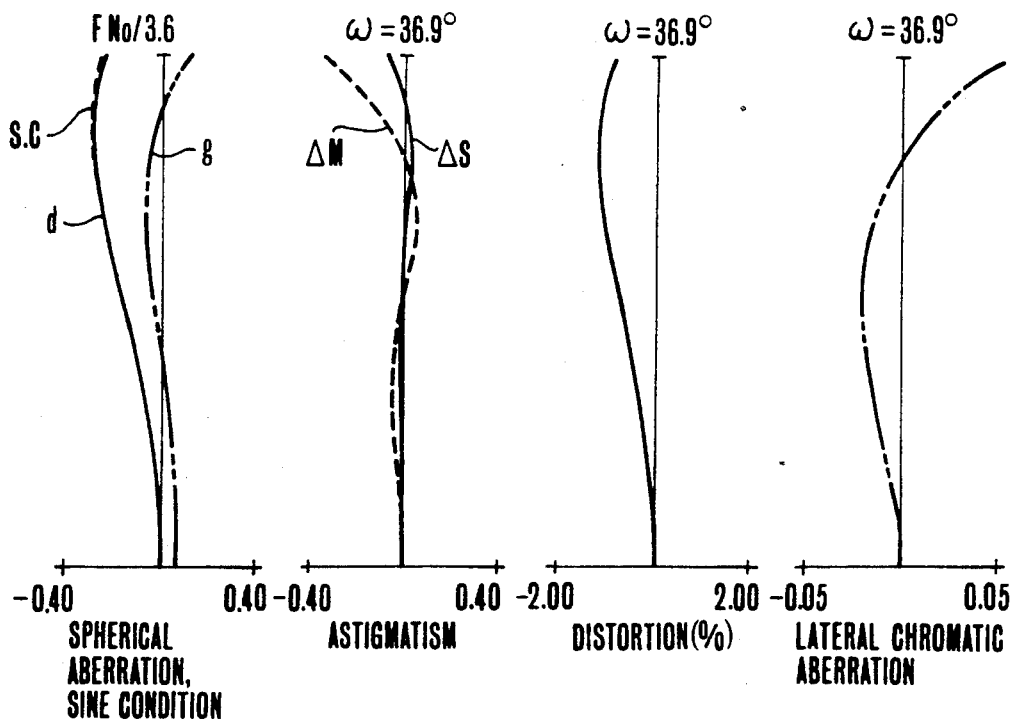
Figure 44B:
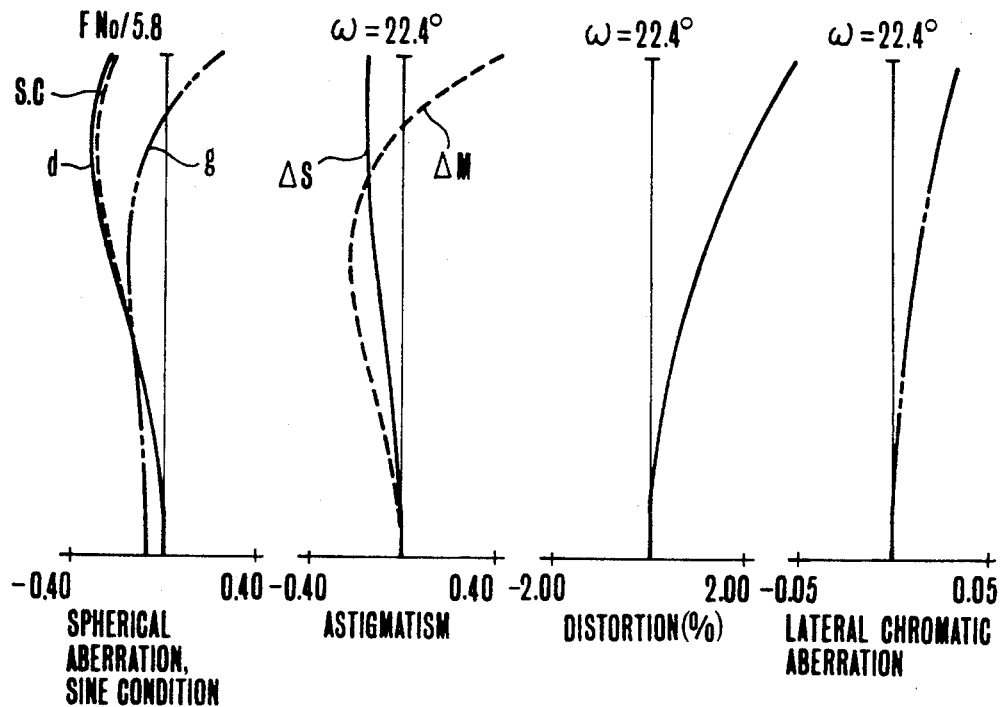
Figure 44C:
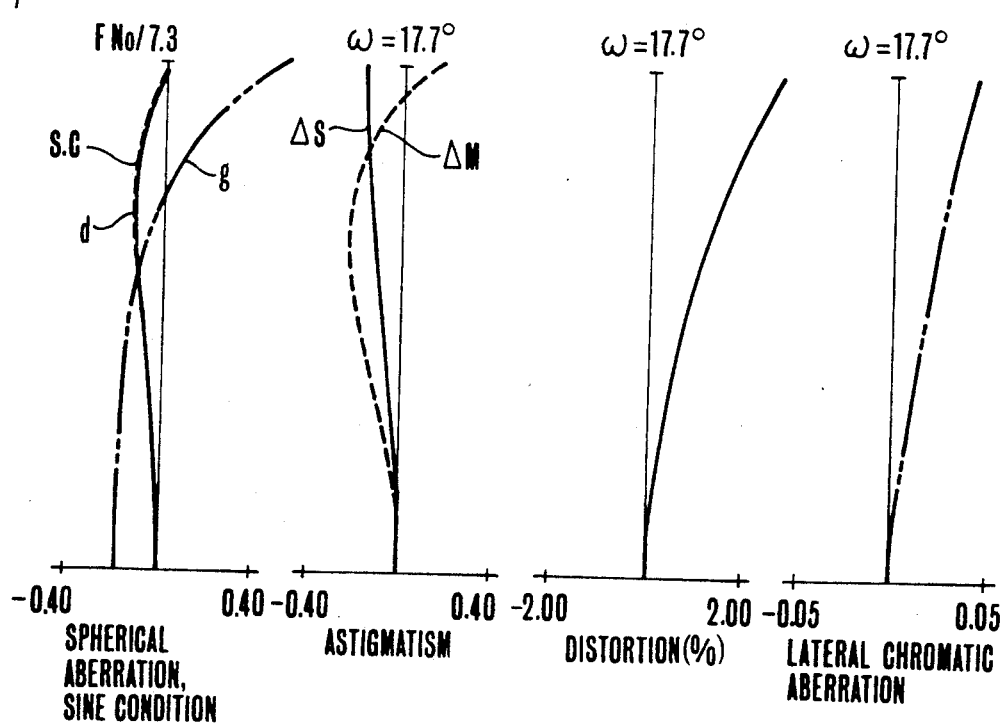

Numerical Example 21: (FIGS. 39, 44 (A), 44 (B) and 44(C))
$F = 28.8-68$  $FNo = 1:3.6-7.3$  $2\omega = 73.8°-35.3°$

| | | | |
|---|---|---|---|
| R1 = −31.09 | D1 = 1.30 | N1 = 1.77250 | $\nu 1$ = 49.6 |
| R2 = 18.55 | D2 = 1.08 | | |
| R3 = 20.14 | D3 = 4.37 | N2 = 1.68893 | $\nu 2$ = 31.1 |
| R4 = −1228.32 | D4 = Variable | | |
| R5 = 27.39 | D5 = 3.83 | N3 = 1.51633 | $\nu 3$ = 64.1 |
| R6 = −36.30 | D6 = 0.15 | | |
| R7 = 13.62 | D7 = 3.16 | N4 = 1.53996 | $\nu 4$ = 59.4 |
| R8 = 224.04 | D8 = 0.55 | | |
| R9 = −48.09 | D9 = 3.25 | N5 = 1.84666 | $\nu 5$ = 23.9 |
| R10 = 14.75 | D10 = 0.42 | | |
| R11 = 22.94 | D11 = 2.55 | N6 = 1.66693 | $\nu 6$ = 31.1 |
| R12 = −33.04 | D12 = 1.00 | | |
| R13 = Stop | D13 = Variable | N7 = 1.58500 | $\nu 7$ = 29.3 |
| R14 = 99.10 | D14 = 4.16 | | |
| R15 = −21.16 | D15 = 2.92 | N8 = 1.77250 | $\nu 8$ = 49.6 |
| R16 = −12.25 | D16 = 1.30 | | |
| R17 = 109.04 | | | |

| Variable separation | Focal Length | | |
|---|---|---|---|
| | 28.8 | 52.6 | 68.0 |
| D4 | 9.20 | 3.04 | 1.00 |
| D13 | 8.74 | 3.78 | 2.50 |

R15: Aspheric
$a_1 = 0$
$a_2 = -1.57 \times 10^{-5}$
$a_3 = -9.48 \times 10^{-8}$
$a_4 = 4.49 \times 10^{-11}$
$a_5 = -1.76 \times 10^{-11}$

Figure 45A:
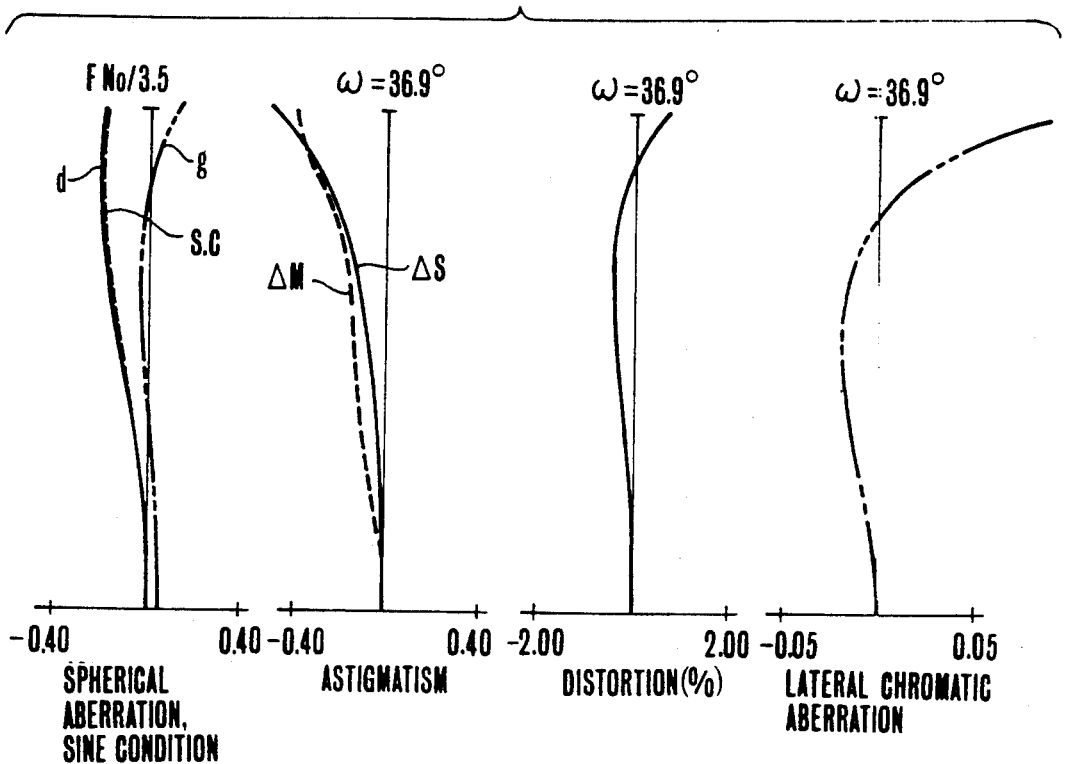
Figure 45B:
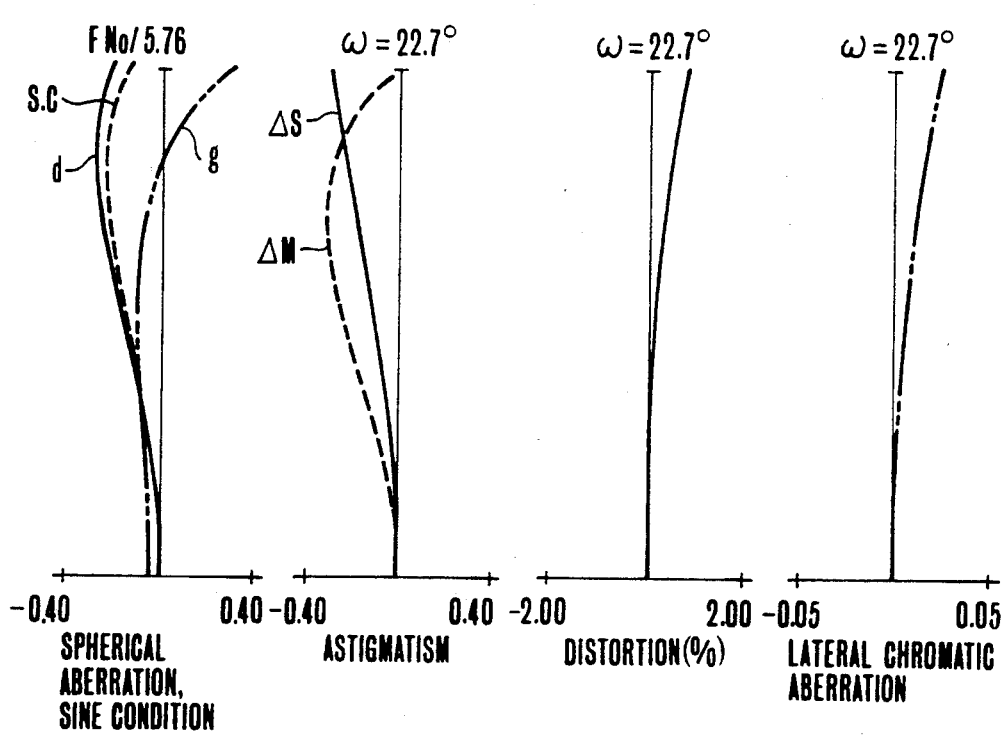
Figure 45C:
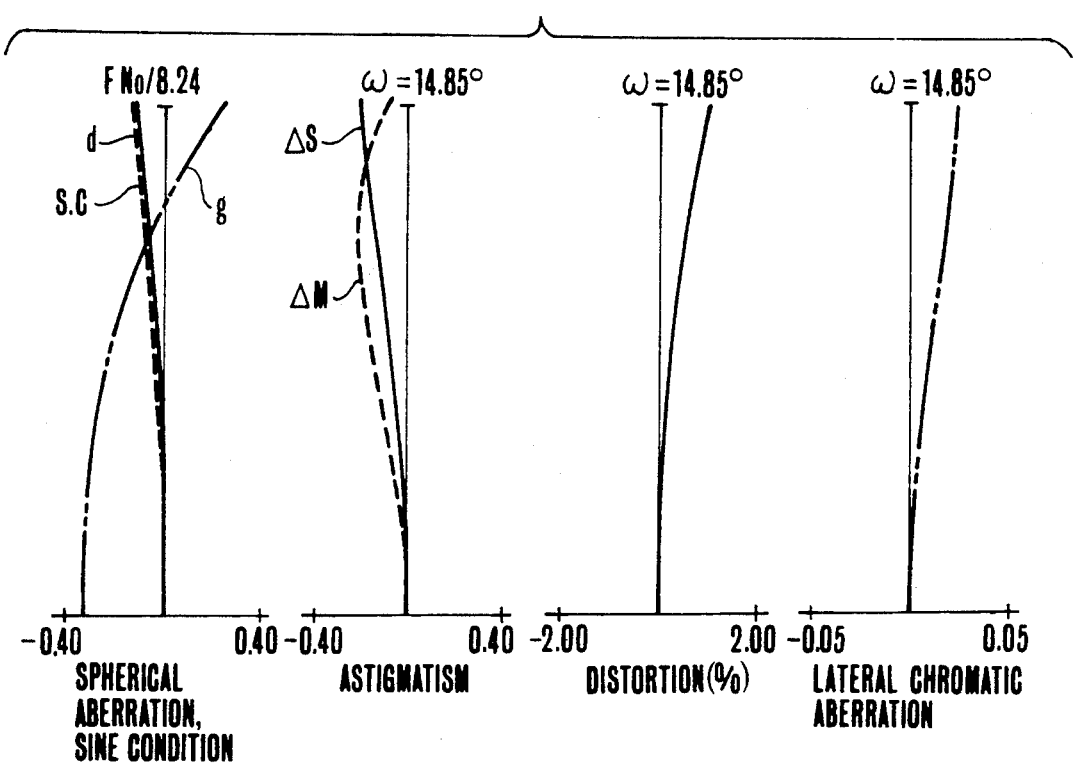

Numerical Example 22: (FIGS. 40, 45(A), 45 (B) and 45(C))
$F = 28.8-81.6$  $FNo = 1:3.5-8.24$  $2\omega = 73.8°-29.7°$

| | | | |
|---|---|---|---|
| R1 = −90.43 | D1 = 1.50 | N1 = 1.77250 | $\nu 1$ = 49.6 |
| R2 = 1.05 | D2 = 1.93 | | |
| R3 = 20.71 | D3 = 5.55 | N2 = 1.68893 | $\nu 2$ = 31.1 |
| R4 = 182.502 | D4 = Variable | | |
| R5 = 26.29 | D5 = 3.33 | N3 = 1.51633 | $\nu 3$ = 64.1 |
| R6 = −92.39 | D6 = 0.15 | | |
| R7 = 18.73 | D7 = 2.97 | N4 = 1.62299 | $\nu 4$ = 58.1 |

-continued

| | | | |
|---|---|---|---|
| R8 = −371.80 | D8 = 0.59 | | |
| R9 = −40.09 | D9 = 5.00 | N5 = 1.84666 | ν5 = 23.9 |
| R10 = 18.27 | D10 = 0.50 | | |
| R11 = 39.90 | D11 = 2.98 | N6 = 1.69895 | ν6 = 30.1 |
| R12 = −22.96 | D12 = 1.00 | | |
| R13 = Stop | D13 = Variable | | |
| R14 = −130.84 | D14 = 4.90 | N7 = 1.64769 | ν7 = 33.8 |
| R15 = −17.58 | D15 = 1.56 | | |
| R16 = −15.45 | D16 = 1.20 | N8 = 1.71299 | ν8 = 53.8 |
| R17 = −33.88 | D17 = 1.49 | | |
| R18 = −21.19 | D18 = 1.40 | N9 = 1.77250 | ν9 = 49.6 |
| R19 = 203.49 | | | |

| Variable separation | Focal Length | | |
|---|---|---|---|
| | 28.8 | 51.8 | 81.6 |
| D4 | 15.45 | 8.95 | 1.00 |
| D13 | 12.40 | 3.90 | 2.40 |

Figure 46:
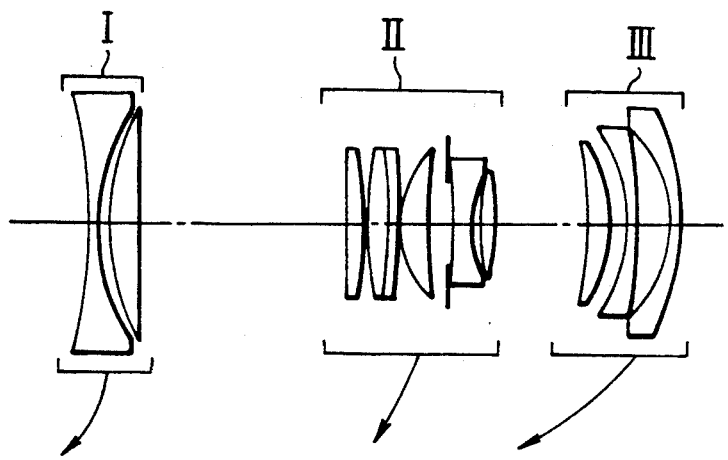
FIG. 46 to FIG. 48 are longitudinal section views of numerical examples 23 to 25 of zoom lenses respectively.
Figure 47:
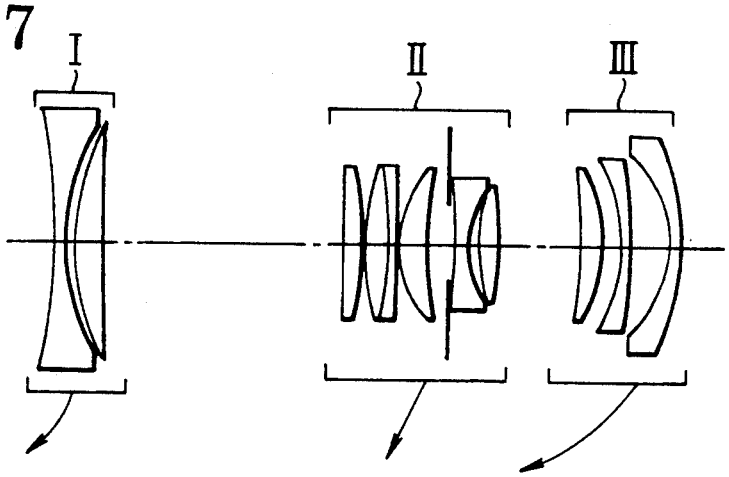
Figure 48:
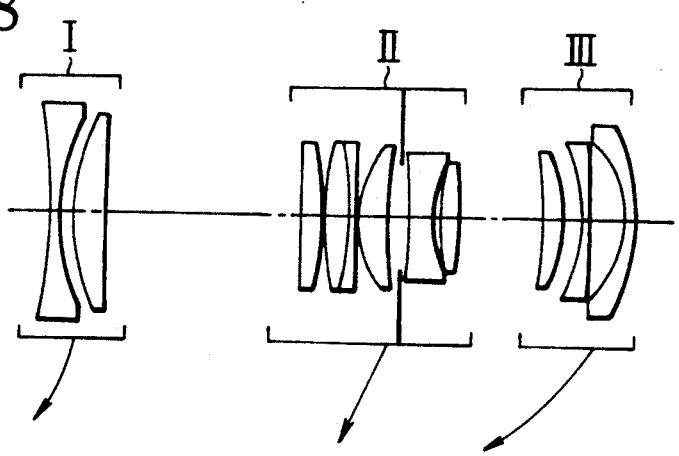
Figure 49A:
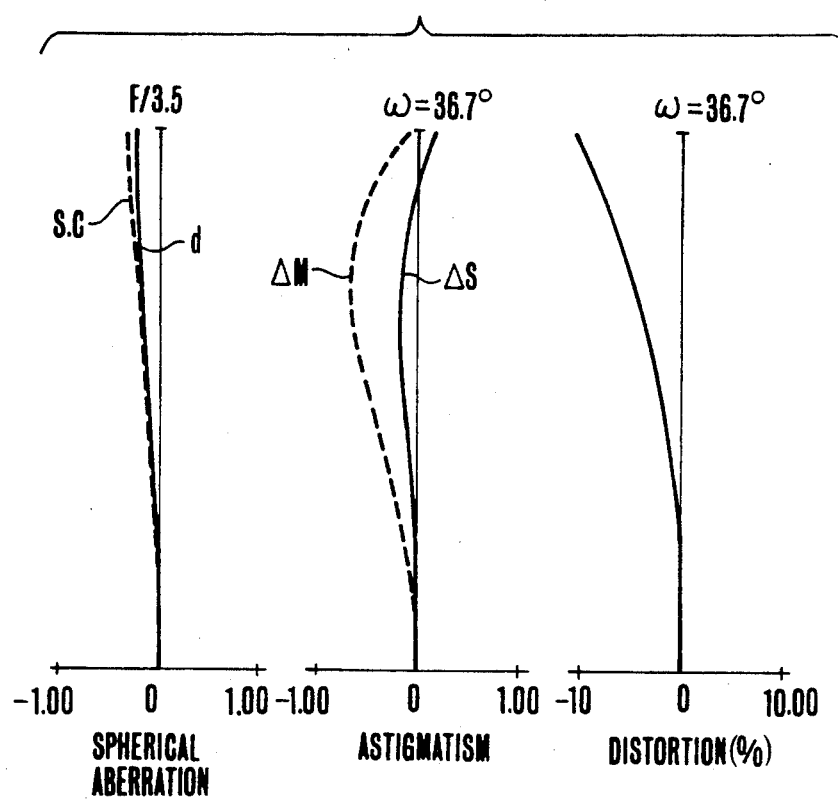
Figure 49B:
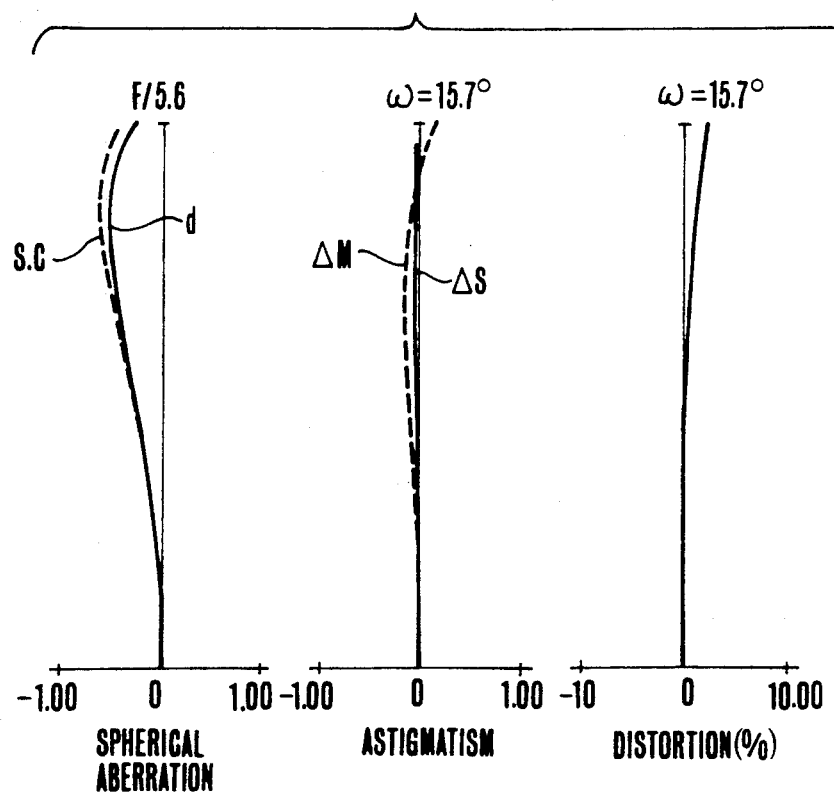
Figure 49C:
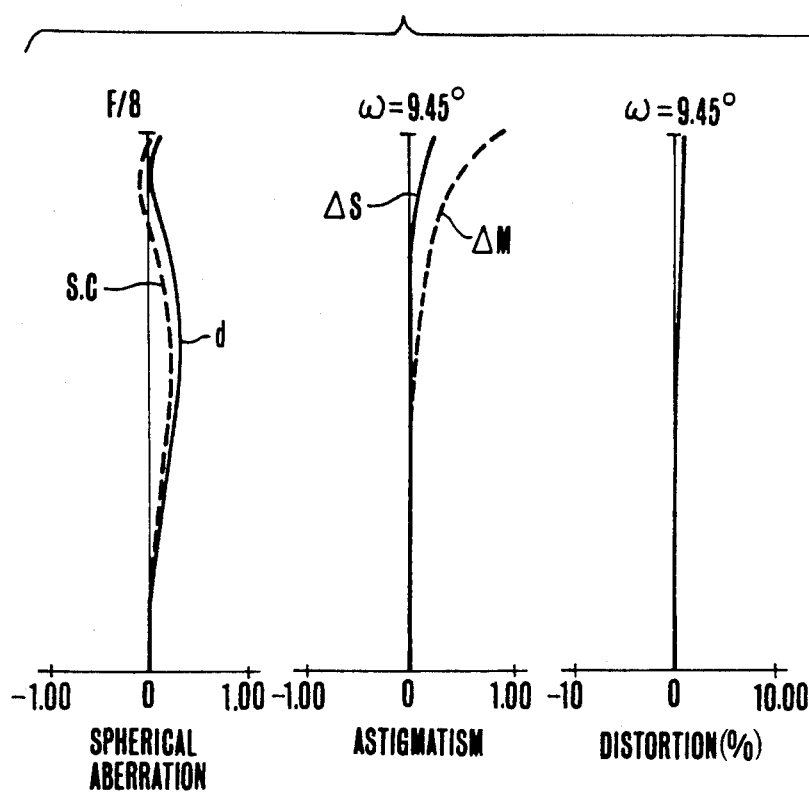

FIGS. 46 to 48 in block diagrams show numerical examples 23 to 25 of zoom lenses of the invention. The zoom lens comprises, from front to rear, a first lens group I of negative power, a second lens group II of positive power and a third lens group III of negative power arranged to move in respective directions indicated by arrows as zooming from the wide-angle end to the telephoto end, and satisfying the following conditions:

$$0.14 < f2/FT < 0.28 \ldots \quad (17)$$

$$1.5 < S1w/S2w < 4 \ldots \quad (18)$$

$$0.2 < |f3|/FT < 0.6 \ldots \quad (19)$$

$$3 < FT/FW < 7 \ldots \quad (20)$$

where S1w and S2w are the air separations between the first and second lens groups and between the second and third lens groups in the wide-angle end respectively, f2 and f3 are the focal lengths of the second and third lens groups respectively, and FW and FT are the shortest and longest focal lengths of the entire lens system respectively.

When the refractive power of the second lens group is too weak as exceeding the upper limit of the inequalities of condition (17), the total movement of the second lens group must be increased. This causes the entirety of the lens system to increase objectionably.

Further, when the refractive power of the second lens group is too strong as exceeding the lower limit, the total zooming movement shortens. Though this is advantageous at reducing the size of the entire lens system, the variation with zooming of aberrations increases to increase the difficulty of maintaining high grade optical performance over the entire zooming range.

In this connection it should be pointed out that, in a particularly preferred embodiment of the invention, the upper and lower limits of the inequalities of condition (17) are otherwise set to:

$$0.17 < f2/FT < 0.24$$

when it is desired to attain an even higher grade optical performance by lessening the range of variation of the aberrations.

And, in the present embodiment, for the wide-angle end, the axial air separation S1w between the first and second lens groups and the axial air separation S2w between the second and third lens groups are so determined that their ratio satisfies the inequalities of condition (18).

By this, the back focal distance for the wide-angle end is shortened and a great shortening of the total length of the zoom lens for the wide-angle end is achieved.

When the upper limit of the inequalities of condition (18) is exceeded, the back focal distance increases more than necessary. When the lower limit is exceeded, the back focal distance conversely becomes too short. As the third lens group approaches too close to the image plane, the shadow of the dust grains on the lens surfaces, for example, appears on the surface of the photographic material, ghost owing to the reflection from each lens surface is liable to arise, and other drawbacks are produced. In the present embodiment it is more preferable that the range for the ratio is given as $1.5 < S1w/S2w < 3$, when improved results will be attained.

Also, the range for the ratio of the focal length f3 of the third lens group to the focal length FT of the entire lens system in the telephoto end is set as the inequalities of condition (19) with an advantage that while good optical performance is maintained over the entire zooming range, a reduction of the size of the entire lens system is achieved.

In other words, the refractive power of the third lens group is made to be strengthened to some extent so that the whole lens system slightly takes the telephoto form on the telephoto side. With this, an increase of the maximum focal length is achieved, while still permitting the reduction of the size of the entire lens system to be achieved.

When the upper limit is exceeded, the tendency to the telephoto form weakens, causing the size of the entire lens system to increase largely. When the lower limit is exceeded, the tendency to the telephoto form conversely strengthens too much. Although this makes it easier to reduce the size of the entire lens system, the curvature of field tends to over-correct, and the difficulty of obtaining the good optical performance increases. It is to be noted in the present embodiment that it is more preferable that the inequalities of condition (19) is otherwise set as $0.25 < |f3|/FT < 0.45$, when improved results will be attained.

The inequalities of condition (20) give a proper range for the zoom ratio and have an aim that good optical performance is maintained over the entire zooming range.

In other words, within the above-described lens configuration, each lens element is formed so that the zoom ratio falls within this range. This enables high grade optical performance to be obtained over the entire zooming range with the attainment of the reduction of the size of the entire lens system.

The above-described various conditions suffice for realizing the zoom lens the present invention aims at. Yet, to achieve a further reduction of the size of the entire lens system, while still permitting good optical performance to be obtained, the following additional conditions may be set forth.

Letting the focal length of the first lens group be denoted by f1 and the distance from the front vertex of the first lens group to the image surface by Lw, $$0.35 < Lw/FT < 0.9 \ldots \quad (21)$$

$$0.2 < |f1|/FT < 0.7 \ldots \quad (22)$$

are satisfied.

When the upper limit of the inequalities of condition (21) is exceeded, an increase of the size of the entire lens system results. When the lower limit is exceeded, the predetermined zoom ratio becomes difficult to obtain.

The inequalities of condition (22) make proper the total focusing movement of the first lens group and have an aim that the variation with focusing of aberrations is lessened. When the negative refractive power of the first lens group is too much weak as exceeding the upper limit of the inequalities of condition (22), the total focusing movement increases to increase the diameter of the front lens members objectionably. When the refractive power of the first lens group is too much strong as exceeding the lower limit, the diameter of the front lens members becomes smaller, but the variation with focusing of aberrations is increased objectionably.

It is to be noted that in a more preferred embodiment of the invention, the inequalities of condition (21) may otherwise be set to $0.55 < Lw/FT < 0.85$ and the inequalities of condition (22) to $0.25 < |f1|/FT < 0.65$, when improved results will be attained.

In the present embodiment, the first lens group is made to move along with the second and third lens groups with the advantage that while the predetermined zoom ratio is secured, a reduction of the size of the entire lens system is achieved.

For this case, despite the dependent movement of the first lens group, it has to be done with ease to secure the predetermined zoom ratio. To this purpose, it is good to satisfy the following condition:

$$0.6 < s/t < 0.95 \ldots \quad (23)$$

where s and t are the total zooming movements of the second and third lens groups respectively. By making faster the speed of movement of the third lens group than that of movement of the second lens group, the requirement of reducing the size of the entire lens system while simultaneously securing the predetermined zoom ratio is easily fulfilled.

When the lower limit of the inequalities of condition (23) is exceeded, the total movement of the third lens group is too much long compared with the total length of the second lens group. This results in that the second and third lens groups come to mechanically interfere with each other on the telephoto end. When the upper limit is exceeded, the total movement of the third lens group is too much short compared with the total movement of the second lens group. So, the impartment of the movement into the first lens group is hardly reflected to effectively achieve the reduction of the size of the entire lens system.

In the present embodiment, to assist in stabilizing good correction of aberrations against zooming with the reduction of he size of the entire lens system, the second lens group may be constructed from three or more positive lenses, a negative lens and a positive lens in this order from front. This is recommended particularly because the amount of aberrations produced from the second lens group is lessened.

Also, the third lens group is preferably constructed with inclusion of a positive lens and at least two negative lenses, particularly when distortion and lateral chromatic aberration are corrected well.

Further, the first lens group may be constructed with inclusion of at least negative lens of bi-concave form and a positive lens when the barrel type distortion produced from the second lens group is corrected.

In the present embodiment, the preferable form and construction and arrangement of the lens elements of each group is such that, from front to rear, the first lens group comprises a negative lens whose front surface is concave toward the front and a positive lens, totaling two lenses, the second lens group comprises a positive lens, a doublet formed so that the cemented surface becomes a negative refracting surface, a positive lens, an aperture stop, a negative lens and a positive lens, or is constructed in the form of five members with six elements, and the third lens group comprises a positive lens whose rear surface is convex toward the rear, and two meniscus-shaped negative lenses concave toward the front, totaling three lenses.

It is to be noted that the cemented surface in the second lens group may be put one lens ahead of or behind its lens.

It is also to be noted that though, in the embodiment shown in FIG. 46 to FIG. 48, the entirety of the zoom lens has been illustrated as comprising three lens groups movable for zooming, the third lens group may otherwise be followed rearwardly by a lens group of little contribution to the variation of the image magnification, for example, a mere fixed lens group of positive or negative power, which remains utterly stationary or slightly moves during zooming, or a focusing lens group. Even in this case, a zoom lens the present invention aims at can be achieved.

Next, numerical examples 23 to 25 of zoom lenses of the invention are shown. In these numerical examples 23 to 25, Ri denotes the radius of curvature of the i-th lens surface counting from front, Di the i-th lens thickness or air separation counting from front, and Ni and $\nu i$ the refractive index and Abbe number of the glass of the i-th lens element counting from front respectively. "bf" stands for the back focal distance.

The numerical values of the factors in the above-described conditions (17) to (23) for these numerical examples 23 to 25 are listed in Table-3.

| Example 23: (FIGS. 46, 49(A), 49(B) and 49(C)) $F = 29-130$ $FNo = 1:3.5-8$ $2\omega = 73.4°-18.9°$ | | | |
|---|---|---|---|
| R1 = −77.07 | D1 = 1.50 | N1 = 1.88300 | $\nu$1 = 40.8 |
| R2 = 29.44 | D2 = 1.00 | | |
| R3 = 31.42 | D3 = 4.00 | N2 = 1.75604 | $\nu$2 = 25.0 |
| R4 = 357.03 | D4 = Variable | | |
| R5 = 39672.43 | D5 = 2.60 | N3 = 1.49700 | $\nu$3 = 81.6 |
| R6 = −47.44 | D6 = 0.16 | | |
| R7 = 36.47 | D7 = 3.06 | N4 = 1.51742 | $\nu$4 = 52.4 |
| R8 = −44.83 | D8 = 1.02 | N5 = 1.84666 | $\nu$5 = 23.9 |
| R9 = −296.19 | D9 = 0.15 | | |
| R10 = 14.08 | D10 = 3.60 | N6 = 1.61700 | $\nu$6 = 62.8 |
| R11 = 59.97 | D11 = 2.50 | | |
| R12 = Stop | D12 = 0.70 | | |
| R13 = −162.46 | D13 = 2.04 | N7 = 1.83400 | $\nu$7 = 37.2 |
| R14 = 13.69 | D14 = 1.22 | | |
| R15 = 27.89 | D15 = 2.60 | N8 = 1.62045 | $\nu$8 = 38.1 |
| R16 = −33.64 | D16 = Variable | | |
| R17 = −47.63 | D17 = 3.00 | N9 = 1.59270 | $\nu$9 = 35.3 |
| R18 = −18.09 | D18 = 2.44 | | |
| R19 = −17.40 | D19 = 1.20 | N10 = 1.72916 | $\nu$10 = 54.7 |
| R20 = −62.93 | D20 = 4.33 | | |
| R21 = −16.74 | D21 = 1.20 | N11 = 1.48749 | $\nu$11 = 70.2 |
| R22 = −36.60 | | | |

| Variable | Focal length | | |
|---|---|---|---|
| separation | 29 | 65 | 130 |
| D4 | 27.49 | 7.52 | 0.96 |
| D16 | 11.81 | 6.86 | 1.16 |
| bf | 5.7 | 29.35 | 78.05 |

-continued

Figure 50A:
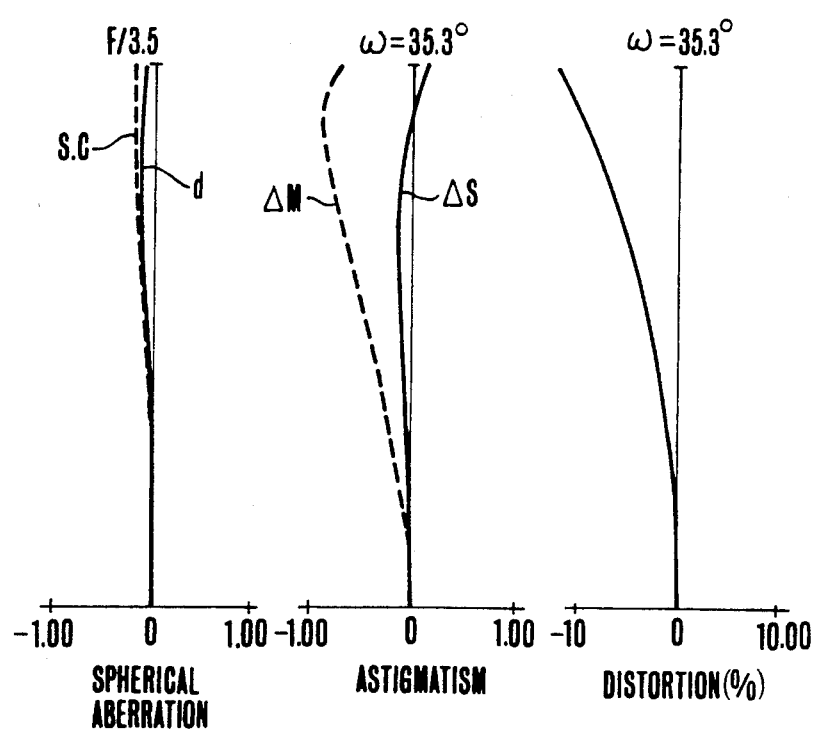
Figure 50B:
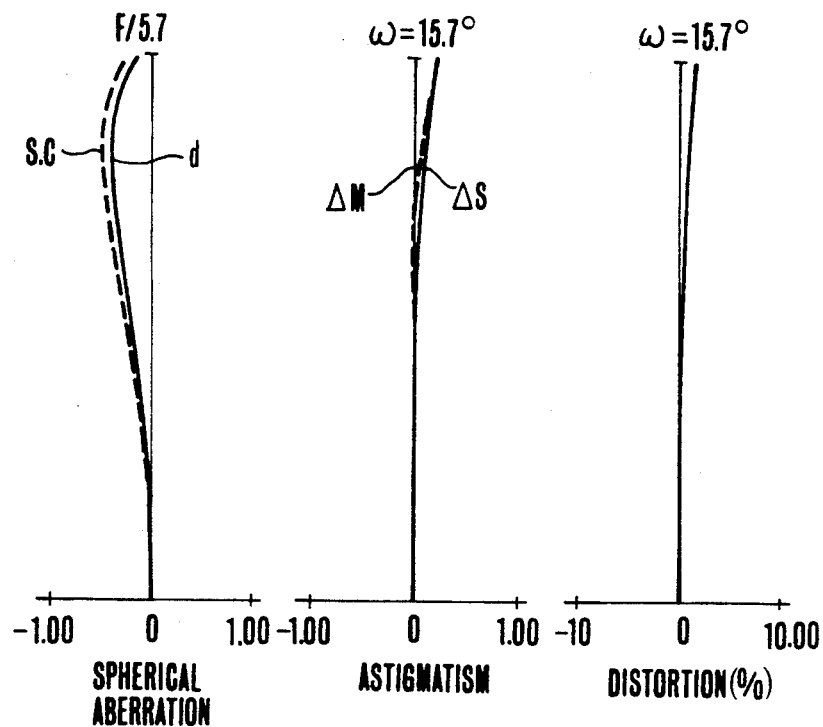
Figure 50C:
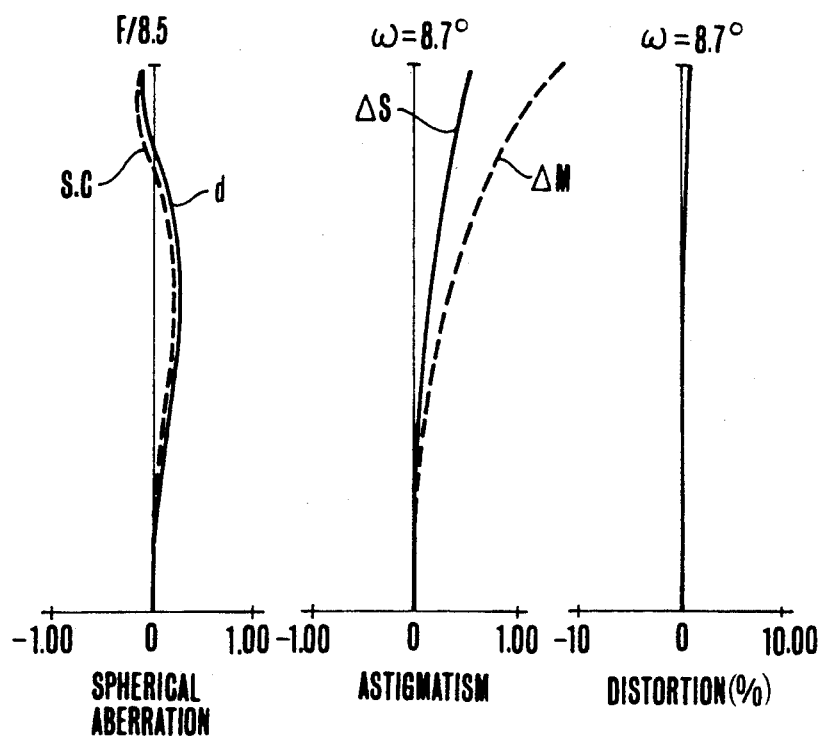
Figure 51A:
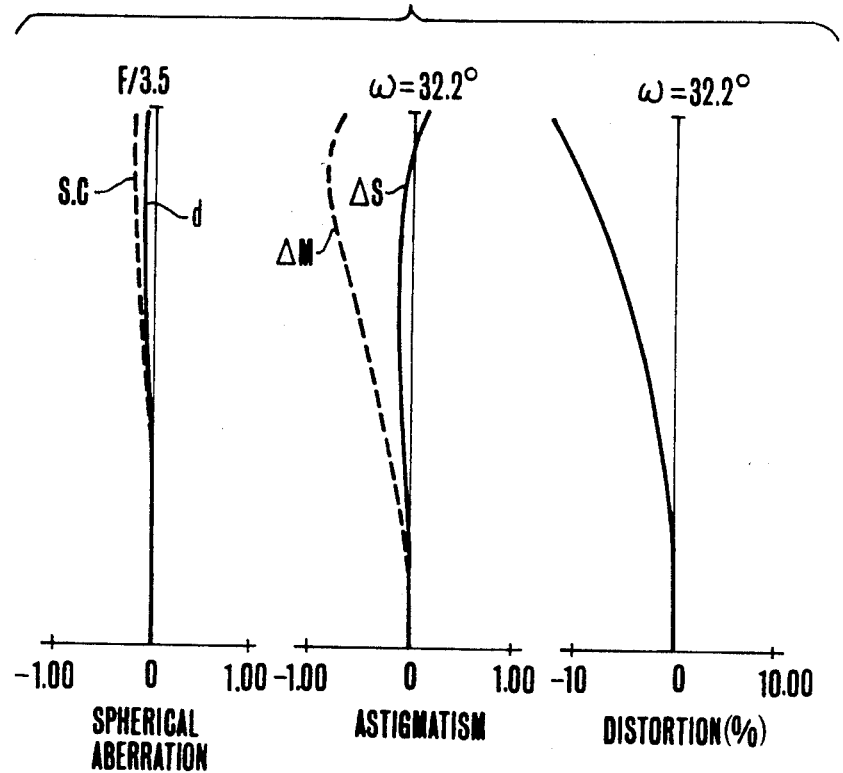
Figure 51B:
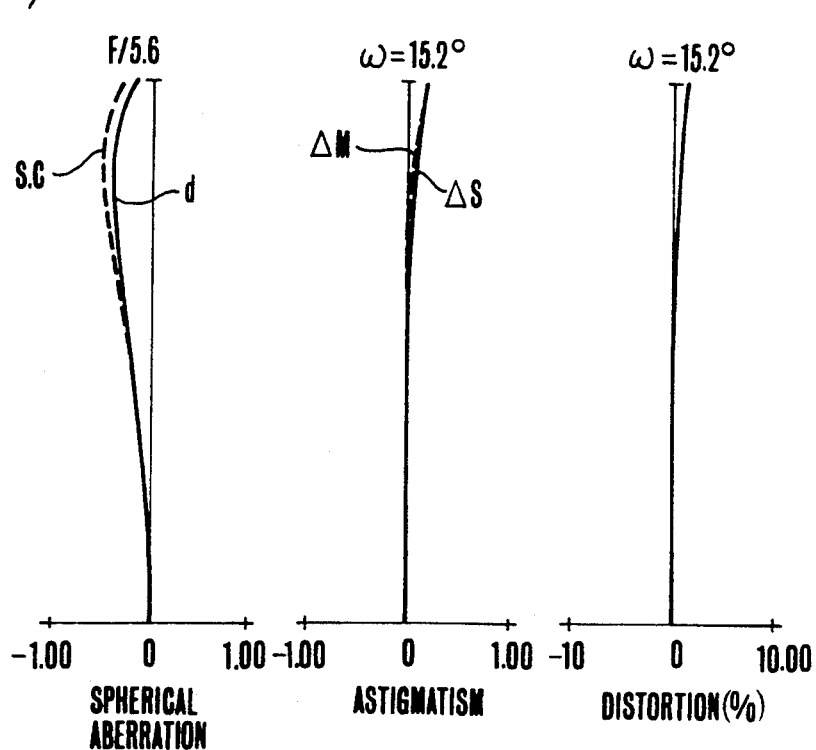

Numerical Example 24: (FIGS. 47, 50 (A), 50(B) and 50(C))
F = 30.5 −141.2   FNo = 1:3.5-8.5   2ω = 70.7°-17.4°

| | | | |
|---|---|---|---|
| R1 = −80.11 | D1 = 1.50 | N1 = 1.88300 | ν1 = 40.8 |
| R2 = 29.54 | D2 = 1.00 | | |
| R3 = 30.97 | D3 = 4.00 | N2 = 1.75604 | ν2 = 25.0 |
| R4 = 257.00 | D4 = Variable | | |
| R5 = 3938.61 | D5 = 2.73 | N3 = 1.49700 | ν3 = 81.6 |
| R6 = −48.78 | D6 = 0.16 | | |
| R7 = 37.29 | D7 = 3.21 | N4 = 1.51742 | ν4 = 52.4 |
| R8 = −43.14 | D8 = 1.07 | N5 = 1.84666 | ν5 = 23.9 |
| R9 = −319.08 | D9 = 0.16 | | |
| R10 = 14.79 | D10 = 3.78 | N6 = 1.61700 | ν6 = 62.8 |
| R11 = 58.58 | D11 = 2.63 | | |
| R12 = Stop | D12 = 0.72 | | |
| R13 = −166.77 | D13 = 1.98 | N7 = 1.83400 | ν7 = 37.2 |
| R14 = 14.41 | D14 = 1.25 | | |
| R15 = 26.49 | D15 = 2.73 | N8 = 1.62045 | ν8 = 38.1 |
| R16 = −37.73 | D16 = Variable | | |
| R17 = −52.47 | D17 = 3.00 | N9 = 1.59270 | ν9 = 35.3 |
| R18 = −18.10 | D18 = 2.44 | | |
| R19 = −17.55 | D19 = 1.20 | N10 = 1.72916 | ν10 = 54.7 |
| R20 = −61.72 | D20 = 5.26 | | |
| R21 = −15.45 | D21 = 1.20 | N11 = 1.48749 | ν11 = 70.2 |
| R22 = −35.11 | | | |

| Variable separation | Focal length | | |
|---|---|---|---|
| | 30.53 | 76.89 | 141.21 |
| D4 | 31.64 | 9.25 | 2.02 |
| D16 | 10.59 | 5.34 | 2.98 |
| bf | 8.14 | 39.57 | 81.2 |

Numerical Example 25: (FIGS. 48, 51(A), 51(B) and 51(C))
F = 34.3-139.3   FNo = 1:3.5-9   2ω = 64.4°-17.6°

| | | | |
|---|---|---|---|
| R1 = −95.76 | D1 = 1.50 | N1 = 1.88300 | ν1 = 40.8 |
| R2 = 28.21 | D2 = 2.00 | | |
| R3 = 30.66 | D3 = 4.00 | N2 = 1.75604 | ν2 = 25.0 |
| R4 = 174.67 | D4 = Variable | | |
| R5 = 2510.44 | D5 = 2.73 | N3 = 1.49700 | ν3 = 81.6 |
| R6 = −43.69 | D6 = 0.16 | | |
| R7 = 34.42 | D7 = 3.21 | N4 = 1.51742 | ν4 = 52.4 |
| R8 = −46.88 | D8 = 1.07 | N5 = 1.84666 | ν5 = 23.9 |
| R9 = 1364.49 | D9 = 0.16 | | |
| R10 = 14.79 | D10 = 3.78 | N6 = 1.61700 | ν6 = 62.8 |
| R11 = 53.52 | D11 = 1.62 | | |
| R12 = Stop | D12 = 0.72 | | |
| R13 = −169.23 | D13 = 3.11 | N7 = 1.83400 | ν7 = 37.2 |
| R14 = 14.37 | D14 = 0.92 | | |
| R15 = 24.83 | D15 = 2.73 | N8 = 1.62045 | ν8 = 38.1 |
| R16 = −37.00 | D16 = Variable | | |
| R17 = −62.25 | D17 = 3.00 | N9 = 1.59270 | ν9 = 35.3 |
| R18 = −18.34 | D18 = 2.45 | | |
| R19 = −17.86 | D19 = 1.20 | N10 = 1.72916 | ν10 = 54.7 |
| R20 = −75.25 | D20 = 4.45 | | |
| R21 = −14.46 | D21 = 1.20 | N11 = 1.48749 | ν11 = 70.2 |
| R22 = −31.06 | | | |

| Variable separation | Focal length | | |
|---|---|---|---|
| | 34.30 | 79.45 | 139.26 |
| D4 | 25.75 | 7.47 | 1.03 |
| D16 | 10.57 | 5.32 | 2.92 |
| bf | 10.98 | 42.41 | 82.21 |

TABLE 3

| Conditions | Numerical examples | | |
|---|---|---|---|
| | 23 | 24 | 25 |
| (17) f2/FT | 0.209 | 0.202 | 0.205 |
| (18) S1w/S2w | 2.328 | 2.982 | 2.435 |
| (19) \|f3\|/FT | 0.32 | 0.296 | 0.3 |
| (20) FT/FW | 4.46 | 4.625 | 4.06 |
| (21) Lw/FT | 0.673 | 0.671 | 0.658 |
| (22) \|f1\|/FT | 0.41 | 0.378 | 0.383 |
| (23) s/t | 0.853 | 0.896 | 0.893 |

Another zoom lens according to the invention comprises, from front to rear, a first lens group of negative power, a second lens group of positive power, and a third lens group of negative power, totaling three lens groups, zooming from the wide-angle end to the telephoto end being performed by moving these first, second and third lens groups each forward in such relation as to satisfy the following conditions:

$$0.45 < M1/M2 < 0.7 \ldots \quad (24)$$

$$0.77 < M2/M3 < 0.95 \ldots \quad (25)$$

where M1, M2 and M3 are the total zooming movements of the first, second and third lens groups respectively. When these conditions are satisfied, it becomes possible to provide a zoom lens of more compact form and a higher zoom ratio.

The inequalities of condition (24) concern the ratio of the distances the first and second lens groups move axially as zooming from the wide-angle end to the telephoto end. When the movement of the first lens group is too long in comparison with the movement of the second lens group as exceeding the upper limit of the condition (24), the much desired reduction of the bulk and size of the entire lens system is not attained. In turn, too short a movement of the second lens group compared with the first lens group makes it very difficult to obtain the predetermined zoom ratio. When the movement of the second lens group is too large in comparison with the first lens group as exceeding the lower limit of the inequalities of condition (24), the size of the entire lens system gets larger. Further, too small a movement of the first lens group compared with the second lens group results in a prerequisite that the spacing between the first and second lens groups be taken longer. As this implies that the wasteful space increases, the size of the entire lens system is increased objectionably.

The inequalities of condition (25) concern the ratio of the total movements of the second and third lens groups which contribute to the variation of the image magnification. When this condition is satisfied, the magnification varying effects of both lens groups are obtained in good balance.

When the movement of the second lens group is too large in comparison with the third lens group as exceeding the upper limit of the inequalities of condition (25), the size of the entire lens system gets larger. Further, too small a movement of the third lens group compared with the second lens group causes the second lens group to bear most of the duty of varying the magnification by its movement. Therefore, the increase of the zoom ratio becomes difficult to achieve. When the movement of the third lens group is too large in comparison with the second lens group as exceeding the lower limit, the size of the entire lens system gets larger. In other words, the movement of the second lens becomes too small compared with the third lens group. Therefore, most of the duly of varying the magnification has to be put on the movement of the third lens group. Hence, the difficulty of increasing the zoom ratio increases.

In the present embodiment, on consideration of the changed amount of the focal length of the entire lens system, to achieve a further reduction of the size of the entire lens system in such a manner as to maintain good stability of aberration correction over the entire zooming range, it is preferred to set forth additional conditions for the movements of all the lens groups as follows:

$$0.25 < |M1/\Delta f| < 0.45 \ldots \quad (26)$$

$$0.5 < |M2/\Delta f| < 0.63 \ldots \quad (27)$$

$$0.6 < |M3/\Delta f| < 0.8 \ldots \quad (28)$$

where $\Delta f$ is the changed amount of the focal length of the entire lens system with zooming.

The inequalities of conditions (26), (27) and (28), when violated by increasing the movements of the lens groups to exceed the respective upper limits, each result in an increase of inefficiency in the zooming movement. Therefore, the size of the entire lens system is increased objectionably. When the movements of the lens groups are made too small as exceeding the lower limits, the difficulty of obtaining the predetermined zoom ratio is increased objectionably.

It will be appreciated from the foregoing that the above-described conditions (24), (25), (26), (27) and (28) are essential requisites for a great increase of the zoom ratio and a minimization of the bulk and size, as far as the type of zoom lens in which as zooming from the wide-angle end to the telephoto end, the first, second and third lens groups move forward and, in particular, at the telephoto end, all the axial air separations between the successive two of the lens groups are narrowest, is concerned.

What is claimed is:

1. A zoom lens comprising, from front to rear, a first lens group of negative refractive power, a second lens group of positive refractive power that comprises a front lens sub-group and a rear lens sub-group on either side of a stop, and a third lens group of negative refractive power, wherein as zooming from the wide-angle end to the telephoto end is performed by moving said first, second and third lens groups, said second and third lens groups both are directed forward and a movement of said third lens group is made greater than a movement of said second lens group and the following conditions are satisfied:

$$1 < S1w/S2w < 3.2$$

$$0.15 < |f3|/FT < 0.43$$

$$2 < FT/FW < 5$$

where S1w and S2w are air separations between said first and second lens groups and between said second and third lens groups in the wide-angle end respectively, f3 is a focal length of said third lens group, and FW and FT are shortest and longest focal lengths of the entire lens system respectively.

2. A zoom lens according to claim 1, satisfying the following conditions:

$$0.4 < Lw/FT < 0.9$$

$$0.25 < |f1|/FT < 0.82$$

where f1 is a focal length of said first lens group and Lw is a distance from a frontmost lens surface to an image surface in the wide-angle end.

3. A zoom lens according to claim 2, wherein said second lens group includes at least two positive lenses, a negative lens and a positive lens in this order from the front.

4. A zoom lens according to claim 2, wherein said third lens group includes a positive lens and at least one negative lens in this order from the front, and wherein at least one lens surface in said third lens group is made aspheric.

5. A zoom lens according to claim 2, wherein said first lens group includes at least one negative lens and a positive lens in this order from the front, and wherein at least one lens surface in said first lens group is made aspheric.

6. A zoom lens comprising, from front to rear, a first lens group of negative refractive power, a second lens group of positive refractive power and third lens group including a positive lens and a negative lens in this order from the front and whose overall refractive power is negative, and zooming from the wide-angle end to the telephoto end is performed by moving each of said first, second and third lens groups forward, wherein said third lens group moves at a higher speed than said second lens group, and focusing is performed by moving said third lens group, wherein the zoom lens satisfies the following conditions:

$$1 < f31/|f3| < 2$$

$$N31 < N32$$

$$1 < RIII2/RIII3 < 2$$

$$(RIII2 < 0, RIII3 < 0)$$

where f3 and f31 are focal lengths of said third lens group and said positive lens respectively; N31 and N32 are refractive indices of materials and of said positive lens and said negative lens respectively, and RIIIi is a radius of curvature of the i-th lens surface counting from front in said third lens group.

7. A zoom lens according to claim 6, wherein said third lens group is moved in the telephoto end so that ultra close-up photography can be made.

8. A zoom lens comprising, from front to rear, a first lens group of negative refractive power, a second lens group of positive refractive power and a third lens group of negative refractive power, zooming from the wide-angle end to the telephoto end being performed by moving said first, second and third lens groups each forward, and said zoom lens satisfying the following conditions:

$$1.0 < |f3/f2| < 1.4$$

$$0.7 < E1W/fW < 1.5$$

$$0.83 < E2W/fW < 1.50$$

where f2 and f3 are focal lengths of said second and third lens groups respectively, fW is a shortest focal length of the entire lens system, and E1W and E2W are intervals between principal points of said first and second lens groups and between principal points of said second and third lens groups in the wide-angle end respectively.

9. A zoom lens according to claim 8, wherein said second lens group has a front lens group and a rear lens group on either side of a stop, and wherein said front lens group and said rear lens group each include at least one negative lens.

10. A zoom lens according to claim 8, wherein the negative lens of said front lens group has a concave surface facing the front, and the negative lens of said rear lens group has a concave surface facing the rear.

11. A zoom lens according to claim 8, wherein said front lens group has a positive refractive power.

12. A zoom lens comprising, from front to rear, a first lens group of negative refractive power, a second lens group of positive refractive power and a third lens group of negative refractive power, and said third lens group includes at least two negative lenses lens in this order from the front, wherein as zooming from the wide-angle end to the telephoto end is performed by moving said first, second and third lens groups, said second and third lens groups are moved forward in such relation that said third lens group moves a longer distance than said second lens group, and the following conditions are satisfied:

$$0.14 < f2/FT < 0.28$$

$$1.5 < S1w/S2w < 4$$

$$0.2 < |f3|/FT < 0.6$$

$$3 < FT/FW < 7$$

where S1w and S2w are air separations between said first and second lens groups and between said second and third lens groups in the wide-angle end respectively, f2 and f3 are focal lengths of said second and third lens groups respectively, and FW and FT are shortest and longest focal lengths of the entire lens system respectively.

13. A zoom lens according to claim 12, satisfying the following conditions:

$$0.35 < Lw/FT < 0.9$$

$$0.2 < |f1|/FT < 0.7$$

where f1 is a focal length of said first lens group and Lw is a distance from a frontmost lens surface to an image surface in the wide-angle end.

14. A zoom lens according to claim 13, wherein said second lens group includes at least three positive lenses, a negative lens and a positive lens in this order from the front.

15. A zoom lens according to claim 13, wherein said first lens group includes at least one negative lens a positive lens in this order from the front.

16. A zoom lens comprising, from front to rear, a first lens group of negative refractive power, a second lens group of positive refractive power and a third lens group of negative refractive power, wherein as zooming from the wide-angle end to the telephoto end is performed by moving said first, second and third lens groups each toward the object side, the following conditions are satisfied:

$$0.45 < M1/M2 < 0.7$$

$$0.77 < M2/M3 < 0.95$$

where M1, M2 and M3 are total zooming movements of said first, second and third lens groups respectively.

17. A zoom lens according to claim 16, satisfying the following conditions:

$$0.25 < |M1/\Delta f| < 0.45$$

$$0.5 < |M2/\Delta f| < 0.63$$

$$0.6 < |M3/\Delta f| < 0.8$$

where $\Delta f$ is a changed amount of a focal length of the entire lens system with zooming.

18. A zoom lens from front to rear, comprising:
a first lens group of negative refractive power;
a second lens group of positive refractive power; and
third lens group comprising a positive lens and a negative lens in order from front to rear, said third lens group having an overall refractive power that is negative,
wherein effective zooming is performed by varying spaces between said lens groups, and
wherein focusing is performed by moving said third lens group, and
wherein the zoom lens satisfies the following conditions:

$$1 < f31/|f3| < 2$$

where f3 and f31 are focal lengths of said third lens group and said positive lens, respectively.

19. A zoom lens according to claim 18, wherein the zoom lens satisfies the following condition:

$$N31 < N32$$

wherein N31 and N32 are refractive indices of materials and of said positive lens and said negative lens, respectively.

20. A zoom lens according to claim 18, which further satisfies the following conditions:

$$1 < RIII2/RIII3 < 2$$

$$(RIII2 < 0, RIII3 < 0)$$

wherein RIIIi is a radius of curvature of the i-th lens surface counting from front to rear in said third lens group.

* * * * *

UNITED STATES PATENT AND TRADEMARK OFFICE
CERTIFICATE OF CORRECTION

PATENT NO. : 5,289,317
DATED : February 22, 1994
INVENTOR(S) : KEIJI IKEMORI, ET AL.

It is certified that error appears in the above-indentified patent and that said Letters Patent is hereby corrected as shown below:

COLUMN 2
　　　Line 33, "(E)" should read --(B)--.

COLUMN 3
　　　Line 4, "an" should read --a--.

COLUMN 4
　　　Line 5, "much" should be deleted.

COLUMN 5
　　　Line 34, "ad" should read --and--.

COLUMN 7
　　　Line 42, "33.13" should read --36.18--.

COLUMN 8
　　　Line 22, "3.15" should read --3.155--.

COLUMN 9
　　　Line 50, "gives" should read --give--.

COLUMN 11
　　　Line 19, "distance" should read --distant--.
　　　Line 57, "2.5 (3.73)" should read --2.50 (3.73)--.
　　　Line 58, "R5: Aspheric" should read --R15: Aspheric--.

COLUMN 12
　　　Line 19, "R5: Aspheric" should read --R15: Aspheric--.
　　　Line 47, "R5: Aspheric　　R5: Aspheric" should read
--R12: Aspheric　　R15: Aspheric--.
　　　Line 62, "R8 == 199.64" should read --R8 = - 199.64--.

UNITED STATES PATENT AND TRADEMARK OFFICE
CERTIFICATE OF CORRECTION

PATENT NO. : 5,289,317
DATED : February 22, 1994
INVENTOR(S) : KEIJI IKEMORI, ET AL.

Page 2 of 3

It is certified that error appears in the above-indentified patent and that said Letters Patent is hereby corrected as shown below:

COLUMN 13
Line 39, "another" should read --other--.
Line 50, "the" (first occurrence) should be deleted.
Line 63, "with" should be deleted.

COLUMN 17
Line 29, "D" should read --D4--.

COLUMN 20
Line 66, "much" (both occurrences) should be deleted.

COLUMN 21
Line 17, "much" should be deleted.
Line 18, "much" should be deleted.

COLUMN 23
Line 43, "2.5." should read --2.50--.

COLUMN 26
Line 43, "is" should read --are--.

COLUMN 27
Line 57, "he" should read --the--.

COLUMN 28
Line 43, "Example 23:" should read --Numerical Example 23:--.

COLUMN 33
Line 5, "lens" should be deleted.
Line 44, after "lens" (second occurrence) insert --and--.

UNITED STATES PATENT AND TRADEMARK OFFICE
CERTIFICATE OF CORRECTION

PATENT NO. : 5,289,317
DATED : February 22, 1994
INVENTOR(S) : KEIJI IKEMORI, ET AL.

It is certified that error appears in the above-indentified patent and that said Letters Patent is hereby corrected as shown below:

<u>COLUMN 34</u>
    Line 21, "third" should read --a third--.

Signed and Sealed this

Fourth Day of October, 1994

Attest:

BRUCE LEHMAN

*Attesting Officer*      *Commissioner of Patents and Trademarks*